(12) United States Patent
Conway et al.

(10) Patent No.: US 12,516,098 B2
(45) Date of Patent: Jan. 6, 2026

(54) CHIMERIC ANTIGEN RECEPTOR MEDIATED CELL TARGETING

(71) Applicant: Sangamo Therapeutics, Inc., Richmond, CA (US)

(72) Inventors: Anthony Conway, Richmond, CA (US); Sumiti Jain, Richmond, CA (US); Gary K. Lee, Richmond, CA (US); Andreas Reik, Richmond, CA (US); Lynn N. Truong, Richmond, CA (US)

(73) Assignee: Sangamo Therapeutics, Inc., Richmond, CA (US)

( * ) Notice: Subject to any disclaimer, the term of this patent is extended or adjusted under 35 U.S.C. 154(b) by 0 days.

(21) Appl. No.: 16/058,307

(22) Filed: Aug. 8, 2018

(65) Prior Publication Data

US 2019/0048060 A1 Feb. 14, 2019

Related U.S. Application Data

(60) Provisional application No. 62/652,672, filed on Apr. 4, 2018, provisional application No. 62/613,258, filed on Jan. 3, 2018, provisional application No. 62/581,290, filed on Nov. 3, 2017, provisional application No. 62/542,511, filed on Aug. 8, 2017.

(51) Int. Cl.
*C07K 14/725* (2006.01)
*C07K 14/47* (2006.01)
*C07K 14/74* (2006.01)
*C12N 15/90* (2006.01)

(52) U.S. Cl.
CPC ...... *C07K 14/7051* (2013.01); *C07K 14/4711* (2013.01); *C07K 14/70539* (2013.01); *C12N 15/907* (2013.01); *C07K 2319/00* (2013.01); *C12N 2750/14143* (2013.01); *C12N 2800/80* (2013.01)

(58) Field of Classification Search
CPC .......... C07K 14/7051; C07K 14/70539; C07K 2319/00; C12N 15/907; C12N 2750/14143; C12N 2800/80
See application file for complete search history.

(56) References Cited

U.S. PATENT DOCUMENTS

| | | |
|---|---|---|
| 5,789,538 A | 8/1998 | Rebar et al. |
| 5,925,523 A | 7/1999 | Dove et al. |
| 5,928,638 A | 7/1999 | Uchida et al. |
| 6,007,988 A | 12/1999 | Choo et al. |
| 6,013,453 A | 1/2000 | Choo et al. |
| 6,060,273 A | 5/2000 | Dirks et al. |
| 6,136,597 A | 10/2000 | Hope et al. |
| 6,140,081 A | 10/2000 | Barbas |
| 6,140,466 A | 10/2000 | Barbas, III et al. |
| 6,200,759 B1 | 3/2001 | Dove et al. |
| 6,242,568 B1 | 6/2001 | Barbas, III et al. |
| 6,284,469 B1 | 9/2001 | Hope et al. |
| 6,287,814 B1 | 9/2001 | Hope et al. |
| 6,312,912 B1 | 11/2001 | Hope et al. |
| 6,410,248 B1 | 6/2002 | Greisman et al. |
| 6,453,242 B1 | 9/2002 | Eisenberg et al. |
| 6,479,626 B1 | 11/2002 | Kim et al. |
| 6,503,717 B2 | 1/2003 | Case et al. |
| 6,534,261 B1 | 3/2003 | Cox, III et al. |
| 6,599,692 B1 | 7/2003 | Case et al. |
| 6,607,882 B1 | 8/2003 | Cox, III et al. |
| 6,689,558 B2 | 2/2004 | Case |
| 6,723,551 B2 | 4/2004 | Kotin et al. |
| 6,794,136 B1 | 9/2004 | Eisenberg et al. |
| 6,824,978 B1 | 11/2004 | Cox, III et al. |
| 6,903,185 B2 | 6/2005 | Kim et al. |
| 6,933,113 B2 | 8/2005 | Case et al. |
| 6,979,539 B2 | 12/2005 | Cox, III et al. |
| 6,989,264 B2 | 1/2006 | Atkinson et al. |
| 7,013,219 B2 | 3/2006 | Case et al. |
| 7,030,215 B2 | 4/2006 | Liu et al. |
| 7,053,264 B2 | 5/2006 | Wolffe |
| 7,067,317 B2 | 6/2006 | Rebar et al. |
| 7,070,934 B2 | 7/2006 | Cox, III et al. |
| 7,074,596 B2 | 7/2006 | Darzynkiewicz et al. |
| 7,153,949 B2 | 12/2006 | Kim et al. |

(Continued)

FOREIGN PATENT DOCUMENTS

| | | |
|---|---|---|
| GB | 2338237 A | 12/1999 |
| JP | 08-502644 | 3/1996 |

(Continued)

OTHER PUBLICATIONS

Beerli, et al., "Engineering Polydactyl Zinc-Finger Transcription Factors," *Nature Biotechnology* 20:135-141 (2002).
Beurdeley, et al., "Compact Designer Talens for Efficient Genome Engineering," *Nat Comm* 4(1762): 1-8, doi:10.1038/ncomms2782 (2013).
Bitinaite, et al., "FokI Dimerization is Required for DNA Cleavage," *Proc. Natl. Acad Sci USA* 95:10,570-10,575 (1998).
Boch, et al., "Breaking the Code of DNA Binding Specificity of Tal-Type III Effectors," *Science* 326:1509-1512 (2009).
Boissel, et al., "Megatals: a Rare-Cleaving Nuclease Architecture for Therapeutic Genome Engineering," *Nucleic Acids Research* 42(4):2591-2601, doi: 10.1093/nar/gkt1224 (2013).
Bonas, et al., "Genetic and Structural Characterization of the Avirulence Gene AVRBS3 From Xanthomonas Campestris PV. Vesicatoria," *Mol Gen Genet* 218:127-136 (1989).

(Continued)

*Primary Examiner* — Janet L Andres
*Assistant Examiner* — Brian Hartnett
(74) *Attorney, Agent, or Firm* — Foley & Lardner LLP

(57) ABSTRACT

Disclosed herein are methods and compositions for engineering cells to express a CAR where the cells also have inactivated TCR, HPRT, PD1, CISH and/or HLA genes, using engineered nucleases comprising at least one DNA binding domain and a cleavage domain or cleavage half-domain in conditions able to preserve cell viability. Polynucleotides encoding nucleases, vectors comprising polynucleotides encoding nucleases and cells comprising polynucleotides encoding nucleases and/or cells comprising nucleases are also provided.

9 Claims, 29 Drawing Sheets

Specification includes a Sequence Listing.

(56) References Cited

U.S. PATENT DOCUMENTS

| | | |
|---|---|---|
| 7,163,824 B2 | 1/2007 | Cox, III et al. |
| 7,217,509 B2 | 5/2007 | Wolffe et al. |
| 7,253,273 B2 | 8/2007 | Collingwood |
| 7,262,054 B2 | 8/2007 | Jamieson et al. |
| 7,271,002 B2 | 9/2007 | Kotin et al. |
| 7,361,635 B2 | 4/2008 | Miller et al. |
| 7,419,817 B2 | 9/2008 | Chiorini et al. |
| 7,419,829 B2 * | 9/2008 | Mitrophanous ...... C12N 9/0071 435/456 |
| 7,785,792 B2 | 8/2010 | Wolffe et al. |
| 7,888,121 B2 | 2/2011 | Urnov et al. |
| 7,914,796 B2 | 3/2011 | Miller et al. |
| 7,923,542 B2 | 4/2011 | Wolffe et al. |
| 7,951,925 B2 | 5/2011 | Ando et al. |
| 7,972,854 B2 | 7/2011 | Miller et al. |
| 8,034,598 B2 | 10/2011 | Miller |
| 8,071,370 B2 | 12/2011 | Wolffe et al. |
| 8,110,379 B2 | 2/2012 | DeKelver et al. |
| 8,153,773 B2 | 4/2012 | Jemielity et al. |
| 8,409,861 B2 | 4/2013 | Guschin et al. |
| 8,563,314 B2 | 10/2013 | Gregory et al. |
| 8,586,526 B2 | 11/2013 | Gregory et al. |
| 8,623,618 B2 | 1/2014 | Doyon et al. |
| 8,697,359 B1 | 4/2014 | Zhang |
| 8,703,489 B2 | 4/2014 | Wang |
| 8,771,985 B2 | 7/2014 | Cui et al. |
| 8,772,453 B2 | 7/2014 | Paschon et al. |
| 8,822,221 B2 | 9/2014 | DeKelver et al. |
| 8,945,868 B2 | 2/2015 | Collingwood et al. |
| 8,956,828 B2 | 2/2015 | Bonini et al. |
| 9,005,973 B2 | 4/2015 | Cost et al. |
| 9,045,763 B2 | 6/2015 | DeKelver et al. |
| 9,200,266 B2 | 12/2015 | Wang |
| 9,255,250 B2 | 2/2016 | Gregory et al. |
| 9,255,259 B2 | 2/2016 | Cost et al. |
| 9,394,545 B2 | 7/2016 | Rebar |
| 9,402,879 B2 | 8/2016 | Gregory et al. |
| 9,458,205 B2 | 10/2016 | Gregory et al. |
| 9,567,573 B2 | 2/2017 | Gregory et al. |
| 9,567,609 B2 | 2/2017 | Paschon et al. |
| 9,597,357 B2 | 3/2017 | Gregory et al. |
| 9,701,758 B2 | 7/2017 | Cooper et al. |
| 9,873,894 B2 | 1/2018 | Conway et al. |
| 9,937,207 B2 | 4/2018 | Gregory et al. |
| 10,155,011 B2 * | 12/2018 | Bonini ............... A61K 35/17 |
| 2003/0232410 A1 | 12/2003 | Liljedahl et al. |
| 2005/0026157 A1 | 2/2005 | Baltimore et al. |
| 2005/0064474 A1 | 3/2005 | Urnov et al. |
| 2005/0208489 A1 | 9/2005 | Carroll et al. |
| 2005/0267061 A1 | 12/2005 | Martin |
| 2006/0063231 A1 | 3/2006 | Li et al. |
| 2007/0218528 A1 | 9/2007 | Miller |
| 2008/0159996 A1 | 7/2008 | Ando et al. |
| 2009/0068164 A1 | 3/2009 | Segal et al. |
| 2009/0136465 A1 | 5/2009 | Merenick et al. |
| 2010/0003756 A1 | 1/2010 | Collingwood et al. |
| 2010/0218264 A1 | 8/2010 | Cui et al. |
| 2011/0145940 A1 | 6/2011 | Voytas et al. |
| 2011/0201055 A1 | 8/2011 | Doyon et al. |
| 2011/0265198 A1 | 10/2011 | Gregory et al. |
| 2011/0301073 A1 | 12/2011 | Gregory et al. |
| 2012/0017290 A1 | 1/2012 | Cui et al. |
| 2012/0195936 A1 | 8/2012 | Rudolph et al. |
| 2013/0122591 A1 | 5/2013 | Cost et al. |
| 2013/0137104 A1 | 5/2013 | Cost et al. |
| 2013/0177960 A1 | 7/2013 | Rebar |
| 2013/0177983 A1 | 7/2013 | Rebar |
| 2014/0301990 A1 | 10/2014 | Gregory et al. |
| 2014/0335063 A1 | 11/2014 | Cannon et al. |
| 2015/0056705 A1 | 2/2015 | Conway et al. |
| 2015/0110762 A1 | 4/2015 | Holmes et al. |
| 2015/0132269 A1 | 5/2015 | Orkin et al. |
| 2015/0139943 A1 | 5/2015 | Campana et al. |
| 2015/0159172 A1 | 6/2015 | Miller et al. |
| 2015/0164954 A1 | 6/2015 | Bonini et al. |
| 2015/0174169 A1 | 6/2015 | Genovese et al. |
| 2016/0326548 A1 | 11/2016 | Cost |
| 2017/0137845 A1 | 5/2017 | Tan et al. |
| 2017/0173080 A1 | 6/2017 | Lee et al. |
| 2017/0211075 A1 | 7/2017 | Lee et al. |
| 2018/0087072 A1 | 3/2018 | Miller et al. |
| 2018/0362926 A1 | 12/2018 | Conway et al. |
| 2019/0136261 A1 | 5/2019 | Conway et al. |

FOREIGN PATENT DOCUMENTS

| | | | |
|---|---|---|---|
| JP | 2016-537001 A | 12/2016 | |
| RU | 2015139874 A | 3/2017 | |
| WO | WO 95/19431 A1 | 7/1995 | |
| WO | WO 96/06166 A1 | 2/1996 | |
| WO | WO 98/37186 A1 | 8/1998 | |
| WO | WO 98/53057 A1 | 11/1998 | |
| WO | WO 98/53058 A1 | 11/1998 | |
| WO | WO 98/53059 A1 | 11/1998 | |
| WO | WO 98/53060 A1 | 11/1998 | |
| WO | WO 98/54311 A1 | 12/1998 | |
| WO | WO 00/27878 A1 | 5/2000 | |
| WO | WO 01/60970 A2 | 8/2001 | |
| WO | WO 01/88197 A2 | 11/2001 | |
| WO | WO 02/016536 A1 | 2/2002 | |
| WO | WO 02/099084 A2 | 12/2002 | |
| WO | WO 03/016496 A2 | 2/2003 | |
| WO | WO 2011/094198 A1 | 8/2011 | |
| WO | WO-2014/130657 A1 | 8/2014 | |
| WO | WO-2015/073913 | 5/2015 | |
| WO | WO 2016/128408 | 8/2016 | |
| WO | WO 2017/078807 A1 | 5/2017 | |
| WO | WO-2017079673 A1 * | 5/2017 | ....... C07K 14/70503 |
| WO | WO 2017/106537 A2 | 6/2017 | |
| WO | WO-2017093969 A1 * | 6/2017 | ......... A61K 31/7088 |
| WO | WO-2017106528 A2 * | 6/2017 | ............. C12N 15/62 |
| WO | WO-2023/240212 A2 | 12/2023 | |

OTHER PUBLICATIONS

Brady, et al., "Antigen Receptor Allelic Exclusion: an Update and Reappraisal," *J Immunol* 185:3801-3808 (2010).

Carrillo, et al., "New Approaches for the Enhancement of Chimeric Antigen Receptors for the Treatment of HIV," *Transl Res* S1931-5244 (17): 30233-30235 (2017).

Chicaybam, et al., "Chimeric Antigen Receptors in Cancer Immuno-Gene Therapy: Current Status and Future Directions," *International Reviews Immunology* 30:294-311 (2011).

Chmielewski, et al., "Of Cars and Trucks: Chimeric Antigen Receptor (CAR) T Cells Engineered With an Inducible Cytokine To Modulate the Tumor Stroma," *Immunol Rev* 257(1):83-90 (2014).

Choo, et al., "Advances in Zinc Finger Engineering," *Current Opinion in Structural Biology* 10:411-416 (2000).

Curran, et al., "Enhancing Antitumor Efficacy of Chimeric Antigen Receptor T Cells Through Constitutive CD40L Expression," *Mol Ther* 23:769-778 (2015).

Gardner, et al., "Acquisition of a CD19-NEGATIVE Myeloid Phenotype Allows Immune Escape of Mll-Rearranged B-All From CD19 Car-T-Cell Therapy," *Blood* 127(20):2406-2410 (2016).

Guillinger, et al., "Fusion of Catalytically Inactive CAS9 To FokI Nuclease Improves the Specificity of Genome Modification," *Nature Biotech.* 32(6):577-582 (2014).

Guo, et al., "Directed Evolution of an Enhanced and Highly Efficient FokI Cleavage Domain for Zinc Finger Nucleases," *J. Mol. Biol.* 400(1):96-107 doi.10.1016/j.jmb.2010.04.060 (2010).

Haft, et al., "A Guild Of 45 Crispr-Associated (CAS) Protein Families and Multiple Crispr/Cas Subtypes Exist in Prokaryotic Genomes," *PLoS Computational Biology* 1(6)e60:474-483 (2005).

Hartmann, et al., "," *EMBO Mol Medicine* 9(9);1183-1197 (2017).

Heuer, et al., "Repeat Domain Diversity of AVRBS3-LIKE Genes in Ralstonia Solanacearum Strains and Association With Host Preferences in the Field," *Applied and Environmental Microbiology* 73(13):4379-4384 (2007).

Ho, et al., "Regulation of the Human T-Cell Receptor Alpha Gene Enhancer: Multiple Ubiquitous and T-Cell-Specific Nuclear Pro-

(56) References Cited

OTHER PUBLICATIONS teins Interact With Four Hypomethylated Enhancer Elements," *Mol Cell Biol* 10(9);4720-4727 (1990).

Isalan, et al., "A Rapid, Generally Applicable Method To Engineer Zinc Fingers Illustrated By Targeting the HIV-1 Promoter," *Nat Biotechnol.* 19(7):656-660 (2001).

Jansen, et al., "Identification of Genes That Are Associated With DNA Repeats in Prokaryotes," *Molecular Microbiology* 43(6):1565-1575 (2002).

Jones, et al., "Improving the Safety of Cell Therapy Products By Suicide Gene Transfer," *Front Pharmacol* 5:254 (2014).

Kakarla, et al., "Car T Cells for Solid Tumors: Armed and Ready To Go?" *Cancer J* 20(2):151-155 (2014).

Kalos, et al., "T Cells With Chimeric Antigen Receptors Have Potent Antitumor Effects and Can Establish Memory in Patirents With Advanced Leukemia," *Science Translational Medicine* 3(95):95ra73 (2011).

Kappes, et al., "Identification of a T-Cell-Specific Enhancer At the Locus Encoding T-Cell Antigen Receptor Gamma Chain," *PNAS* 88:2204-2208 (1991).

Kariko, et al., "Generating the Optimal Mrna for Therapy: Hplc Purification Eliminates Immune Activation and Improves Translation of Nucleoside-Modified, Protein-Encoding MRNA," *Nucleic Acid Research* 39(21):e142, doi.10.1093/nar/gkr695 (2011).

Kay, et al., "A Bacterial Effector Acts as a Plant Transcription Factor and Induces a Cell Size Regulator," *Science* 318:648-651 (2007).

Kochenderfer, et al., "Construction and Preclinical Evaluation of an ANTI-CD19 Chimeric Antigen Receptor," *J Immunother* 32(7):689-702 (2009).

Kochenderfer, et al., "Treating B-Cell Cancer With T Cells Expressing ANTI-CD19 Chimeric Antigen Receptors," *Nat Rev Clin Oncol* 10(5):267-276 (2013).

Kollmannsperger, et al., "Live-Cell Protein Labelling With Nanometre Precision By Cell Squeezing," *Nature Communications* 7:10372, doi: 10.1038/ncomms10372 (2016).

Koneru, et al., "IL-12 Secreting Tumor-Targeted Chimeric Antigen Receptor T Cells Eradicate Ovarian Tumors in Vivo," *Oncoimmunology* 4:e994446 (2015).

Kormann, et al., "Expression of Therapeutic Proteins After Delivery of Chemically Modified Mrna in Mice," *Nature Biotechnology* 29(2):154-157 (2011).

Lee, et al., "T Cells Expressing CD19 Chimeric Antigen Receptors for Acute Lymphoblastic Leukaemia in Children and Young Adults: A Phase 1 Dose-Escalation Trial," *Lancet* 385(9967):517-528 (2015).

Lombardo, et al., "Gene Editing in Human Stem Cells Using Zinc Finger Nucleases and Integrase-Defective Lentiviral Vector Delivery," *Nature Biotechnology* 25(11):1298-1306 (2007).

Makarova, et al., "A DNA Repair System Specific for Thermophilic Archaea and Bacteria Predicted By Genomic Context Anlysis," *Nucleic Acids Research* 30(2):482-496 (2002).

Makarova, et al., "A Putative RNA-Interference-Based Immune System in Prokaryotes: Computational Analysis of the Predicted Enzymatic Machinery, Functional Analogies With Eukaryotic Rnai, and Hypothetical Mechanisms of Action," *Biology Direct* 1(7):1-26 (2006).

Mandal, et al., "Natural Killer Cells: in Health and Disease," *Hemat/Onc Stem Cell Ther* 8(2); 47-55 (2015).

Maude, et al., "Chimeric Antigen Receptor T Cells for Sustained Remissions in Leukemia," *N Engl J Med.* 371:1507-1517 (2014).

Maude, et al., "CD19-TARGETED Chimeric Antigen Receptor T-Cell Therapy for Acute Lymphoblastic Leukemia," *Blood* 125(26): 4017-4023 (2015).

McCaffery, et al., "CRISPR-CAS9 D10A Nickase Target-Specific Fluorescent Labeling of Double Strand DNA for Whole Genome Mapping and Structural Variation Analysis," *Nucleic Acids Res.* 44(2):e11.doi:10.1093/nar/gkv878. (2016).

Metcalfe, et al., "The Frequency of HLA Alleles in a Population of Inuit Women of Northern Quebec," *Int J. Circumpolar Health* 72:1, 21350, DOI: 10.3402/ijch.v7210.21350 (2013).

Moscou, et al., "A Simple Cipher Governs DNA Recognition By Tal Effectors," *Science* 326:1501 (2009).

Onno, et al., "The HLA-G Gene is Expressed At a Low Mrna Level in Different Human Cells and Tissues," *Hum Immun* 41:79-86 (1994).

Pabo, et al., "Design and Selection of Novel CYS2-HIS2 Zinc Finger Proteins," *Ann. Rev. Biochem.* 70:313-340 (2001).

Prakash, et al., "Non-Classical Human Leukocyte Antigen-G Allelic Diversity Among North Indians," *Anthropol Open J.* 2(1): 1-9 (2017).

Ran, et al., "In Vivo Genome Editing Using *Staphylococcus aureus* CAS9," *Nature* 520:186 (2015).

Rosenberg, et al., "Durable Complete Responses in Heavily Pretreated Patients With Metastatic Melanoma Using T-Cell Transfer Immunotherapy," *Clinical Cancer Research* 17(13):4550-4557 (2011).

Rouanet, at al., "Gene Therapy for Pancreatic Cancer: Specificity, Issues and Hopes," *Int J Mol Sci* 18(6): 1231 (2017).

Scheuermann, et al., "CD19 Antigen in Leukemia and Lymphoma Diagnosis and Immunotherapy," *Leuk Lymphoma* 18:385-397 (1995).

Schornack, et al., "Gene-For-Gene-Mediated Recognition of Nuclear-Targeted AVRBS3-LIKE Bacterial Effector Proteins," *Journal of Plant Physiology* 163(3):256-272 (2006).

Scott, et al., "Antibody Therapy of Cancer," *Nat Rev Cancer* 12:278-287 (2012).

Segal, et al., "Custom DNA-Binding Proteins Come of Age: Polydactyl Zinc-Finger Proteins," *Current Opinion Biotechnology* 12:632-637 (2001).

Sheng, et al., "Structure-Based Cleavage Mechanism of Thermus Thermophilus Argonaute Dna Guide Strand-Mediated Dna Target Cleavage," *Proc. Natl. Acad. Sci. U.S.A.* 111(2):652-657 (2014).

Smietanski, et al., "Structural Analysis of Human 2'-O-RIBOSE Methyltransferases Involved in MRNA Cap Structure Formation," *Nature Communications* 5:3004 (2014).

Sotillo, et al., "Convergence of Acquired Mutations and Alternative Splicing of CD19 Enables Resistance To CART-19 Immunotherapy," *Cancer Dis* 5(12):1282-1295 (2015).

Swarts, et al., "Dna-Guided DNA Interference By a Prokaryotic Argonaute," *Nature* 507(7491):258-261 (2014).

Torikai, et al., "A Foundation for Universal T-Cell Based Immunotherapy: T Cells Engineered To Express a CD19-SPECIFIC Chimeric-Antigen-Receptor and Eliminate Expression of Endogenous TCR," *Blood* 119(24):5697-5705 (2012).

Urnov, et al., "Highly Efficient Endogenous Human Gene Correction Using Designed Zinc-Finger Nucleases," *Nature* 435(7042):646-651 (2005).

Vogel, "A Bacterial Seek-And-Destroy System for Foreign Dna," *Science* 344(6187):972-973 (2014).

Wang et al., "New Development in Cart Cell Therapy'" *J. Hematol Oncol* 10(1):53 (2017).

Wu, et al., "Adoptive T-Cell Therapy Using Autologous Tumor-Infiltrating Lymphocytes for Metastatic Melanoma: Current Status and Future Outlook," *Cancer J* 18(2):160-175 (2012).

Wu, et al., "Remote Control of Therapeutic T Cells Through a Small Molecule-Gated Chimeric Receptor," *Science* 350(6258) ab4077. doi:10.1126/science.aab4077 (2015).

Yu, et al., "Chimeric Antigen Receptor T Cells: A Novel Therapy for Solid Tumors," *J Hematol Oncol* 10:78 doi: 10.1186/s13045-017-0444-9 (2017).

Zah, et al., "T Cells Expressing CD19/CD20 Bispecific Chimeric Antigen Receptors Prevent Antigen Escape By Malignant B Cells," *Cancer Immunol Res* 4(6):498-508 (2016).

Zanta-Boussif, et al., "Validation of a Mutated Pre Sequence Allowing High and Sustained Transgene Expression While Abrogating WHV-X Protein Synthesis: Application To the Gene Therapy of Was," *Gene Ther* 16(5):605-19 (2009).

Ren et al,. "Multiplex genome editing to generate universal CART cells resistant to PD1 inhibition," AACR, pp. 2255-2266 (2016).

Wang C. et al., "Off the shelf' immunotherapies: Generation and application of pluripotent stem cell-derived immune cells," Cell Prolif, v. 56, No. 4, Apr. 30, 2023, pp. 1-16.

\* cited by examiner

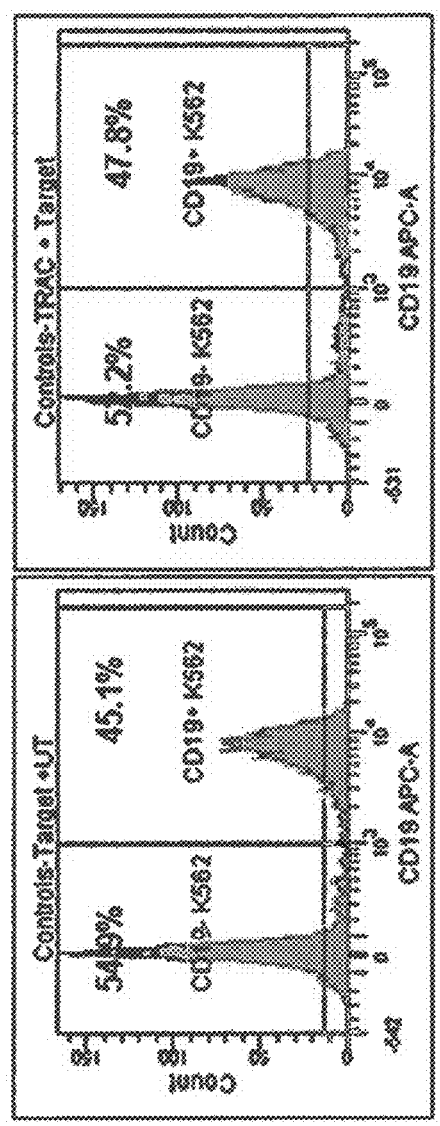
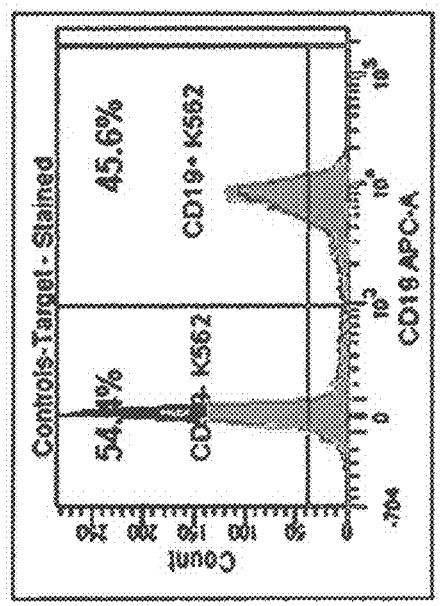
Figure 3A  Figure 3B  Figure 3C

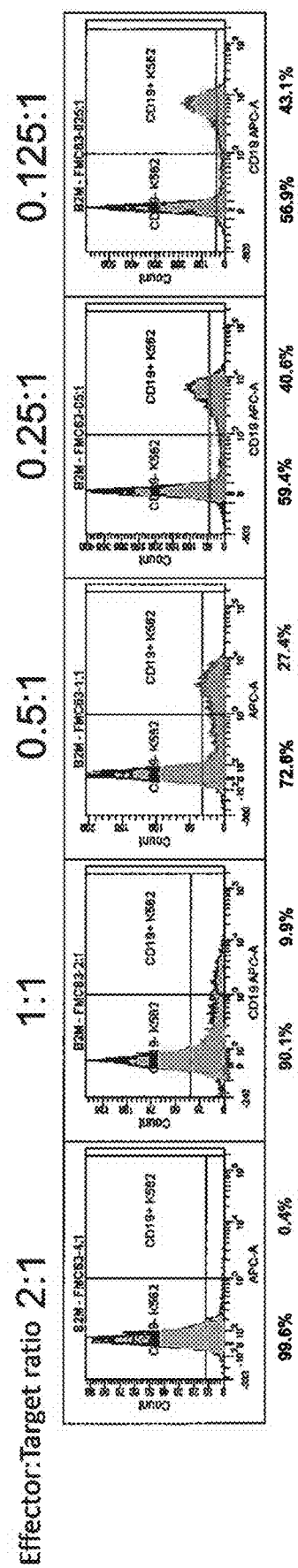
Figure 4A: CD19-CAR integrated into B2M
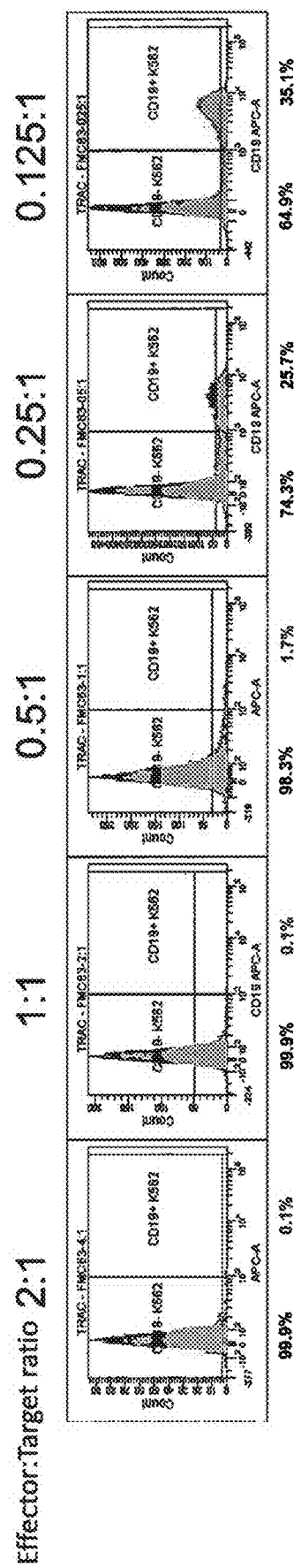
Figure 4B: CD19-CAR integrated into TCRA

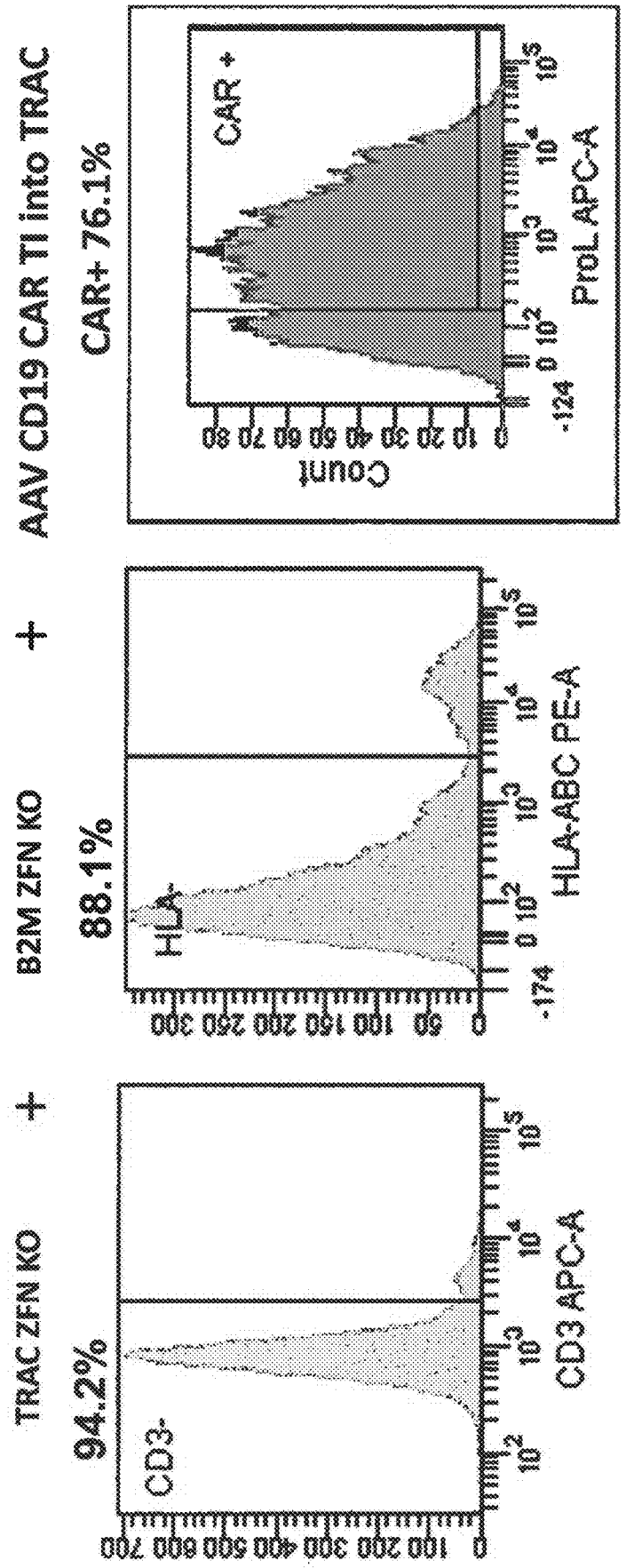

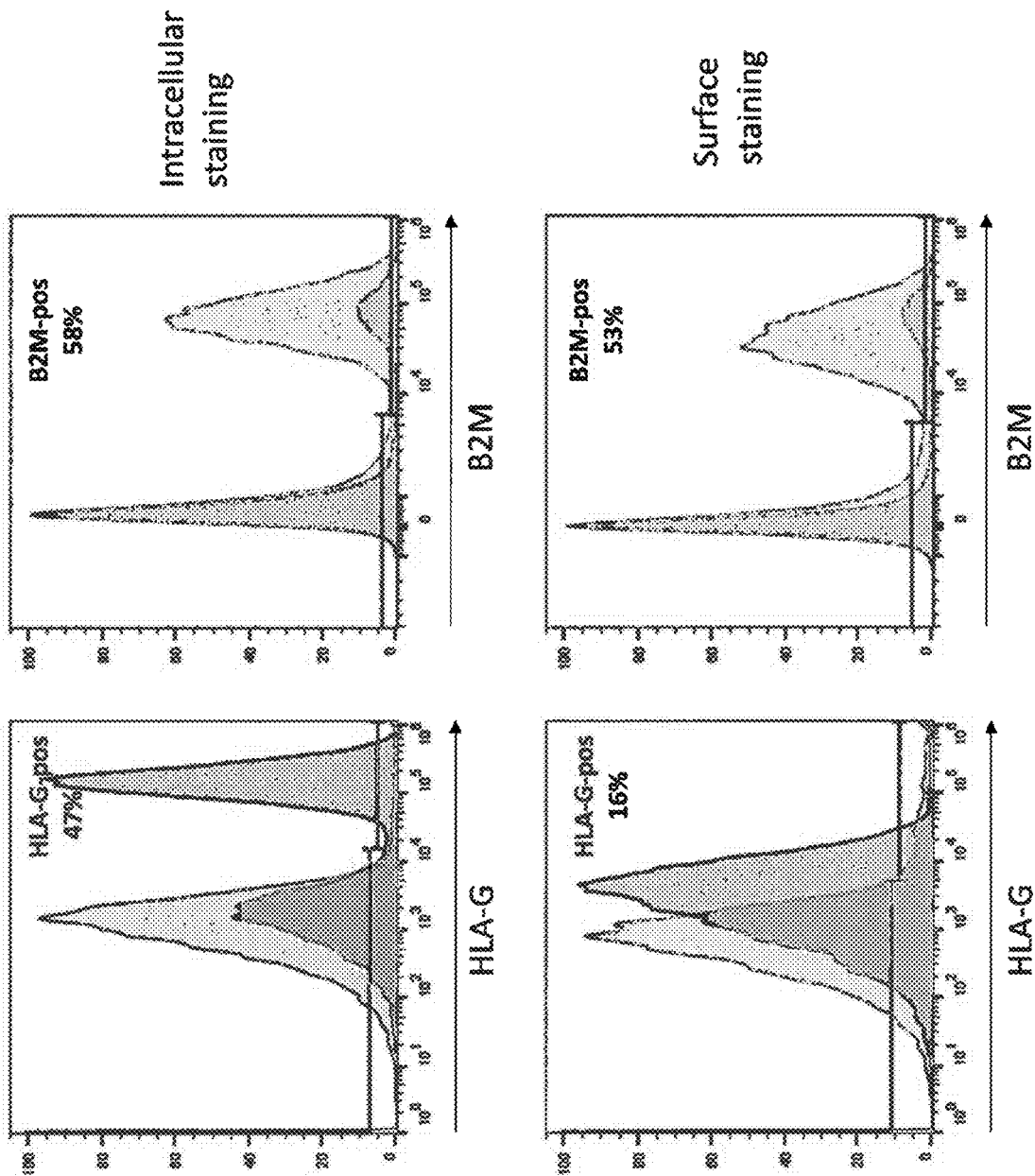

| Sample | HLA- (%) | Total Gene Modification (%) | GFP+ (%) | TI (%) | MFI |
|---|---|---|---|---|---|
| Untransfected | 6.5 | 0.0 | 0.0 | 0.0 | 1 |
| Mock | 5.6 | 0.1 | 0.0 | 0.0 | 1 |
| B2M short arms donor only | 6.7 | 0.0 | 0.3 | 0.0 | 1.29 |
| B2M-WPRE short arms donor only | 6.2 | 0.0 | 0.0 | 0.0 | 1.09 |
| ZFNs only | 85.1 | 86.6 | 0.0 | 0.0 | 1 |
| ZFNs + B2M site A hPGK GFP (long arms) AAV6 donor (no Miseq TI insert) | 81.2 | 91.8 | 70.7 | 0.0 | 253 |
| ZFNs + B2M-site A-Short Arms-hPGK-GFP with Miseq insert AAV6 donor | 83.0 | 90.3 | 62.8 | 72.0 | 220 |
| ZFNs + B2M-site A-Short Arms-hPGK-5'UTR-GFP with Miseq insert AAV6 donor | 84.9 | 93.1 | 64.4 | 52.6 | 197 |
| ZFNs + B2M-site A-Short Arms-hPGK-GFP-WPRE Donor with Miseq insert AAV6 donor | 90.8 | 88.9 | 62.0 | 70.7 | 96.8 |
| ZFNs + B2M-site A-Short Arms-T cell Enhancer-hPGK-GFP with Miseq insert AAV6 donor | 78.5 | 88.4 | 77.6 | 71.9 | 305 |
| ZFNs + B2M-site A-Short Arms-TCRα Enhancer-hPGK-GFP with Miseq insert AAV6 donor | 75.7 | 87.9 | 71.2 | 67.0 | 360 |

Figure 15B

| sample_id | B2M | TRAC | TI |
|---|---|---|---|
| 01_Mock.fq | 0.07 | 0.01 | 0.04 |
| 02_TRAC+B2M.fq | 83.45 | 87.73 | 0.00 |
| 03_site_E_423_393_hpGK_GFP-Miseq | 0.21 | 0.01 | 0.00 |
| 04_TRAC+B2M_site_E_423_393_hpGK_GFP-Miseq | 88.56 | 90.72 | 0.01 |
| 05_TRAC+B2M_TRAC_site_E_AAV_pGK_GFP | 91.19 | 89.11 | 0.00 |
| 06_TRAC+B2M_pAAV_TRAC_E_350-393-hpGK-GFP-WPREm-Miseq | 89.59 | 87.73 | 65.14 |
| 07_TRAC+B2M_pAAV_TRAC_E_423-393-hpGK-FMC63-CD8BBZ-Miseq | 91.01 | 87.48 | 59.31 |
| 08_TRAC+B2M_pAAV_TRAC_E_423-393-hpGK-FMC63-CD8BBZ-WPREm-Miseq | 91.55 | 87.57 | 64.49 |
| 09_TRAC+B2M_pAAV_TRAC_E_350-393-hpGK-FMC63-CD828Z-P2A-B2M-HLA-E-WPREm-Miseq | 89.23 | 88.39 | 40.93 |
| 10_TRAC+B2M_pAAV_TRAC_E_350-393-hpGK-FMC63-CD828Z-P2A-B2M-HLA-G-WPREm-Miseq | 89.99 | 89.37 | 41.37 |

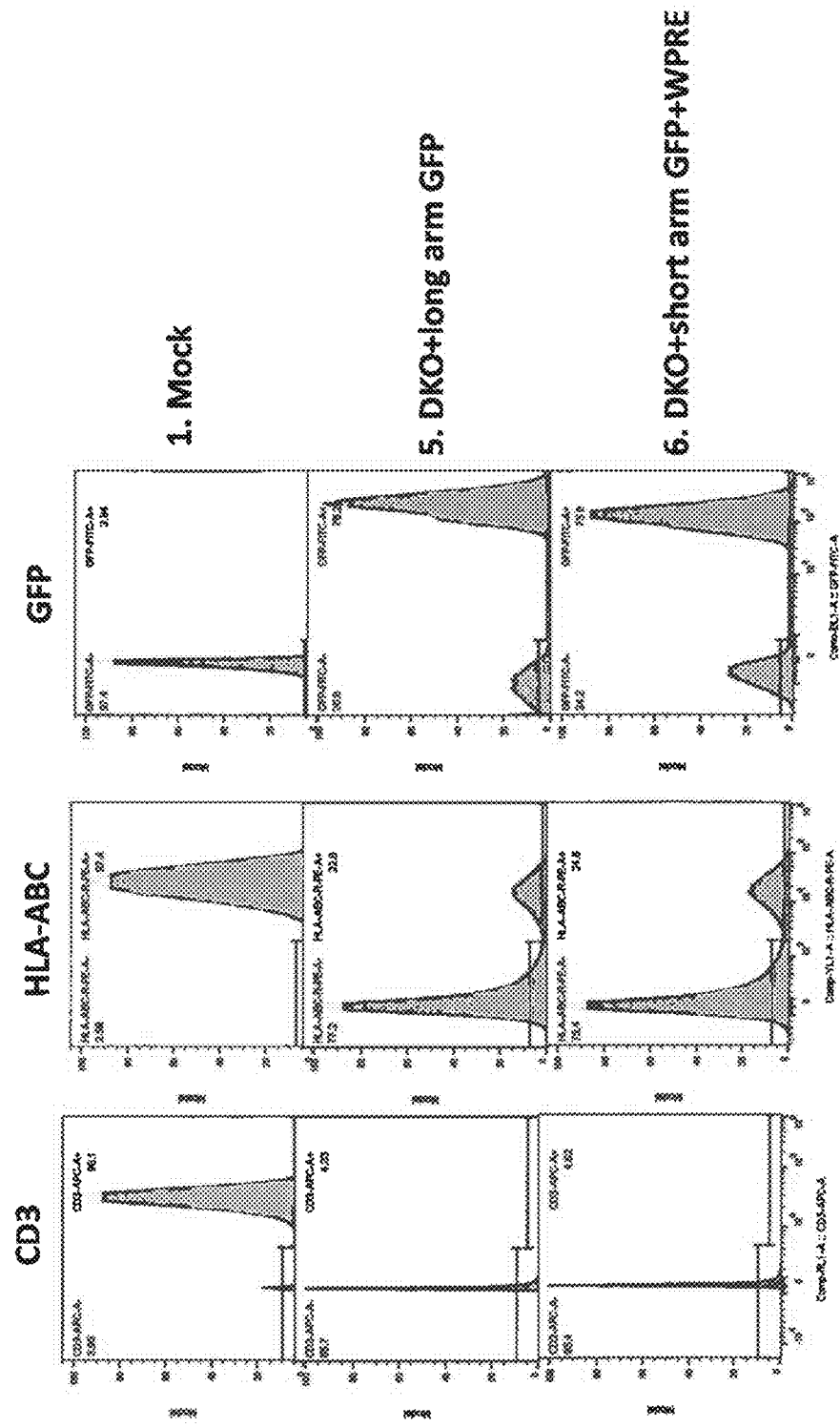

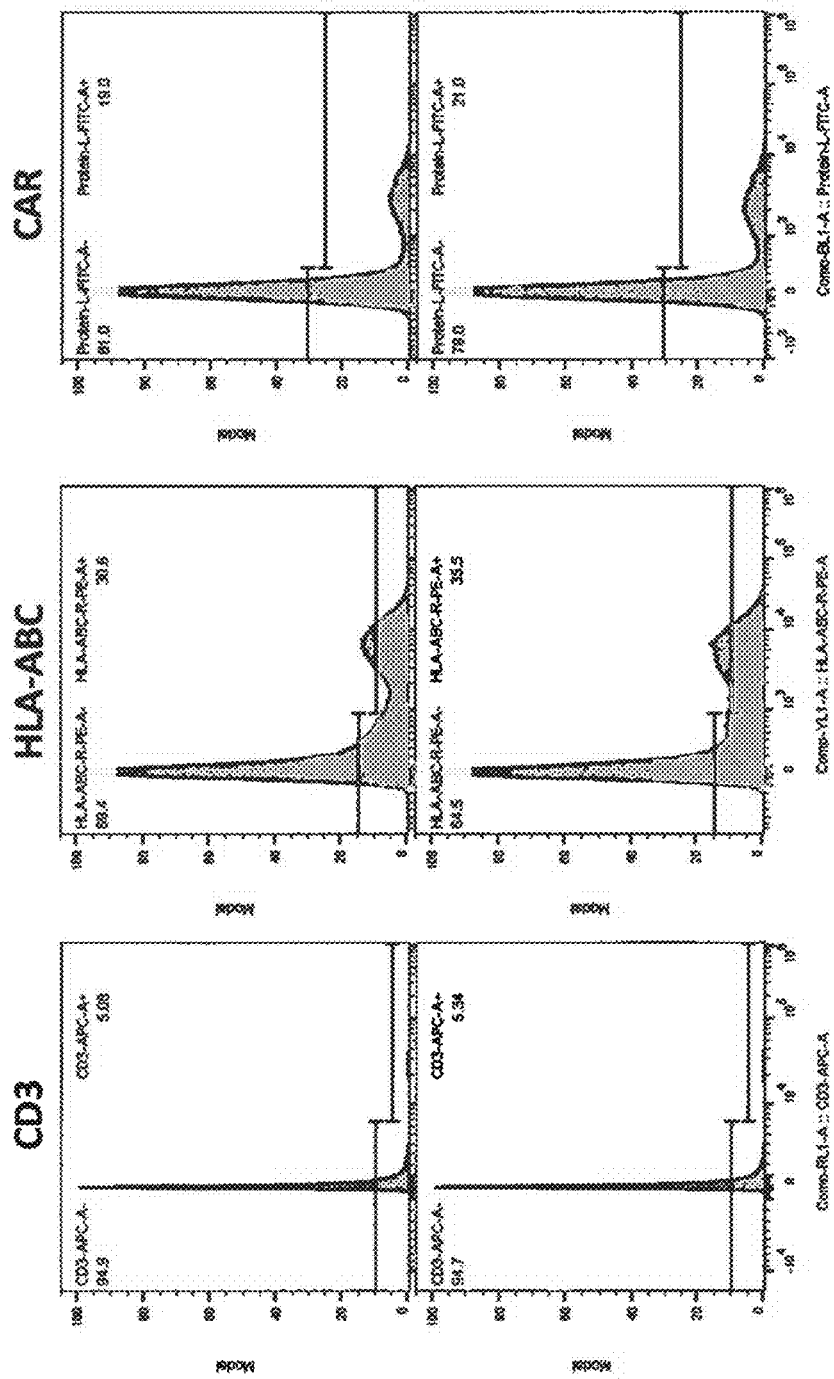

Figure 19

| Sample | Total indels (%) | | | |
| --- | --- | --- | --- | --- |
| | B2M | | TRAC | |
| | TF-TD 4 | TF-TD 5 | TF-TD 4 | TF-TD 5 |
| 01_Mock | 0.07 | 0.02 | 0.02 | 0.00 |
| 02_TRAC+B2M | 84.94 | 80.94 | 84.02 | 80.06 |
| 03_pAAV_TRAC_E_1000_992_hPGK_HLA_G only | 0.09 | | 0.99 | |
| 04_pAAV_TRAC_E_1000_992_hPGK_HLA_E0101 only | 0.08 | | 0.06 | |
| 05_pAAV_TRAC_E_1000_992_hPGK_HLA_E0103 only | 1.79 | | 0.41 | |
| 06_pAAV_TRAC_E_1000_992_hPGK_HLA_G | 87.78 | | 71.92 | |
| 07_pAAV_TRAC_E_1000_992_hPGK_B2M_G4S_2_noSP_HLA_G | 86.61 | | 71.73 | |
| 08_pAAV_TRAC_E_1000_992_hPGK_B2M_noSP_HLA_G | 91.67 | 88.59 | 82.48 | 78.62 |
| 09_pAAV_TRAC_E_1000_992_hPGK_B2M_G4S_6_noSP_HLA_G | 91.80 | 89.44 | 80.52 | 77.23 |
| 10_pAAV_TRAC_E_1000_992_hPGK_HLA_E0101 | 90.70 | | 78.74 | |
| 11_pAAV_TRAC_E_1000_992_hPGK_HLA_E0103 | 91.34 | | 78.01 | |
| 12_pAAV_TRAC_E_1000_992_hPGK_B2M_noSP_HLA_E0101 | 88.46 | 86.18 | 77.94 | 78.74 |
| 13_pAAV_TRAC_E_1000_992_hPGK_B2M_noSP_HLA_E0103 | 88.61 | 86.06 | 71.43 | 78.21 |
| 14_pAAV_TRAC_E_1000_992_pgk_gfp | 85.67 | | 64.34 | |
| 15_pAAV_TRAC_E_350_393_hPGK_CAR_B2M_HLA_G_WPREm_Miseq | 83.89 | | 73.75 | |

CHIMERIC ANTIGEN RECEPTOR MEDIATED CELL TARGETING

CROSS-REFERENCE TO RELATED APPLICATIONS

The present application claims the benefit of U.S. Provisional Application No. 62/542,511, filed Aug. 8, 2017; U.S. Provisional Application 62/581,290, filed Nov. 3, 2017; U.S. Provisional Application No. 62/613,258, filed Jan. 3, 2018 and U.S. Provisional Application No. 62/652,672, filed Apr. 4, 2018, the disclosures of which are hereby incorporated by reference in their entireties.

SEQUENCE LISTING

The instant application contains a Sequence Listing which has been submitted electronically in ASCII format and is hereby incorporated by reference in its entirety. Said ASCII copy, created on Aug. 31, 2018, is named 83250165SL.txt and is 16,849 bytes in size.

TECHNICAL FIELD

The present disclosure is in the field of genome modification of human cells, including lymphocytes and stem cells.

BACKGROUND

Gene therapy holds enormous potential for a new era of human therapeutics. These methodologies will allow treatment for conditions that have not been addressable by standard medical practice. Gene therapy can include the many variations of genome editing techniques such as disruption or correction of a gene locus, and insertion of an expressible transgene that can be controlled either by a specific exogenous promoter fused to the transgene or by the endogenous promoter found at the site of insertion into the genome, as well as expression of a transgene via an episomal vector system.

Delivery and insertion of the transgene are examples of hurdles that must be solved for any real implementation of this technology. For example, although a variety of gene delivery methods are potentially available for therapeutic use, all involve substantial tradeoffs between safety, durability and level of expression. Methods that provide the transgene as an episome (e.g. basic adenovirus (Ad), adeno-associated virus (AAV) and plasmid-based systems) are generally safe and can yield high initial expression levels, however, these methods lack robust episomal replication, which may limit the duration of expression in mitotically active tissues. In contrast, delivery methods that result in the random integration of the desired transgene (e.g. integrating lentivirus (LV)) provide more durable expression but, due to the untargeted nature of the random insertion, may provoke unregulated growth in the recipient cells, potentially leading to malignancy via activation of oncogenes in the vicinity of the randomly integrated transgene cassette. Moreover, although transgene integration avoids replication-driven loss, it does not prevent eventual silencing of the exogenous promoter fused to the transgene. Over time, such silencing results in reduced transgene expression for the majority of non-specific insertion events. In addition, integration of a transgene rarely occurs in every target cell, which can make it difficult to achieve a high enough expression level of the transgene of interest to achieve the desired therapeutic effect.

In recent years, a new strategy for transgene integration has been developed that uses cleavage with site-specific nucleases (e.g., zinc finger nucleases (ZFNs), transcription activator-like effector domain nucleases (TALENs), CRISPR/Cas system with an engineered crRNA/tracr RNA ('single guide RNA') to guide specific cleavage, etc.) to bias insertion into a chosen genomic locus. See, e.g., U.S. Pat. Nos. 9,937,207; 9,873,894; 9,567,573; 9,394,545; 9,255,250; 9,045,763; 9,005,973; 8,956,828; 8,945,868; 8,703,489; 8,586,526; 6,534,261; 6,599,692; 6,503,717; 6,689,558; 7,067,317; 7,262,054; 7,888,121; 7,972,854; 7,914,796; 7,951,925; 8,110,379; 8,409,861; U.S. Patent Publication Nos. 2017/0211075; 2003/0232410; 2005/0208489; 2005/0026157; 2005/0064474; 2006/0063231; 2008/0159996; 2010/00218264; 2012/0017290; 2011/0265198; 2013/0137104; 2013/0122591; 2013/0177983 and 2013/0177960 and 2015/0056705. Further, targeted nucleases are being developed based on the Argonaute system (e.g., from *T. thermophilus*, known as 'TtAgo', see Swarts et al (2014) *Nature* 507(7491): 258-261), which also may have the potential for uses in genome editing and gene therapy. This nuclease-mediated approach to transgene integration offers the prospect of improved transgene expression, increased safety and expressional durability, as compared to classic integration approaches, since it allows exact transgene positioning for a minimal risk of gene silencing or activation of nearby oncogenes.

ACTRs (Antibody-coupled T-cell Receptors) are engineered T cell components that are capable of binding to an exogenously supplied antibody. The binding of the antibody to the ACTR component arms the T cell to interact with the antigen recognized by the antibody, and when that antigen is encountered, the ACTR comprising T cell is triggered to interact with antigen (see U.S. Patent Publication 20150139943).

The T cell receptor (TCR) is an essential part of the selective activation of T cells. Bearing some resemblance to an antibody, the antigen recognition part of the TCR is typically made from two chains, α and β, which co-assemble to form a heterodimer. The antibody resemblance lies in the manner in which a single gene encoding a TCR alpha and beta complex is put together. TCR alpha (TCR α) and beta (TCR β) chains are each composed of two regions, a C-terminal constant region and an N-terminal variable region. The genomic loci that encode the TCR alpha and beta chains resemble antibody encoding loci in that the TCR α gene comprises V and J segments in addition to a constant region (often referred to as TRAC), while the β chain locus comprises D segments in addition to V and J segments. For the TCR β locus, there are additionally two different constant regions that are selected from during the selection process. During T cell development, the various segments recombine such that each T cell comprises a unique TCR variable portion in the alpha and beta chains, called the complementarity determining region (CDR), and the body has a large repertoire of T cells which, due to their unique CDRs, are capable of interacting with unique antigens displayed by antigen presenting cells. Once a TCR α or β gene rearrangement has occurred, the expression of the second corresponding TCR α or TCR β is repressed such that each T cell only expresses one unique TCR structure in a process called 'antigen receptor allelic exclusion' (see Brady et al, (2010) *J Immunol* 185:3801-3808).

During T cell activation, the TCR interacts with antigens displayed as peptides on the major histocompatability complex (MHC) of an antigen presenting cell. Recognition of the antigen-MHC complex by the TCR leads to T cell stimulation, which in turn leads to differentiation of both T helper cells (CD4+) and cytotoxic T lymphocytes (CD8+) in memory and effector lymphocytes. These cells then can expand in a clonal manner to give an activated subpopulation within the whole T cell population capable of reacting to one particular antigen. The human MHC is also called the HLA (human leukocyte antigen) complex. The MHC gene family is divided into three subgroups: class I, class II, and class III. Class I MHC molecules have 32 subunits so can only be recognized by CD8 co-receptors. MHC I molecules occur as an α chain composed of three domains—α1, α2, and α3. The α1 rests upon a unit of the non-MHC molecule β2 microglobulin (encoded on human chromosome 15, abbreviated B2M). The α3 domain is transmembrane, anchoring the MHC class I molecule to the cell membrane. The peptide being presented is held by the floor of the peptide-binding groove, in the central region of the α1/α2 heterodimer (a molecule composed of two nonidentical subunits). The genetically encoded and expressed sequence of amino acids, the sequence of residues, of the peptide-binding groove's floor determines which particular peptide residues it binds.

Natural Killer (NK) cells are specialized cells that are part of the innate immune system. They are one of the three types of lymphocytes found in the body: T cells, B cells and NK cells. These cells play a major role in the killing of tumor cells and bacterially and virally infected cells in the body. See, e.g., U.S. Publication No. 20140301990. Their cytotoxic ability is mainly mediated via two predominant pathways. A membrane-disrupting protein, perforin, and a family of structurally related serine proteases, granzymes, are secreted by exocytosis, which jointly induce apoptosis of the target cell. In the second pathway, a caspase-dependent apoptosis takes place involving the association of death receptors (e.g. Fas/CD95) on target cells with their equivalent ligands such as FasL, and tumor necrosis factor-related apoptosis-inducing ligand (TRAIL) on NK cells, resulting in caspase-dependent apoptosis. Antibody dependent cellular cytotoxicity (ADCC) can also be a mechanism of killing of tumor cells by NK cells as they express a low-affinity Fc receptor for IgG, FcγRIII (CD16) (Mandal and Viswanathan (2015) *Hemat/Onc Stem Cell Ther* 8(2):47-55).

NK-cell functioning is controlled by a wide range of receptors that are expressed on the cell surface. These receptors are either inhibitory or activating in nature. The family of inhibitory receptors consists of the killer immunoglobulin-like receptors (KIR) or Ig-like receptors (CD158), the C type lectin receptors (CD94-NKG2A) and leukocyte inhibitory receptors (LIR1, LAIR-1). Activating receptors are the natural cytotoxicity receptors (NKp46, NKp44), C type lectin receptors (NKG2D, CD94-NKG2C), and Ig-like receptors (2B4). NK-cell cytotoxicity is tightly regulated by a balance between activating and inhibitory signals, although inhibitory signaling can be a dominant signal over activation. The inhibitory NK-cell receptors recognize self-MHC class I molecules, and this prevents NK-cell activation, explaining self-tolerance and prevention of host cell killing. It has also been shown that NK cells can be activated when they encounter cells which lack self-MHC class I molecule ("HLA-I"). Expression of HLA-I-binding inhibitory receptors (e.g., KIR, NKG2A/CD94, ILT2, and LIR1) results in tolerance of NK cells toward normal cells. The NK cells usually attack abnormal cells that show down regulation of surface HLA-I molecules, termed "missing self-recognition". However, "missing self" results in susceptibility to licensed NK cells, which lyse cells lacking HLA-I (Crux and Elahi (2017) *Front Immunol* 8:832).

HLA-E and HLA-G belong to the HLA non-classical class I heavy chain paralogues, also referred to as the HLA-Ib class. This class I molecule is a heterodimer consisting of a heavy chain, encoded by the HLA-E or HLA-G gene, respectively, and a light chain, encoded by the beta-2 microglobulin-B2M. The human HLA-E is a non-classical MHC class I molecule that is characterized by a limited polymorphism and a lower cell surface expression than its classical paralogues. HLA-E haplotypes include HLA-E*0101 (also referred to as ER or HLA-E0101) which differs from HLA-E*0103 (also referred to as EG or HLA-E0103) at only one amino acid position, namely where an arginine at position 107 in HLA-E0101 is replaced by a glycine in HLA-E0103 (Celik et al (2016) *Immunogenetics* 68(1):29-41). As of 2017, 52 HLA-G alleles/haplotypes were officially recognized by the International ImMunoGeneTics Project/human major histocompatibility complex (IMGT/HLA) database (release 3.23.0). Most of the single nucleotide polymorphisms (SNPs) in the HLA-G coding region are either coding synonymous mutations or intronic variants. Out of 52 alleles which have been officially recognized by IMGT/HLA, only 13 alleles encode 4 different HLA-G full-length molecules and are frequently observed all over the world (Prakash et al (2017) *Anthropol Open J.* 2(1): 1-9. doi: 10.17140/ANT-POJ-2-106). One of the most common HLA-G alleles (often referred to as wildtype) is the HLA-G*01:01 allele (Metcalfe et al (2013) *Int J. Circumpolar Health* 72. doi: 10.3402/ijch.vy2i0.21350).

HLA-E has a very specialized role in cell recognition by natural killer cells (NK cells). NK cells recognize the HLA-E+peptide complex using the heterodimeric inhibitory receptor CD94/NKG2A/B/C. When CD94/NKG2A or CD94/NKG2B is engaged, it produces an inhibitory effect on the cytotoxic activity of the NK cell to prevent cell lysis, however, binding of HLA-E to CD94/NKG2C results in NK cell activation. This interaction has been shown to trigger expansion of NK cell subsets in antiviral responses. Human leukocyte antigen-E is a non-classical HLA-Ib with broad tissue distribution but is the least polymorphic of all the MHC-class I molecules. It is upregulated by microenvironmental stresses such as hypoxia and glucose deprivation in tumors but transcribed at lower rates than HLA-Ia molecules (Crux and Elahi, ibid).

HLA-G is typically expressed on fetal derived placental cell membranes and may play a role in immune tolerance in pregnancy. The HLA-G gene is very similar to the HLA-A, -B and -C genes, but the protein encoded by HLA-G differs from the products of the other 3 genes in that it lacks most of the intracellular segment. By Northern blot and RT-PCR assays using an HLA-G locus-specific probe and primers, it was demonstrate that the gene is transcribed in a variety of cells and adult tissues as well as fetal tissues (Onno et al (1994) *Hum. Immun.* 41: 79-86, 1994). In most tissues, the mRNA level was orders of magnitude lower than the level of classic class I genes in the same tissues. Alternative splicing of the HLA-G primary transcript was different from tissue to tissue and may be regulated in a tissue-specific fashion. HLA-G is a ligand for NK cell inhibitory receptor KIR2DL4, and therefore expression of this HLA by the trophoblast in theory defends it against NK cell-mediated death.

Adoptive cell therapy (ACT) is a developing form of cancer therapy based on delivering tumor-specific immune cells to a patient in order for the delivered cells to attack and clear the patient's cancer. ACT can involve the use of tumor-infiltrating lymphocytes (TILs) which are T-cells that are isolated from a patient's own tumor masses and expanded ex vivo to re-infuse back into the patient. This approach has been promising in treating metastatic melanoma, where in one study, a long term response rate of >50% was observed (see for example, Rosenberg et al (2011) *Clin Canc Res* 17(13): 4550). TILs are a promising source of cells because they are a mixed set of the patient's own cells that have T-cell receptors (TCRs) specific for the Tumor associated antigens (TAAs) present on the tumor (Wu et al (2012) *Cancer J* 18(2): 160). Other approaches involve editing T cells isolated from a patient's blood such that they are engineered to be responsive to a tumor in some way (Kalos et al (2011) *Sci Transl Med* 3(95):95ra73).

Chimeric Antigen Receptors (CARs) are engineered molecules designed to target immune cells to specific molecular targets expressed on cell surfaces. In their most basic form, they are receptors introduced into a cell that couple a specificity domain expressed on the outside of the cell to signaling pathways on the inside of the cell such that when the specificity domain interacts with its target, the cell becomes activated. Often CARs are made from emulating the functional domains of T-cell receptors (TCRs) where an antigen specific domain, such as a single chain antibody fragment (scFv) or some other type of receptor (e.g., a cytokine receptor), is fused to the signaling domain, such as an immunoreceptor tyrosine-based activation motif (ITAM) and other costimulatory domains. These constructs are introduced into a T-cell ex vivo, such that when the T-cell is re-introduced into the patient, it becomes activated in the presence of a cell expressing the target antigen, resulting in the attack on the targeted cell by the activated T-cell in a non-MHC dependent manner (see Chicaybam et al (2011) *Int Rev Immunol* 30:294-311). Various modes of gene transfer to the T cells can be employed, from retroviral and lentiviral vector methods resulting in permanent modification of the genome, to RNA-based methods leading to transient gene expression. Retro- or lentiviral approaches have the advantage of long-term gene expression and, therefore, the potential for long-term disease control from a single infusion of engineered T cells (if those T cells persist). The disadvantages of permanent modification are persistent on-target toxicity and the theoretical risk of transformation if gene insertion results in dysregulation of a nearby oncogene. Gene transfer using messenger RNA yields transient expression without integration into the genome, obviating any concern of transformation from random integration. T cells engineered by RNA insertion through electroporation have marked replicative capacity and can produce substantial tumor responses. However, expression typically lasts 7 days or less, so long-term disease control, although still possible, would require multiple infusions with this approach (Maude et al (2015) *Blood* 125(26): 4017-4023).

Adoptive cell therapy using T cells altered ex vivo with an engineered TCR or CAR is a promising clinical approach for several types of diseases. For example, cancers and their antigens that are being targeted includes follicular lymphoma (CD20 or GD2), neuroblastoma (CD171), non-Hodgkin lymphoma (CD19 and CD20), lymphoma (CD19), glioblastoma (IL13Ra2), chronic lymphocytic leukemia or CLL and acute lymphocytic leukemia or ALL (both CD19). Virus specific CARs have also been developed to attack cells harboring virus such as HIV. For example, a clinical trial was initiated using a CAR specific for Gp100 for treatment of HIV (Chicaybam, ibid), and several trials are ongoing using CD19-specific CARs (Maude (2015) ibid) for the treatment of CLL (see Kalos et al (2011) *Sci Transl Med.* 3(95):95ra73, and Kochenderfer J N and Rosenberg S A. (2013) *Nat Rev Clin Oncol.* 10(5):267-276), and treatment of ALL (see Maude et al. (2014) *N Engl J Med.* 371(16): 1507-1517 and Lee et al. (2015) *Lancet* 385(9967):517-528).

Despite the recent successes of adoptive cell therapy, there remain some significant hurdles to overcome before the wide spread adoption of this technique. For example, the endogenous αβ T-cell receptor (TCR) on infused allogeneic (donor derived) engineered T cells may recognize major and minor histocompatibility antigens in the recipient leading to graft-versus-host-disease (GVHD). As a result, the majority of current clinical trials infuse autologous CAR+ T cells (T-cells comprising an expressed CAR encoding sequence) relying on immune tolerance to prevent TCR-mediated deleterious recognition of normal tissues after adoptive transfer. This approach has achieved initial clinical successes targeting CD19+ malignancies, but is limited by the time and expense to manufacture patient-specific T-cell products (Torikai et al (2012) *Blood* 119:5697-5705). Another issue that has arisen in the treatment of patients with these engineered T cells is one of relapse, where the patients have been found to initially clear that tumor, only to relapse with a tumor cell that has down regulated the targeted antigen, so-called 'immune escape' (Sotillo et al (2015) *Cancer Dis* 5(12):1282-1295 and Gardner et al (2016) *Blood;* 127(20): 2406-2410).

Thus, despite the potential demonstrated by the use of adoptive cell therapy, there remains a need for methods and compositions that can be used to increase the efficiency and specificity of armed T cells. Specifically, methods are needed to safely introduce and sustain expression of antigen specific complexes including CARs and engineered TCRs. In addition, methods are needed to develop universal engineered T cells, lacking markers that are recognized by the patient's immune system (e.g., HLA complexes) that may be used to treat a large number of patients without the need to develop modified cells for each patient to be treated.

SUMMARY

Disclosed herein are compositions and methods for introduction of a chimeric antigen receptor into an engineered T cell. The methods presented comprise targeted introduction of a gene encoding one or more donor transgenes (e.g. CAR(s)) into a cell, including targeted integration of one or more CAR(s) into one or more TCR genes and/or a B2M gene (also referred to as CAR+ cells). The resulting cells of the invention thus comprise one or more CAR(s) specific to the antigen of choice (e.g., CD20, CD171, CD19), and/or IL13Rα2), and also lack a functional endogenous TCR and/or HLA complex. In some embodiments, the cells are further modified at another locus (e.g. a check point gene such as CISH or PD1) such that the resulting cells comprise edits at the TCR, B2M and any number of other genes (e.g., CISH) genes, resulting in cells lacking a native TCR, HLA complex and a knock out in additional genes such as the CISH check point gene and comprise a donor transgene (e.g. a CAR). These cells are useful for elimination of other cells bearing the target antigen. In preferred embodiments, the engineered CAR+ T cells are prepared for adoptive cell therapy. In some embodiments, the engineered CAR+ T cells express a modified HLA-E and/or HLA-G complex, allowing them to escape NK-mediated killing. Additionally, provided herein are methods and compositions for expressing an antigen on an irrelevant cell type for the purpose of analyzing activity of engineered T cells in vitro.

In one aspect, provided herein is a genetically modified T-cell (and populations of T cells comprising a plurality of these genetically modified T cells), the genetically modified T-cell comprising: a first polynucleotide encoding a chimeric antigen receptor (CAR) and a second polynucleotide comprising sequences encoding a fusion protein comprising a beta-2-micro-globulin (B2M) protein and HLA-E and/or HLA-G protein, in which the first and second polynucleotides are integrated into a T-cell receptor-a (TCRA) gene. In certain embodiments, one or more additional genes are inactivated in the cell, for example, a B2M gene and/or one or more immunological checkpoint genes (e.g., PD1, CISH, etc.). In any of the T cells described herein, the first and second polynucleotides may be linked by a self-cleaving peptide (e.g., 2A peptide also referred to as "P2A" or "P2A peptide"). Furthermore, in certain embodiments, the second polynucleotide further comprises a sequence encoding a linker (e.g., 1, 2, 3, 4, 5, 6 or more copies of a G4S linker (SEQ ID NO: 68)) between the B2M and HLA-E- or HLA-G-encoding sequences.

Also provided are methods of making genetically modified T-cells as described herein, the method comprising: cleaving a TCR-a gene in the isolated T-cell using a nuclease comprising a DNA-binding domain that binds to a target site in the TCR-a gene; and introducing one or more donors comprising the first and second polynucleotides into the T-cell such that the first and second polynucleotides are integrated into the cleaved TCR-a gene. In certain embodiments, the donor comprises first and second polynucleotides linked by a self-cleaving 2A peptide. Furthermore, in certain embodiments, the second polynucleotide further comprises a sequence encoding a linker (e.g., 1, 2, 3, 4, 5, 6 or more copies of a G4S linker (SEQ ID NO: 68)) between the B2M and HLA-E- or HLA-G-encoding sequences. In any of the methods described herein, the one or more donors may further comprise one or more of the following: (1) homology arms (to the TCR-α gene) flanking the first and second polynucleotides; (2) one or more promoters that drives expression of the first and/or second polynucleotide; (3) one or more TCR-α enhancer sequences; (4) a 3' untranslated region (3' UTR) and/or a 5' untranslated region (5' UTR); (5) a WPRE sequence (e.g., in the 3' UTR); and/or (5) a sequence from a *Xenopus* beta globin gene (e.g., in the 5' UTR).

In another aspect, described herein is an isolated cell (e.g., a eukaryotic cell such as a mammalian cell including a lymphoid cell, a stem cell (e.g., iPSC, embryonic stem cell, MSC or HSC), or a progenitor cell) in which one or more exogenous CAR(s) is expressed following site-specific integration of the CAR gene into the genome of the cell, including for example an endogenous gene. In some embodiments, the CAR is inserted into a TCR gene (TCRA and/or TRBC), and/or optionally into a checkpoint gene (e.g., CISH, PD1, etc.) and/or B2M gene using nucleases targeted to these genes as described herein or known in the art. In further embodiments, the CAR is inserted into the TCRA gene, while in others, it is inserted into the TRBC gene. In some embodiments, it is inserted into a B2M gene while in other embodiments, it is inserted into a checkpoint gene (e.g., CISH, PD1, etc.) gene in addition to the TCR gene. In the cells produced by this method, introduction of the gene encoding the CAR results in the knock out of an endogenous TCR, checkpoint (e.g., CISH) and/or B2M gene, and results in the knock out of the formation of a functional endogenous TCR or HLA complex and/or the knock out of the check point gene (e.g., CISH). In any of the cells described, if the CAR is integrated into a B2M gene, one or more TCR genes in the cell may be inactivated in the cell (e.g., by nuclease-mediated inactivation) to create a knockout of multiple genes (e.g., a B2M gene and one or more TCR genes and a checkpoint (e.g., CISH) gene). Similarly, if the CAR is integrated into a TCR gene, one or more different TCR genes, a checkpoint (e.g., CISH) and/or a B2M gene may be inactivated in the cell (e.g., by nuclease-mediated inactivation) to create a knockout of multiple genes (e.g., one or more TCR genes, a CISH gene and a B2M gene).

In further embodiments, the genetically modified cells (T-cells) described herein further comprise an altered HLA-E or HLA-G gene (transgene) that is inserted into the cells encoding the CAR, for example into a TCR (TCRA) gene along with the CAR. In some embodiments, an HLA-E or HLA-G gene (e.g., exogenous transgene) is co-introduced into the engineered cells with the CAR gene. In some embodiments, the HLA-E or HLA-G transgene is introduced before or after the CAR gene is introduced. In further embodiments, the transgene comprises a HLA-E or HLA-G gene sequence that is fused to a sequence encoding a linker which is then fused to a B2M gene sequence (i.e., transgene comprising an HLA-E or HLA-G-coding sequence, a linker and a B2M-coding sequence), thus encoding a modified HLA-E or HLA-G complex where the B2M gene is part of the open reading frame with the HLA-E or HLA-G gene such that upon expression, a stable HLA-E or HLA-G complex may form with the B2M expressed from the transgene. In this embodiment, due to the presence of the linker, the B2M subunit can only associate with the HLA-E or HLA-G protein to form a stable HLA-E or HLA-G complex on the cell surface and cannot associate with any other HLA complexes. In still further embodiments, the HLA-E or HLA-G-linker-B2M transgene is linked to a sequence encoding a CAR of interest, wherein the construct further comprises a 2A self-cleaving peptide sequence between the CAR gene and the HLA-E or HLA-G-linker-B2M construct. In yet further embodiments, this CAR-HLA-G or CAR-HLA-E complex also comprises homology arms such that the complex may be integrated into a genome at a specified site. The site of integration may in some embodiments cause transcription driven by an endogenous promoter at the site of integration, or the CAR-HLA-E or CAR-HLA-G construct may be linked to a promoter that is also integrated such that the expression construct is integrated into the genome but is driven by the heterologous promoter. In some embodiments, the CAR-HLA-E or CAR-HLA-G complex (transgene) is operably linked to a promoter to allow expression from an episomal (e.g. cDNA) nucleic acid. Additional sequences, including, but not limited to, WPRE and/or TCRa enhancer sequences may also be included in the donor construct. In further embodiments, the promoter is a tissue specific promoter. Further, any of these expression constructs may further comprise AAV ITRs to allow packaging into an AAV particle. In some instances, the AAV is an AAV5, AAV6, AAV9 or any other type of AAV.

In some aspects, the TCR gene is modulated by modification of exon c2 of the TCRA gene. The B2M gene is modulated by modification of exon 1 of the B2M gene. In certain embodiments, the modification is within and/or adjacent to a sequence comprising 12-25 (including target sites of 12, 13, 14, 15, 16, 17, 18, 19, 20, 21, 22, 23, 24, 25) or more nucleotides as shown in the target sites of Table 1, within and/or adjacent to a target site as shown in Table 1 (SEQ ID NO:1 and 2; SEQ ID NO:3 and 4, SEQ ID NO:5 and 6; SEQ ID NO:39 and 40; SEQ ID NO:50 and 51); within 1-5, within 1-10 or within 1-20 base pairs on either side (the flanking genomic sequences) of the target sites shown in Table 1 (SEQ ID NO: 1-6, 39, 40, 50 or 51); or within TTGAAA for the TCRA ZFN pair, or within GCCTTA for the B2M ZFN pair. Alternatively, or in addition, the modifications may also be made to sequences (e.g., genomic sequences) between paired target sites as described herein (e.g., target sites for the nuclease pairs shown in Table 1, including between the target sites for 55266 and 53853 (between SEQ ID NO: 1 and SEQ ID NO:2) or 68813 and 68812 (SEQ ID NO:39 and SEQ ID NO:40) in the TCRA gene; and/or between the target sites for 57071 and 57531 (between SEQ ID NO:3 and SEQ ID NO:4) in the B2M gene; between the target sites for 59488 and 59489 in the CISH gene (SEQ ID NO:50 and SEQ ID NO:51). In additional embodiments, additional genomic modifications are made between the target sites for 37706 and 48407 in the HPRT gene (SEQ ID NO:5 and 6). The genetic modification may be made by introduction, into a cell, of an exogenous fusion molecule comprising a functional domain (e.g., transcriptional regulatory domain, nuclease domain) and a DNA-binding domain, including but not limited to ZFP DNA-binding domain(s), TALE DNA-binding domains and sg RNA DNA-binding domains of a CRISPR/Cas system. The modified cells may include, but are not limited to: (i) a cell comprising an exogenous transcription factor comprising a DNA-binding domain that binds to a target site as shown in Table 1 and a transcriptional regulatory domain in which the transcription factor modulates B2M and/or TCRA gene expression and/or (ii) a cell comprising an insertion and/or a deletion at or near (within, between or adjacent to) one or more of the target sites shown in Table 1; within 1-5, within 1-10 or within 1-20 base pairs on either side (the flanking genomic sequence) of the target sites shown in Table 1; or within TTGAAA for the TCRA, or GCCTTQ for the B2M; and/or between paired target sites as described herein (e.g., target sites for the nuclease pairs shown in Table 1). The cell may include further modifications, for example an additional inactivated TCR or B2M gene, an inactivated HLA gene, CISH, PD1 and/or CTLA4 gene and/or a transgene encoding an Antibody-coupled T-cell Receptor (ACTR) and/or a transgene encoding a CAR, and/or a transgene encoding an antibody. It may also include an expression construct for a modified HLA-E or HLA-G complex. Pharmaceutical compositions comprising any cell as described herein are also provided as well as methods of using the cells and pharmaceutical compositions in ex vivo therapies for the treatment of a disorder (e.g., a cancer) in a subject.

Thus, in one aspect, described herein are genetically modified cells in which, in addition to the integration of a CAR-encoding gene, the expression of a TCR and/or B2M gene is modulated (e.g., activated, repressed or inactivated). In some embodiments, the cells also comprise a modified HLA-E or HLA-G complex. In preferred embodiments, exon c2 of a TCRA gene is modulated and/or exon 1 of a B2M gene is modulated. The modulation may be by an exogenous molecule (e.g., engineered transcription factor comprising a DNA-binding domain and a transcriptional activation or repression domain) that binds to the TCR and/or B2M gene and regulates TCR and/or B2M expression and/or via sequence modification of the TCR and/or B2M gene (e.g., using a nuclease that cleaves the TCR or B2M gene and modifies the gene sequence by insertions and/or deletions). In some embodiments, cells are described that comprise an engineered nuclease (e.g., ZFN, TALEN, CRISPR/Cas nuclease) to cause a knockout of a TCR and/or B2M gene and optionally additional genes such as immunological checkpoint genes (e.g., CISH (nucleases of Table 1), PD1 (U.S. Pat. No. 8,563,314), CTLA-4, etc.). In other embodiments, cells are described that comprise one or more engineered transcription factor (TF) such that the expression of a TCR and/or B2M gene is modulated. In some embodiments, the cells are T cells. Further described are cells wherein the expression of a TCR and/or B2M gene is modulated and wherein the cells are further engineered to comprise a least one exogenous transgene and/or an additional knock out of at least one endogenous gene (e.g., beta 2 microglobuin (B2M) or TCR gene, and/or immunological checkpoint gene such as PD1 and/or CTLA4) or combinations thereof. The exogenous transgene(s) may be integrated into a TCR or B2M gene (e.g., when the TCR or B2M gene is knocked out) and also may be integrated into one or more genes, including but not limited to a non-TCR or non-B2M gene such as a checkpoint gene (e.g., CISH, PD1) or a safe harbor gene. In certain embodiments, one or more CAR transgenes (e.g., a CD19-specific CAR) is integrated into a TRAC gene, a CISH gene and/or a B2M gene as well as a safe harbor gene (e.g., AAVS1, Rosa, albumin, HPRT, etc.). The same or different CAR transgenes may be integrated into the same or different loci. In embodiments in which one or more CARs are integrated into one or more safe harbor genes in addition to a TRAC gene, CISH and/or B2M are also preferably inactivated (e.g., via nuclease-mediated inactivation via insertion and/or deletion). In some cases, the exogenous transgene encodes an ACTR. The transgene construct may be inserted by either HDR- or NHEJ-driven processes. In some aspects the CAR-comprising cells with modulated TCR and/or B2M expression comprise at least an exogenous ACTR. Some cells comprising a TCR and/or B2M modulator further comprise a knockout of one or more check point inhibitor genes. In some embodiments, the checkpoint inhibitor gene is CISH (see, Table 1 below and U.S. Provisional Patent application 62/583,724), while in others, the checkpoint inhibitor gene is PD1 (see U.S. Pat. No. 8,563,314). In other embodiments, the check point inhibitor is CTLA4. See, e.g., U.S. Pat. No. 9,597,357. In further aspects, the CAR-comprising TCR and/or B2M modulated cell further comprises a PD1 knockout and/or a CTLA4 knockout and/or a CISH knockout (Table 1 below). In some embodiments, the TCR gene modulated is a gene encoding TCR β (TCRB). In some embodiments this is achieved via targeted cleavage of the constant region of this gene (TCR β Constant region, or TRBC). In certain embodiments, the TCR gene modulated is a gene encoding TCR α (TCRA). In further embodiments, insertion is achieved via targeted cleavage of the constant region of a TCR α gene, including targeted cleavage of the constant region of a TCR α gene (referred to herein as "TRAC" sequences). In some embodiments, the TCR gene modified cells are further modified at the B2M gene, the CISH gene (targeting sites disclosed in Table 1), PD1 and/or CTLA4 genes, the HLA-A, -B, -C genes, or the TAP gene, or any combination thereof. In other embodiments, the regulator for HLA class II, CIITA (see, U.S. Pat. No. 8,945,868), is also modified.

In certain embodiments, the CAR-comprising cells described herein further comprise a modification (e.g., deletion and/or insertion, binding of an engineered TF to repress TCR expression) to a TCRA gene (e.g., modification of exon c2). In certain embodiments, the modification is within and/or adjacent to any of the target sites shown in Table 1 (SEQ ID NOs 1 or 2) and/or between paired target sites (e.g., target sites of nuclease pairs shown in Table 1), including modification by binding to, cleaving, inserting and/or deleting one or more nucleotides within any of these sequences and/or within 1-50 base pairs (including any value therebetween such as 1-5, 1-10 or 1-20 base pairs) of the gene (genomic) sequences flanking these sequences in the TCRA gene. In certain embodiments, the cells comprise a modification (binding to, cleaving, insertions and/or deletions) within one or more of the following sequences: TTGAAA within a TCRA gene (e.g., exon c2) or GCCTTA within a B2M gene (e.g. exon 1). In certain embodiments, the modification comprises binding of an engineered TF as described herein such that a TCRA gene expression is modulated, for example, repressed or activated. In other embodiments, the modification is a genetic modification (alteration of nucleotide sequence) at or near nuclease(s) binding (target) and/or cleavage site(s), including but not limited to, modifications to sequences within 1-300 (or any number of base pairs therebetween) base pairs upstream, downstream and/or including 1 or more base pairs of the site(s) of cleavage and/or binding site; modifications within 1-100 base pairs (or any number of base pairs therebetween) of including and/or on either side of the binding and/or cleavage site(s); modifications within 1 to 50 base pairs (or any number of base pairs therebetween) including and/or on either side (e.g., 1 to 5, 1 to 10, 1 to 20 or more base pairs) of the binding and/or cleavage site(s); and/or modifications to one or more base pairs within the nuclease binding site and/or cleavage site. In certain embodiments, the modification is at or near (e.g., 1-300 base pairs, 1-50, 1-20, 1-10 or 1-5 or any number of base pairs therebetween) and/or between paired target sites (e.g., Table 1) of the TCRA gene sequence within, surrounding or between any of SEQ ID NO:1 and SEQ ID NO:2 and/or SEQ ID NO:39 and 40. In certain embodiments, the modification includes modifications of a TCRA gene adjacent to one or more of the sequences shown in SEQ ID NO: 1 and SEQ ID NO:2, SEQ ID NO:39 and 40 or within TTGAAA of a TCRA gene (e.g., exon c2), for example a modification of 1 or more base pairs to one or more of these sequences. In certain embodiments, the nuclease-mediated genetic modifications are between paired target sites (when a dimer is used to cleave the target). The nuclease-mediated genetic modifications may include insertions and/or deletions of any number of base pairs, including insertions of non-coding sequences of any length and/or transgenes of any length and/or deletions of 1 base pair to over 1000 kb (or any value therebetween including, but not limited to, 1-100 base pairs, 1-50 base pairs, 1-30 base pairs, 1-20 base pairs, 1-10 base pairs or 1-5 base pairs).

In certain embodiments, the modification is within and/or adjacent to any of the target sites shown in Table 1 (SEQ ID NO:3 and SEQ ID NO:4) and/or between paired target sites (e.g., target sites of nuclease pairs shown in Table 1) of a B2M gene (e.g., modification of exon 1), including modification by binding to, cleaving, inserting and/or deleting one or more nucleotides within any of these sequences and/or within 1-50 base pairs (including any value therebetween such as 1-5, 1-10 or 1-20 base pairs) of the gene (genomic) sequences flanking these sequences in the B2M gene. In certain embodiments, the cells comprise a modification (binding to, cleaving, insertions and/or deletions) within GCCTTA within exon 1 of a B2M gene. In certain embodiments, the modification comprises binding of an engineered TF as described herein such that B2M gene expression is modulated, for example, repressed or activated. In other embodiments, the modification is a genetic modification (alteration of nucleotide sequence) at or near nuclease(s) binding (target) and/or cleavage site(s), including but not limited to, modifications to sequences within 1-300 (or any number of base pairs therebetween) base pairs upstream, downstream and/or including 1 or more base pairs of the site(s) of cleavage and/or binding site; modifications within 1-100 base pairs (or any number of base pairs therebetween) of including and/or on either side of the binding and/or cleavage site(s); modifications within 1 to 50 base pairs (or any number of base pairs therebetween) including and/or on either side (e.g., 1 to 5, 1 to 10, 1 to 20 or more base pairs) of the binding and/or cleavage site(s); and/or modifications to one or more base pairs within the nuclease binding site and/or cleavage site. In certain embodiments, the modification is at or near (e.g., 1-300 base pairs, 1-50, 1-20, 1-10 or 1-5 or any number of base pairs therebetween) and/or between paired target sites (e.g., Table 1) of the B2M gene sequence within, surrounding or between any of SEQ ID NO:3 and SEQ ID NO:4. In certain embodiments, the modification includes modifications of a B2M gene within one or more of the sequences shown in SEQ ID NO:3 and SEQ ID NO:4, or within GCCTTA within exon 1 of a B2M gene, for example a modification of 1 or more base pairs to one or more of these sequences. In certain embodiments, the nuclease-mediated genetic modifications are between paired target sites (when a dimer is used to cleave the target). The nuclease-mediated genetic modifications may include insertions and/or deletions of any number of base pairs, including insertions of non-coding sequences of any length and/or transgenes of any length and/or deletions of 1 base pair to over 1000 kb (or any value therebetween including, but not limited to, 1-100 base pairs, 1-50 base pairs, 1-30 base pairs, 1-20 base pairs, 1-10 base pairs or 1-5 base pairs).

In certain embodiments, the modification is within and/or adjacent to any of the target sites shown in Table 1 (SEQ ID NO:5 and SEQ ID NO:6) and/or between paired target sites (e.g., target sites of nuclease pairs shown in Table 1) of an HPRT gene (e.g., modification of intron 1), including modification by binding to, cleaving, inserting and/or deleting one or more nucleotides within any of these sequences and/or within 1-50 base pairs (including any value therebetween such as 1-5, 1-10 or 1-20 base pairs) of the gene (genomic) sequences flanking these sequences in the B2M gene. In certain embodiments, the cells comprise an insertion into intron 1 such that the HPRT gene is not transcribed. Expression of the transgene inserted into HPRT gene may be driven by the endogenous HPRT promoter or may include an exogenous promoter. In other embodiments, the modification is a genetic modification (alteration of nucleotide sequence) at or near nuclease(s) binding (target) and/or cleavage site(s), including but not limited to, modifications to sequences within 1-300 (or any number of base pairs therebetween) base pairs upstream, downstream and/or including 1 or more base pairs of the site(s) of cleavage and/or binding site; modifications within 1-100 base pairs (or any number of base pairs therebetween) of including and/or on either side of the binding and/or cleavage site(s); modifications within 1 to 50 base pairs (or any number of base pairs therebetween) including and/or on either side (e.g., 1 to 5, 1 to 10, 1 to 20 or more base pairs) of the binding and/or cleavage site(s); and/or modifications to one or more base pairs within the nuclease binding site and/or cleavage site. In certain embodiments, the modification is at or near (e.g., 1-300 base pairs, 1-50, 1-20, 1-10 or 1-5 or any number of base pairs therebetween) and/or between paired target sites (e.g., Table 1) of the B2M gene sequence within, surrounding or between any of SEQ ID NO:3 and SEQ ID NO:4. In certain embodiments, the modification includes modifications of a B2M gene within one or more of the sequences shown in SEQ ID NO:3 and SEQ ID NO:4, or within GCCTTA within exon 1 of a B2M gene, for example a modification of 1 or more base pairs to one or more of these sequences. In certain embodiments, the nuclease-mediated genetic modifications are between paired target sites (when a dimer is used to cleave the target). The nuclease-mediated genetic modifications may include insertions and/or deletions of any number of base pairs, including insertions of non-coding sequences of any length and/or transgenes of any length and/or deletions of 1 base pair to over 1000 kb (or any value therebetween including, but not limited to, 1-100 base pairs, 1-50 base pairs, 1-30 base pairs, 1-20 base pairs, 1-10 base pairs or 1-5 base pairs).

In certain embodiments, the CISH gene is also modified (e.g., inactivation with or without integration), using a nuclease that binds to any of the CISH target sites shown in Table 1 (SEQ ID NO:50 and SEQ ID NO:51). In certain embodiments, the modification comprise an insertion and/or deletion such that the CISH gene is not transcribed or such that the mutant transcript is subject to nonsense mediated decay. Expression of one or more transgenes that have been inserted into the CISH gene may be driven by the endogenous CISH promoter or may include an exogenous promoter. In other embodiments, the modification is a genetic modification (alteration of nucleotide sequence) at or near nuclease(s) binding (target) and/or cleavage site(s), including but not limited to, modifications to sequences within 1-300 (or any number of base pairs therebetween) base pairs upstream, downstream and/or including 1 or more base pairs of the site(s) of cleavage and/or binding site; modifications within 1-100 base pairs (or any number of base pairs therebetween) of including and/or on either side of the binding and/or cleavage site(s); modifications within 1 to 50 base pairs (or any number of base pairs therebetween) including and/or on either side (e.g., 1 to 5, 1 to 10, 1 to 20 or more base pairs) of the binding and/or cleavage site(s); and/or modifications to one or more base pairs within the nuclease binding site and/or cleavage site. In certain embodiments, the modification is at or near (e.g., 1-300 base pairs, 1-50, 1-20, 1-10 or 1-5 or any number of base pairs therebetween) and/or between paired target sites (e.g., Table 1) of the CISH gene sequence within, surrounding or between any of SEQ ID NO:50 and SEQ ID NO:51. In certain embodiments, the nuclease-mediated genetic modifications are between paired target sites (when a dimer is used to cleave the target). The nuclease-mediated genetic modifications may include insertions and/or deletions of any number of base pairs, including insertions of non-coding sequences of any length and/or transgenes of any length and/or deletions of 1 base pair to over 1000 kb (or any value therebetween including, but not limited to, 1-100 base pairs, 1-50 base pairs, 1-30 base pairs, 1-20 base pairs, 1-10 base pairs or 1-5 base pairs).

The CAR+ modified cells of the invention may be a eukaryotic cell, including a non-human mammalian and a human cell such as lymphoid cell (e.g., a T-cell), a stem/progenitor cell (e.g., an induced pluripotent stem cell (iPSC), an embryonic stem cell (e.g., human ES), a mesenchymal stem cell (MSC), or a hematopoietic stem cell (HSC). The CAR+ modified cells are also optionally modified to express a modified HLA-E or HLA-G complex. The stem cells may be totipotent or pluripotent (e.g., partially differentiated such as an HSC that is a pluripotent myeloid or lymphoid stem cell). In other embodiments, the invention provides methods for producing CAR+ cells that have a null genotype for TCR and/or B2M expression. Any of the CAR+ modified stem cells described herein (modified at the TCRA and/or B2M locus, optionally expressing a modified HLA-E or HLA-G) may then be differentiated to generate a differentiated (in vivo or in vitro) cell descended from a stem cell as described herein with modified TCRA and/or B2M gene expression. In certain embodiments, described herein is a population of CAR+ modified cells as described herein in which at least 20% (or any percentage between 20% and 100%), preferably at least 50% (or any percentage between 50% and 100%), even more preferably at least 60% (or any percentage between 60% and 100%), and even more preferably at least 70% to 100% (or any percentage therebetween) of the cells are CAR+ modified.

In another aspect, the compositions (CAR+ modified cells, optionally expressing a modified HLA-E or HLA-G complex) and methods described herein can be used, for example, in the treatment or prevention or amelioration of a disorder. The methods typically comprise (a) integration of a CAR-encoding transgene into a cell by cleaving or an endogenous TCR and/or B2M gene in an isolated cell (e.g., T-cell or lymphocyte) using a nuclease (e.g., ZFN or TALEN) or nuclease system such as CRISPR/Cas with an engineered crRNA/tracr RNA, such that the TCR gene is inactivated or down modulated; and (b) introducing the cell into the subject, thereby treating or preventing the disorder. In some embodiments, the gene encoding the CAR or CAR-HLA-E or CAR-HLA-G expression construct is specifically integrated into TCR β (TCRB) such that expression of TCRB is inactivated. In some embodiments, inactivation is achieved via targeted cleavage of the constant region of this gene (TCR β Constant region, or TRBC) and integration of a CAR. In preferred embodiments, the gene encoding the CAR or CAR-HLA-E or CAR-HLA-G expression construct is integrated into TCR α (TCRA) such that TCRA is inactivated. In further preferred embodiments inactivation is achieved via targeted cleavage of the constant region of this gene (TCR α Constant region, or abbreviated as TRAC). In some embodiments, the gene encoding the CAR is specifically integrated into B2M such that expression of B2M is inactivated In some embodiments, the CAR+ cell further comprises an engineered transcription factor that down modulates a gene. In further embodiments, the transcription factor is a ZFP-TF, a TALE-TF, or a CRISPR/dCas-TF. In some embodiments, further genes are modulated including but not limited to a B2M, CISH, PD1 and/or CTLA4 gene.

In some embodiments, the additional genes are modulated (knocked-out), for example, B2M, PD1, CISH and/or CTLA4 and/or one or more therapeutic transgenes are present in the cell (episomal, randomly integrated or integrated via targeted integration such as nuclease-mediated integration). The nature of the therapeutic transgene can be to promote the killing activity of the CAR+ T cell, or to act as a killing switch to the modified T cells themselves (making a so-call "smart" CAR T cell, see Hartmann et al (2017) *EMBO MolMedicine, DOI* 10.15252/emmm.201607485). In some embodiments, the transgene is a suicide gene such that the activation of the gene causes death of the CAR T cell. In some embodiments, the suicide gene is an HSV-TK gene that encodes the thymidine kinase enzyme which is able to metabolize ganciclovir, an antiviral drug that is normally devoid of antitumor effect, into a toxic compound that interferes with DNA replication and results in cell apoptosis; a cytosine deaminase gene (also coupled to the uracil phosphoribosyltransferase gene) that transforms 5-fluorocytosine (with antifungal properties) into 5-fluorouracil; the nitroreductase gene transforms CB 1954 (for [5-(aziridin-1-yl)-2,4-dinitrobenzamide]) into a toxic compound, the 4-hydroxylamine; and the cytochrome P450 gene that transforms ifosfamide to acrolein (nitrogen mustard) (Rouanet et al (2017), *Int JMol Sci,* 18(6): 1231) or inducible caspase-9 (Jones et al (2014) *Front Pharmacol.* 5:254). In further embodiments, the transgene encodes a factor to calm severe side effects and/or toxicities such as cytokine release syndrome (CRS) and/or neurotoxicities (e.g. a scFv construct targeted to IL6 or a secretable IL-12 construct—e.g. fourth generation "TRUCK" (Chmielewski et al, (2014) *Immunol Rev.* 257(1):83-90).

The transcription factor(s) and/or nuclease(s) can be introduced into a cell or the surrounding culture media as mRNA, in protein form and/or as a nucleic acid sequence encoding the nuclease(s). In certain embodiments, the isolated CAR+ cell introduced into the subject further comprises additional genomic modification, for example, an integrated exogenous sequence (into the cleaved TCR and/or B2M gene or a different gene, for example a safe harbor gene or locus) and/or inactivation (e.g., nuclease-mediated) of additional genes, for example one or more HLA genes. In some embodiments, one CAR gene is inserted into a TCR gene and a second (identical or non-identical) CAR gene is inserted into a B2M gene. In both these embodiments, the CAR gene may be part of a CAR-HLA-E or CAR-HLA-G expression construct. The exogenous sequence or protein may be introduced via a vector (e.g. Ad, AAV, LV), or by using a technique such as electroporation. In some embodiments, the proteins are introduced into the cell by cell squeezing (see Kollmannsperger et al (2016) *Nat Comm* 7, 10372 doi:10.1038/ncomms10372). In some aspects, the composition may comprise isolated cell fragments and/or differentiated (partially or fully) cells.

In some aspects, the CAR+ cells may be used for cell therapy, for example, for adoptive cell transfer. In other embodiments, the CAR+ cells may be used in a T cell transplant and may contain other gene modification(s) of interest. In one aspect, the CAR+ T cells contain a CAR specific for a cancer marker. In a further aspect, the inserted CAR is specific for the CD19 marker characteristic of B cells, including B cell malignancies. Targeted integration of the CAR into the B2M gene would generate 'universal' cells useful in a therapeutic composition for treating patients without having to match HLA, and so would be able to be used as an "off-the-shelf" therapeutic for any patient in need thereof. Targeted integration of the CAR-HLA-E or CAR-HLA-G expression construct may create an "off-the-shelf" universal cell that will not be subject to NK-mediated killing within the treated patient, and thus may survive for a longer period in the body.

In some embodiments, the CAR encoding sequence is inserted via targeted integration where the CAR donor sequence comprises flanking homology arms that have homology to the sequence flanking the cleavage site of the engineered nuclease. In some embodiments the CAR donor sequence or CAR-HLA-E or CAR-HLA-G donor sequence further comprises a promoter and/or other transcriptional regulatory sequences. In other embodiments, the CAR or CAR-HLA-E or CAR-HLA-G donor sequence lacks a promoter. In further embodiments, the CAR or CAR-HLA-E or CAR-HLA-G donor sequence comprises a switch whereby separate extracellular antigen-binding domain and intracellular signaling components can be assembled, for example, through an FKBP-FRB module only in the presence of heterodimerizing small molecules (rapamycin analog AP21967) (see Wu et al (2015) *Science.* 350(6258): aab4077). Any of the donor constructs described herein may further include additional sequences, including but not limited to homology arms (of any length); WPRE sequences and/or TCRa enhancer sequences.

In another aspect, the CAR+ or CAR+, modified HLA-G+ or modified HLA E+ TCR- or B2M-modulated (modified) T cells further contain an inserted Antibody-coupled T-cell Receptor (ACTR) donor sequence. In some embodiments, the ACTR donor sequence is inserted into a TCR and/or gene to disrupt expression of that TCR and/or B2M gene following nuclease induced cleavage. In other embodiments, the donor sequence is inserted into a "safe harbor" locus, such as the AAVS1, HPRT, albumin and CCR5 genes.

Also provided are pharmaceutical compositions comprising the modified cells as described herein (e.g., CAR+, or CAR+, modified HLA-E+ or HLA-G+ T cells or stem cells with inactivated TCR and/or B2M gene), or pharmaceutical compositions comprising one or more of the TCR and/or B2M gene binding molecules (e.g., engineered transcription factors and/or nucleases) as described herein. In certain embodiments, the pharmaceutical compositions further comprise one or more pharmaceutically acceptable excipients. The modified cells, TCR and/or B2M gene binding molecules (or polynucleotides encoding these molecules) and/or pharmaceutical compositions comprising these cells or molecules are introduced into the subject via methods known in the art, e.g. through intravenous infusion, infusion into a specific vessel such as the hepatic artery, or through direct tissue injection (e.g. muscle). In some embodiments, the subject is an adult human with a disease or condition that can be treated or ameliorated with the composition. In other embodiments, the subject is a pediatric subject where the composition is administered to prevent, treat or ameliorate the disease or condition (e.g., cancer, graft versus host disease, etc.).

In some aspects, a composition (modulated cells comprising a CAR or a CAR and a modified HLA-E or HLA-G) can comprise a CAR comprising an antibody antigen binding domain. In some aspects, the CAR is useful for arming an engineered T cell to prevent or treat a condition. In some embodiments, the CAR recognizes an antigen associated with a tumor cell or with cancer associated processes such as BCMA, EpCAM, CEA (pancreatic adenocarcinoma, breast cancer, colorectal carcinoma), gpA33, mucins, TAG-72, CAIX (renal cell carcinoma (RCC)), folate-binding antibodies, CD19 (B-cell malignancies), CD20, CD22, EGFR (epithelial carcinoma, glioma), EGFRvIII (glioblastoma), EpCam, EphA2, ERBB2/HER2 (breast, ovarian, colon cancers; osteosarcoma, medullablastoma) ERBB3, FAP (malignant pleural mesothelioma), MET, MSLN (mesothelioma, ovarian cancer, pancreatic adenocarcinoma), Igκ, IL-1RAP, IGF1R, EPHA3, Lewis Y, NKG2D ligands, ROR1, FR-a (ovarian cancer), GD2 (neuroblastoma, melanoma), GPC3 (hepatocellular carcinoma), IL-13Rα2 (glioma), L1-CAM (neuroblastoma, melanoma, ovarian adenocarcinoma), MUC1 (seminal vesicle cancer), CA125 (epithelial ovarian cancers), PD-L1, PSCA, CTAGiB (melanoma and ovarian cancer), PSMA (prostate cancer), VEGFR2, c-MET, CD133 (glioblastoma, cholangiocarcinoma (CCA)), TRAILR1, TRAILR2, RANKL, FAP, VEGF, VEGFR, aV33 and α501 integrins, CD30, CD33, CD52, CD70, CD123, CD138, CD16V, CTLA4, and enascin (Scott et al (2012) *Nat Rev Cancer* 12:278; Hartmann et al (2017) *EMBO Mol Med; DOI* 10.15252/emmm.201607485, Yu et al (2017) *J Hematol Oncol* 10:78). In other embodiments, the CAR recognizes an antigen associated with an infectious disease such as HIV, HCV and the like (see e.g. Carillo et al (2017) *Transl Res.* pii: S1931-5244(17)30233-5. doi: 10.1016/j.trsl.2017.07.002). In some embodiments, the engineered T cell may comprise 2 or more non-identical CAR sequences integrated into the genome (e.g. specific for CD19 and CD20). In certain embodiments, the CAR comprises a CAR designated FMC63-CD8BBZ, in which FMC63 is an anti-CD19 scFv sequence (see, U.S. Pat. No. 9,701,758) and CD8BBZ refers to the portions of the CAR excluding the scFv (CD8 hinge/transmembrane domain (CD8), costimulation domain from 41BB gene (BB), activation domain from CD3z gene (Z)).

The DNA-binding domain of the transcription factor or nuclease (e.g., ZFP, TALE, sgRNA) may bind to a target site in a TCRA or B2M gene comprising 9, 10, 11, 12 or more (e.g., 13, 14, 15, 16, 17, 18, 19, 20 or more) nucleotides of any of the target sites shown herein (e.g., Table 1 as shown in SEQ ID NOs: 1-4). The zinc finger proteins may include 1, 2, 3, 4, 5, 6 or more zinc fingers, each zinc finger having a recognition helix that specifically contacts a target subsite in the target gene. In certain embodiments, the zinc finger proteins comprise 4 or 5 or 6 fingers (designated F1, F2, F3, F4, F5 and F6 and ordered F1 to F4 or F5 or F6 from N-terminus to C-terminus), for example as shown in Table 1. The ZFPs as described herein may also include one or more mutations to phosphate contact residues of the zinc finger protein, for example, the nR-SQabc mutant described in U.S. Provisional Nos. 62/378,978 and 62/443,981. In other embodiments, the single guide RNAs or TAL-effector DNA-binding domains may bind to a target site as described herein (e.g., target sites of Table 1 shown in any of SEQ ID NOs: 1-4) or 12 or more base pairs within any of these target sites or between paired target sites. The nucleases described herein (comprising a ZFP, a TALE or a sgRNA DNA-binding domain) are capable of making genetic modifications within a TCRA gene or B2M gene comprising any of SEQ ID NO: 1-4, including modifications (insertions and/or deletions) within any of these sequences (SEQ ID NO: 1-4) and/or modifications to TCRA and/or B2M gene sequences flanking the target site sequences shown in SEQ ID NO: 1-4, for instance modifications within exon c2 of a TCRA gene within TTGAAA.

Any of the proteins described herein may further comprise a cleavage domain and/or a cleavage half-domain (e.g., a wild-type or engineered FokI cleavage half-domain). Thus, in any of the nucleases (e.g., ZFNs, TALENs, CRISPR/Cas systems) described herein, the nuclease domain may comprise a wild-type nuclease domain or nuclease half-domain (e.g., a FokI cleavage half domain). In other embodiments, the nucleases (e.g., ZFNs, TALENs, CRISPR/Cas nucleases) comprise engineered nuclease domains or half-domains, for example engineered FokI cleavage half domains that form obligate heterodimers. See, e.g., U.S. Pat. Nos. 7,914,796 and 8,034,598. In certain embodiments, one or more FokI endonuclease domains of the nucleases described herein may also comprise phosphate contact mutants (e.g., R416S and/or K525S) as described in U.S. Publication No. 20180087072.

In another aspect, the disclosure provides a polynucleotide encoding any of the proteins, fusion molecules and/or components thereof (e.g., sgRNA or other DNA-binding domain) described herein. The polynucleotide may be part of a viral vector, a non-viral vector (e.g., plasmid) or be in mRNA form. Any of the polynucleotides described herein may also comprise sequences (donor, homology arms or patch sequences) for targeted insertion into the target gene (e.g., TCRA, TCRB, checkpoint and/or B2M gene). In yet another aspect, a gene delivery vector comprising any of the polynucleotides described herein is provided. In certain embodiments, the vector is an adenoviral vector (e.g., an Ad5/F35 vector) or a lentiviral vector (LV) including integration competent or integration-defective lentiviral vectors or an adeno-associated vector (AAV). Thus, also provided herein are viral vectors comprising a sequence encoding a nuclease (e.g. ZFN or TALEN) and/or a nuclease system (CRISPR/Cas or Ttago) and/or a donor sequence for targeted integration into a target gene. In some embodiments, the donor sequence and the sequences encoding the nuclease are on different vectors. In other embodiments, the nucleases are supplied as polypeptides. In preferred embodiments, the polynucleotides are mRNAs. In some aspects, the mRNA may be chemically modified (See e.g. Kormann et al, (2011) Nature Biotechnology 29(2):154-157). In other aspects, the mRNA may comprise an ARCA cap (see U.S. Pat. Nos. 7,074,596 and 8,153,773). In some aspects, the mRNA may comprise a cap introduced by enzymatic modification. The enzymatically introduced cap may comprise Cap0, Cap1 or Cap2 (see e.g. Smietanski et al, (2014) Nature Communications 5:3004). In further aspects, the mRNA may be capped by chemical modification. In further embodiments, the mRNA may comprise a mixture of unmodified and modified nucleotides (see U.S. Patent Publication 2012-0195936). In still further embodiments, the mRNA may comprise a WPRE element (see U.S. Patent Publication No. 20160326548). In some embodiments, the WPRE element may comprise one or more mutations (see U.S. Pat. No. 7,419,829). In some embodiments, the mRNA is double stranded (See e.g. Kariko et al (2011) Nucl Acid Res 39:e142).

In yet another aspect, the disclosure provides an isolated cell comprising any of the proteins, polynucleotides and/or vectors described herein. In certain embodiments, the cell is selected from the group consisting of a stem/progenitor cell, or a T-cell (e.g., CD4$^+$ T-cell). In a still further aspect, the disclosure provides a CAR+ or a CAR+, modified HLA-E+ and/or HLA-G+ cell or cell line which is descended from a cell or line comprising any of the proteins, polynucleotides and/or vectors described herein, namely a cell or cell line descended (e.g., in culture) from a cell in which TCR and/or B2M has been inactivated by one or more ZFNs and/or in which a donor polynucleotide (e.g. ACTR and/or CAR) has been stably integrated into the genome of the cell. Thus, descendants of cells as described herein may not themselves comprise the proteins, polynucleotides and/or vectors described herein, but, in these cells, a TCR and/or B2M gene is inactivated and/or a donor polynucleotide is integrated into the genome and/or expressed.

In another aspect, described herein are methods of inactivating at least one TCR gene in a cell (e.g., T-cell) and providing for the expression of an exogenous CAR in a cell by introducing one or more proteins, polynucleotides and/or vectors into the cell as described herein. In any of the methods described herein the nucleases may induce targeted mutagenesis, deletions of cellular DNA sequences, and/or facilitate targeted recombination at a predetermined chromosomal locus. Thus, in certain embodiments, the nucleases delete and/or insert one or more nucleotides from or into the target gene. In some embodiments the TCR and/or HLA gene is inactivated by nuclease cleavage followed by non-homologous end joining. In other embodiments, a genomic sequence in the target gene is replaced, for example using a nuclease (or vector encoding said nuclease) as described herein and a "donor" sequence (e.g., CAR) that is inserted into the gene following targeted cleavage with the nuclease. The donor sequence may be present in the nuclease vector, present in a separate vector (e.g., AAV, Ad or LV vector) or, alternatively, may be introduced into the cell using a different nucleic acid delivery mechanism. In any of the methods described herein, the nuclease(s) and donors may be co-administered or administered sequentially in any order. Administration of the nuclease(s) and/or one or more donors may be repeated, for example the one or more donors (e.g., one or more CARs) may be administered before, with and/or after a single nuclease (one, two, three, four or more nucleases targeted to different genes) administration; the one or more donors may be administered repeatedly before, with and/or after a single nuclease administration; or the one or more donors may be administered repeatedly before, with and/or after repeated nuclease administrations. In certain embodiments, TRAC, CISH and/or B2M-specific nucleases and one or more CAR donors are co-administered to provide a multi-knockout CAR-expressing cell in a single editing step method. In some embodiments, the methods further comprise inactivating one or more additional genes (e.g., immunological checkpoint such as CISH, PD1 or CTLA4) and/or integrating one or more transgenes into the genome of the cell, including, but not limited to, integration of one or more transgenes into the inactivated TCR (and optionally additional genes B2M gene, etc.) and/or into one or more safe harbor genes. In certain embodiments, the methods described herein result in a population of cells in which at least 80-100% (or any value therebetween), including least 90-100% (or any value therebetween) of the cells include the knockout(s) and/or the integrated transgene(s).

Furthermore, any of the methods described herein can be practiced in vitro, in vivo and/or ex vivo. In certain embodiments, the methods are practiced ex vivo, for example to modify T-cells, to make them useful as therapeutics in an autologous or allogenic setting to treat a subject (e.g., a subject with cancer). Non-limiting examples of cancers that can be treated and/or prevented include lung carcinomas, pancreatic cancers, liver cancers, bone cancers, breast cancers, colorectal cancers, leukemias, ovarian cancers, lymphomas, brain cancers and the like.

In another aspect, described herein is a method of integrating one or more transgenes into a genome of an isolated cell, the method comprising: introducing, into the cell, (a) one or more donor vectors (e.g., AAVs, plasmids, Ads, mRNAs, etc.) comprising the one or more transgenes and (b) at least one non-naturally occurring nuclease in mRNA form, wherein the at least one nuclease cleaves the genome of the cell such that the one or more transgenes are integrated into the genome of the cell (e.g., one or more CAR gene(s) or CAR-HLA-E or CAR-HLA-G expression construct into a TCR or HLA receptor), wherein the donor vector is introduced into introduced into the electroporation buffer comprising the isolated cell and the mRNA immediately before or immediately after electroporation of the nuclease into the cell. In certain embodiments, the donor vector is introduced into the electroporation buffer after electroporation and prior to transfer of the cells into a culture medium. See, e.g., U.S. Publication Nos. 20150174169 and 20150110762. The methods may be used to introduce the CAR transgene(s) or CAR-HLA-E or CAR-HLA-G expression construct into any genomic location, including, but not limited to, a TCR gene, a B2M gene and/or a safe harbor gene.

BRIEF DESCRIPTION OF THE DRAWINGS

FIG. 2B shows the transfected K562 cells after 6-TG selection and demonstrates that nearly all the cells (98.3%) were positive for CD19 expression.

FIGS. 3A through 3C are graphs depicting the results from a FACS assay used to analyze the effect of T cells on the target cells. CD19+ K562 (as shown in FIG. 2) were mixed in a 1:1 ratio with unmodified normal K562 cells. The cells were labeled using a CellTrace™ proliferation dye, then co-cultured with T-cells. Cells were co-cultured for three hours, washed, stained with a CD19 antibody and then the percent of CD19+ K562 was assessed by FACS. In the absence of T-cells, the CellTrace™ positive population (i.e. CD19+ K562 and normal (CD19−) K562 exhibited approximately 50%: 50% ratio as expected (FIG. 3A). When co-cultured with T cells that had been either edited by TCRA-specific ZFN without CD19-CAR donor (FIG. 3C, "Controls-TRAC+Target"), or were untreated (FIG. 3B, "Controls-Target+UT"), no K562 cytotoxicity was observed.

FIGS. 4A and 4B are a series of panels showing the effective killing of cells comprising a CD19 antigen over a range of effector cells to target cells ("E:T" ratio). As before, the target cells are a 50:50 mixture of CD19 bearing K562 cells and naïve K562 cells. FIG. 4A depicts the results using T cells with a CD19-CAR integrated into the B2M gene while FIG. 4B depicts the results where the CD19-CAR is integrated into the TCRA gene. The left most panel for both data sets depicts an E:T ratio of 2:1 where twice the amount of T cells are present as compared with the target cells, while the right most panel depicts the results from an E:T ratio of 0.125:1, and the panels on the middle show the results from E:T ratios intermediate between the two. The data demonstrates that the naïve (CD19−) K562 cells are not killed by the T cells bearing the CD19-CAR while the killing of the K562 cells with a CD19 antigen correlates with the amount of effector cells used.

FIGS. 6A and 6B show scans of cells with no ZFN treatment (FIG. 6A) or no CD19-CAR donor treatment (FIG. 6B). FIGS. 6C and 6D show the results when the cells have been treated with nucleases directed to B2M and TCRA but have not been treated with the CAR donor. FIG. 6C shows the results following nuclease cleavage and demonstrates that 80% of the cells exhibit a double knock out phenotype. FIGS. 6E and 6F show the results when the cells are treated both with the nucleases and the CD19-CAR donor comprising TRAC homology arms. FIG. 6F shows that 63.4% of the cells express the CD19-CAR.

FIGS. 10A through 10C show FACS analysis of cells shows results of FACS analysis of healthy donor T cells treated with: TRAC-targeted nucleases (FIG. 10A) and B2M-nucleases (FIG. 10B) as well as a CAR donor (FIG. 10C). FIG. 10A shows that over 94% of the double-knockout, CAR transgene cells were CD3 negative (were TRAC knockouts); FIG. 10B shows that over 88% of the treated cells were HLA negative (were B2M knockouts); and FIG. 10C shows that over 76% of the double knockout cells (TRAC and B2M) expressed the CAR donor.

In FIG. 12A, T cells have been treated with ZFNs to specifically knock out B2M, TRAC and CISH while the results for integrating a GFP-expressing transgene into the TRAC locus, FIG. 12B shows hypothetical results for similarly treating T cells with a transgene that expresses a CD19 CAR.

FIG. 13 discloses "$(G_4S)_4$" as SEQ ID NO: 69.

FIGS. 14A through 14C are plots depicting the insertion of the B2M-HLA-G fusion transgene into the TRAC gene.

FIG. 14A shows the results of cleavage with the TRAC-specific ZFN pair SBS #68877/SBS #68876 and demonstrates that the TRAC gene was knocked out at a 97% frequency as measured by the presence or absence of the CD3 subunit of the TCR (left panel). Similarly, B2M was knocked out at an 81% frequency by the SBS #57071/SBS #57531 ZFN pair as measured by the loss of the HLA complex on the cell surface (right panel). FIGS. 14B and 14C depict intracellular (FIG. 14B) and surface (FIG. 14C) staining for both HLA-G and B2M (left and right panels, respectively). As shown, HLA-G was expressed at high levels intracellularly and B2M expressed from the HLA-B2M construct was detected both intracellularly and on the surface of the cells.

FIGS. 15A and 15B show FACS and MiSeq analysis of CD4 and CD8 cells treated with the indicated B2M donor constructs (GFP transgene) and B2M-targeted nucleases. FIG. 15A shows FACS analysis; the panel on the far left shows donor only (no nucleases); the panel second from the left shows cells treated with PGK promoter-driven GFP donor constructs including long homology arms (~1 Kb each) and no molecular tag to assess targeted integration efficiency via next generation sequencing (i.e. "Miseq tag") and B2M-targeted nucleases; the middle panel shows cells treated with PGK promoter-driven GFP donor constructs including short homology arms (250 bp each arm) and a Miseq tag and B2M-targeted nucleases; the panel second from the right shows cells treated with donor constructs including short homology arms and a WPRE sequence; and the panel on the far right shows cells treated with treated with donor constructs including short homology arms and TCRa enhancer sequence. FIG. 15B shows results of MiSeq molecular analysis and quantification of the flow cytometric expression results from 15A.

FIG. 16 is a schematic depicting an exemplary donor for transgene delivery comprising homology arms (e.g., to TRAC or B2M) flanking a promoter sequence, a transgene (e.g., CAR, B2M, HLA-E and/or HLA-G, etc.). Additional components that may be included are enhancer sequences, WPRE sequences, 5' and 3' UTRs, poly A sequences and the like.

FIG. 17 shows results of the MiSeq molecular analysis of indels and targeted integration at the TRAC and B2M target genes following transfections of the indicated ZFNs and/or donors. Sample "01_Mock" ("1") refers to mock transfections; Sample "02_TRAC+B2M" ("2") refers to cells transfected with TRAC and B2M ZFNs only; Sample 3 "03_site_E_423_493_hpGK_GFP-Miseq" ("3") refers to cells transfected with a donor containing a left arm of 423 bp and a right arm of 393 bp with homology to TRAC site E flanking a GFP transgene driven by the hPGK promotor. The donor also contains a 'miseq tag' that allows quantitation of TI into the TRAC locus by miseq. In sample 3 this donor was added alone, without ZFNs. Sample "04 TRAC+B2M site_E_423_493_hpGK_GFP-Miseq" contains the ZFNs from sample 3 as well as the donor from sample 4. Sample "05 TRAC+B2M site_E_AAV_hpGK_GFP" contains the ZFNs from sample 3 as well as a donor with a left arm of 1000 bp and a right arm of 992 bp with homology to TRAC site E flanking a GFP transgene driven by the hPGK promotor. The donor does not contain a 'miseq tag'. Sample "06 TRAC+B2M site_E_350-393_hpGK_GFP-WPRE-Miseq" contains the ZFNs from sample 3 and a donor containing a left arm of 350 bp and a right arm of 393 bp with homology to TRAC site E flanking a GFP transgene driven by the hPGK promotor and followed by a mutated WPRE element. The donor also contains a 'miseq tag'.

Sample "07 TRAC+B2M site_E_423-393_hpGK_FMC63-CD8BBZ-Miseq" contains the ZFNs from sample 3 and a donor containing a left arm of 423 bp and a right arm of 393 bp with homology to TRAC site E flanking a FMC63-CD8BBZ CAR transgene driven by the hPGK promotor. The donor also contains a 'miseq tag'. Sample "08 TRAC+B2M site_E_423-393_hpGK_FMC63-CD8BBZ-Miseq" contains the ZFNs from sample 3 and a donor containing a left arm of 423 bp and a right arm of 393 bp with homology to TRAC site E flanking a FMC63-CD8BBZ CAR transgene driven by the hPGK promotor and followed by a mutated WPRE element. The donor also contains a 'miseq tag'. Sample "09 TRAC+B2M site_E_350-393_hpGK_FMC63-CD8BBZ-P2A-B2M-HLA-E-WPREm-Miseq" contains the ZFNs from sample 3 and a donor containing a left arm of 360 bp and a right arm of 393 bp with homology to TRAC site E flanking a FMC63-CD8BBZ CAR transgene linked by a self-cleaving P2A peptide to a fusion protein expressing B2M and HLA-E. The transgene is driven by the hPGK promotor and followed by a mutated WPRE element. The donor also contains a 'miseq tag'. Sample "10 TRAC+B2M site_E_350-393_hpGK_FMC63-CD8BBZ-P2A-B2M-HLA-G-WPREm-Miseq" contains the ZFNs from sample 3 and a donor containing a left arm of 360 bp and a right arm of 393 bp with homology to TRAC site E flanking a FMC63-CD8BBZ CAR transgene linked by a self-cleaving P2A peptide to a fusion protein expressing B2M and HLA-G. The transgene is driven by the hPGK promotor and followed by a mutated WPRE element. The donor also contains a 'miseq tag'.

Figure 18B:
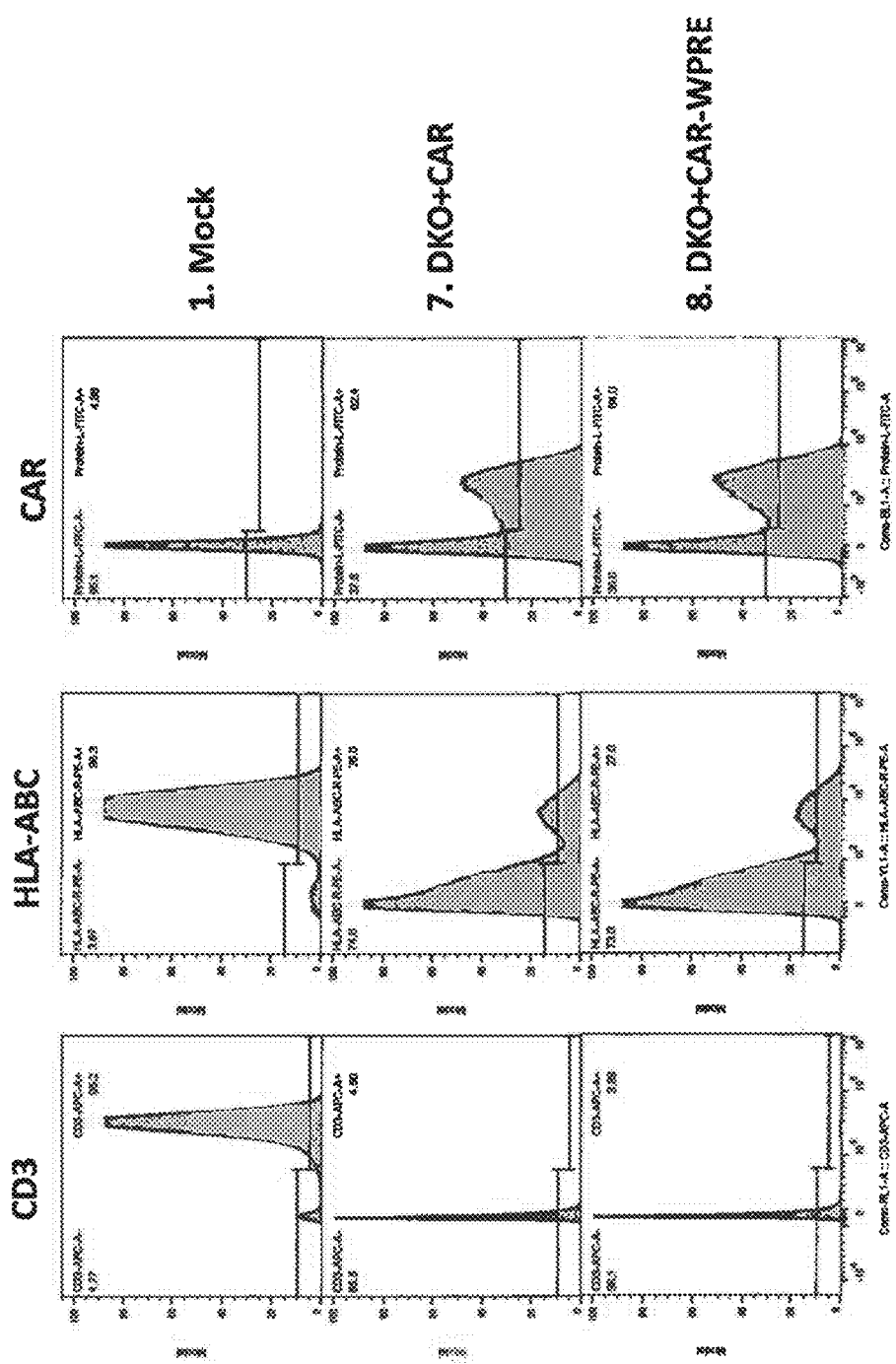
Figure 18D:
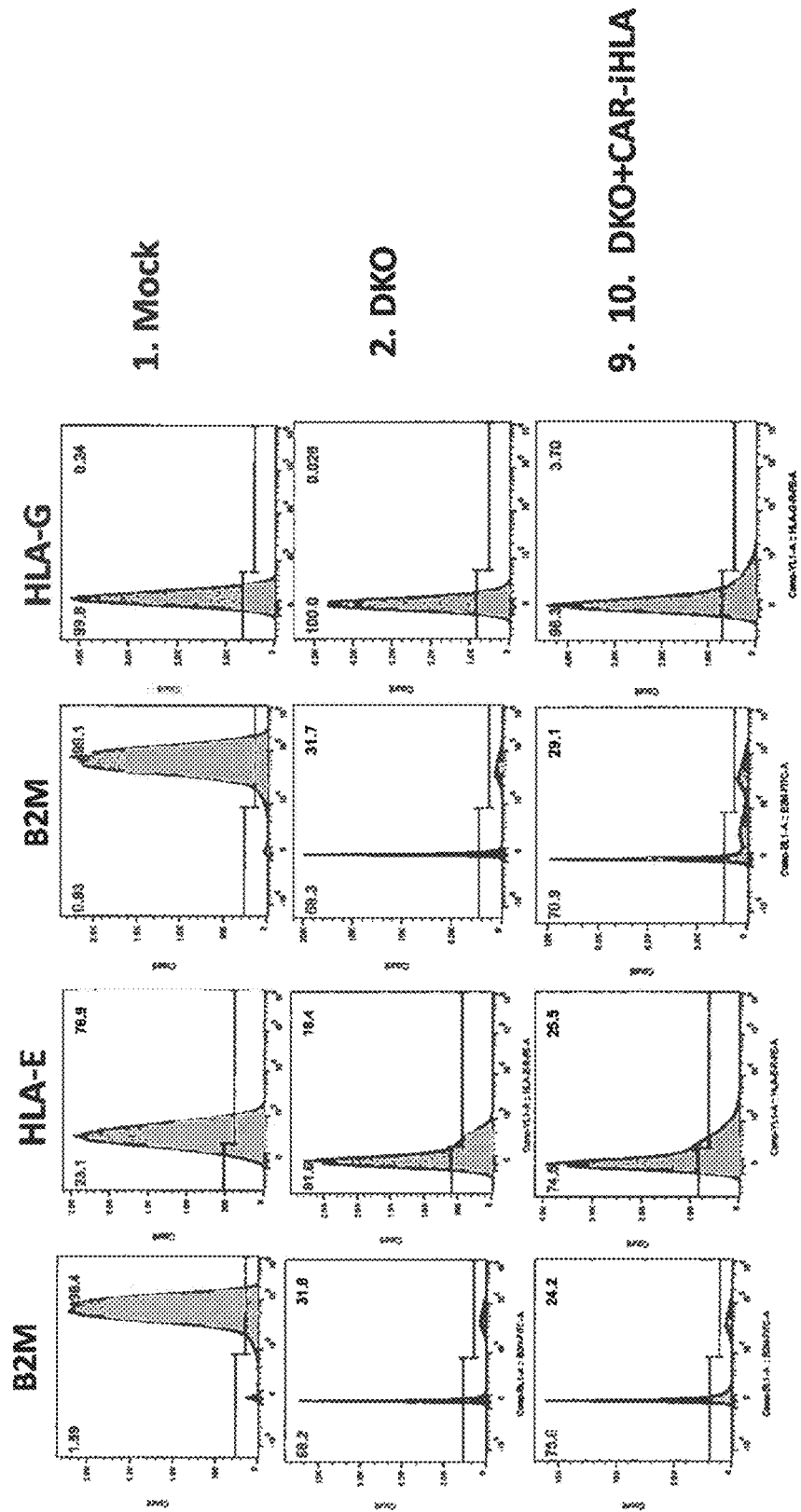

FIG. 18A through 18D show results of FACS analysis of targeted integration into healthy donor T cells treated with TRAC- and B2M targeted nucleases (referred to as "DKO" for double-knockout) as well as a donor. FIG. 18A shows expression results following mock transfections (top panel); DKO cells with targeted integration using a GFP donor including long homology arms (sample 5 in FIG. 17) (middle panel); and DKO cells with targeted integration using a GFP donor with short homology arms and a WPRE sequence (sample 6 in FIG. 17) (bottom panel). FIG. 18B shows expression results following mock transfections (top panel); DKO cells with targeted integration using a CAR donor with short homology arms (sample 7 in FIG. 17) (middle panel); and DKO cells with targeted integration using a CAR donor with short homology arms including a WPRE sequence (sample 8 in FIG. 17) (bottom panel). FIG. 18C shows expression results in DKO cells with targeted integration using CAR and HLA-E donors (sample 9 in FIG. 17) (top panel); and DKO cells with targeted integration using CAR and HLA-G donors with (sample 10 in FIG. 17) (bottom panel). FIG. 18D shows results following mock transfections (Sample 1 of FIG. 17 top panel); DKO cells without a donor (sample 2 of FIG. 17) (middle panel); and DKO cells with CAR and HLA-E or HLA-G donor (left two panels sample 9 or right tow panels sample 10 of FIG. 17) (bottom panel).

FIG. 19 shows results of the MiSeq molecular analysis of indels following transfections of the indicated ZFNs and/or donors. Cells treated with TRAC and B2M ZFNs create double-knockouts (referred to as DKO). Sample "01_Mock" ("1") refers to mock transfections; Sample "02_TRAC+B2M" ("2") refers to cells transfected with TRAC and B2M ZFNs only; Sample 3 "_pAAV_TRAC_E_1000_992_hPGK_HLA_G only" ("3") refers to cells transfected with a donor containing a left arm of 1000 bp and a right arm of 992 bp with homology to TRAC site E flanking a HLA-G transgene driven by the hPGK promotor. Sample 4 "_pAAV_TRAC_E_1000_992_hPGK_HLA_E0101 only" ("4") refers to cells transfected with a donor containing a left arm of 1000 bp and a right arm of 992 bp with homology to TRAC site E flanking an HLA-E0101 transgene driven by the hPGK promotor. Sample 5 "_pAAV_TRAC_E_1000_992_hPGK_HLA_E0103 only" ("5") refers to cells transfected with a donor containing a left arm of 1000 bp and a right arm of 992 bp with homology to TRAC site E flanking an HLA-E0103 transgene driven by the hPGK promotor. Sample 6 "_pAAV_TRAC_E_1000_992_hPGK_HLA_G" ("6") refers to cells transfected with the ZFNs from sample 2 and a donor containing a left arm of 1000 bp and a right arm of 992 bp with homology to TRAC site E flanking an HLA-G transgene driven by the hPGK promotor. Sample 7 "_pAAV_TRAC_E_1000_992_hPGK_B2M_G4S_2_noSP_HLA_G" ("7") refers to cells transfected with the ZFNs from sample 2 and a donor containing a left arm of 1000 bp and a right arm of 992 bp with homology to TRAC site E flanking a linked B2M HLA-G transgene driven by the hPGK promotor. The linker between B2M and HLA-G contains 2 copies of the G4S peptide (SEQ ID NO: 68). HLA-G does not contain a signal peptide. Sample 8 "_pAAV_TRAC_E_1000_992_hPGK_B2M_G4S_2_noSP_HLA_G" ("8") refers to cells transfected with the ZFNs from sample 2 and a donor containing a left arm of 1000 bp and a right arm of 992 bp with homology to TRAC site E flanking a linked B2M HLA-G transgene driven by the hPGK promotor. The linker between B2M and HLA-G contains 4 copies of the G4S peptide (SEQ ID NO: 68). HLA-G does not contain a signal peptide. Sample 9 "_pAAV_TRAC_E_1000_992_hPGK_B2M_G4S_2_noSP_HLA_G" ("9") refers to cells transfected with the ZFNs from sample 2 and a donor containing a left arm of 1000 bp and a right arm of 992 bp with homology to TRAC site E flanking a linked B2M HLA-G transgene driven by the hPGK promotor. The linker between B2M and HLA-G contains 6 copies of the G4S peptide (SEQ ID NO: 68). HLA-G does not contain a signal peptide. Sample 10 "_pAAV_TRAC_E_1000_992_hPGK_HLA_E0101" ("10") refers to cells transfected with the ZFNs from sample 2 and a donor containing a left arm of 1000 bp and a right arm of 992 bp with homology to TRAC site E flanking an HLA-E0101 transgene driven by the hPGK promotor. Sample 11 "_pAAV_TRAC_E_1000_992_hPGK_HLA_E0101" ("11") refers to cells transfected with the ZFNs from sample 2 and a donor containing a left arm of 1000 bp and a right arm of 992 bp with homology to TRAC site E flanking an HLA-E0103 transgene driven by the hPGK promotor. Sample 12 "_pAAV_TRAC_E_1000_992_hPGK_B2M_noSP_HLA_E0101" ("12") refers to cells transfected with the ZFNs from sample 2 and a donor containing a left arm of 1000 bp and a right arm of 992 bp with homology to TRAC site E flanking a linked B2M HLA-E0101 transgene driven by the hPGK promotor. The linker between B2M and HLA-E0101 contains 4 copies of the G4S peptide (SEQ ID NO: 68). HLA-E0101 does not contain a signal peptide. Sample 13 "_pAAV_TRAC_E_1000_992_hPGK_B2M noSP_HLA_E0103" ("13") refers to cells transfected with the ZFNs from sample 2 and a donor containing a left arm of 1000 bp and a right arm of 992 bp with homology to TRAC site E flanking a linked B2M HLA-E0101 transgene driven by the hPGK promotor. The linker between B2M and HLA-E0101 contains 4 copies of the G4S peptide (SEQ ID NO: 68). HLA-E0103 does not contain a signal peptide. Sample 14 "pAAV_TRAC_E_1000_992_pgk_gfp" ("14") refers to cells transfected with the ZFNs from sample 2 and a donor containing a left arm of 1000 bp and a right arm of 992 bp with homology to TRAC site E flanking a GFP transgene driven by the hPGK promoter. Sample 15 "pAAV_TRAC_E_350_393_hPGK_CAR_B2M_HLA_G_WPREm_Miseq" ("15") refers to cells transfected with the ZFNs from sample 2 and a donor containing a left arm of 360 bp and a right arm of 393 bp with homology to TRAC site E flanking a FMC63-CD8BBZ CAR transgene linked by a self-cleaving P2A peptide to a fusion protein expressing B2M and HLA-G. The transgene is driven by the hPGK promotor and followed by a mutated WPRE element. The donor also contains a 'miseq tag.'

Figure 20:
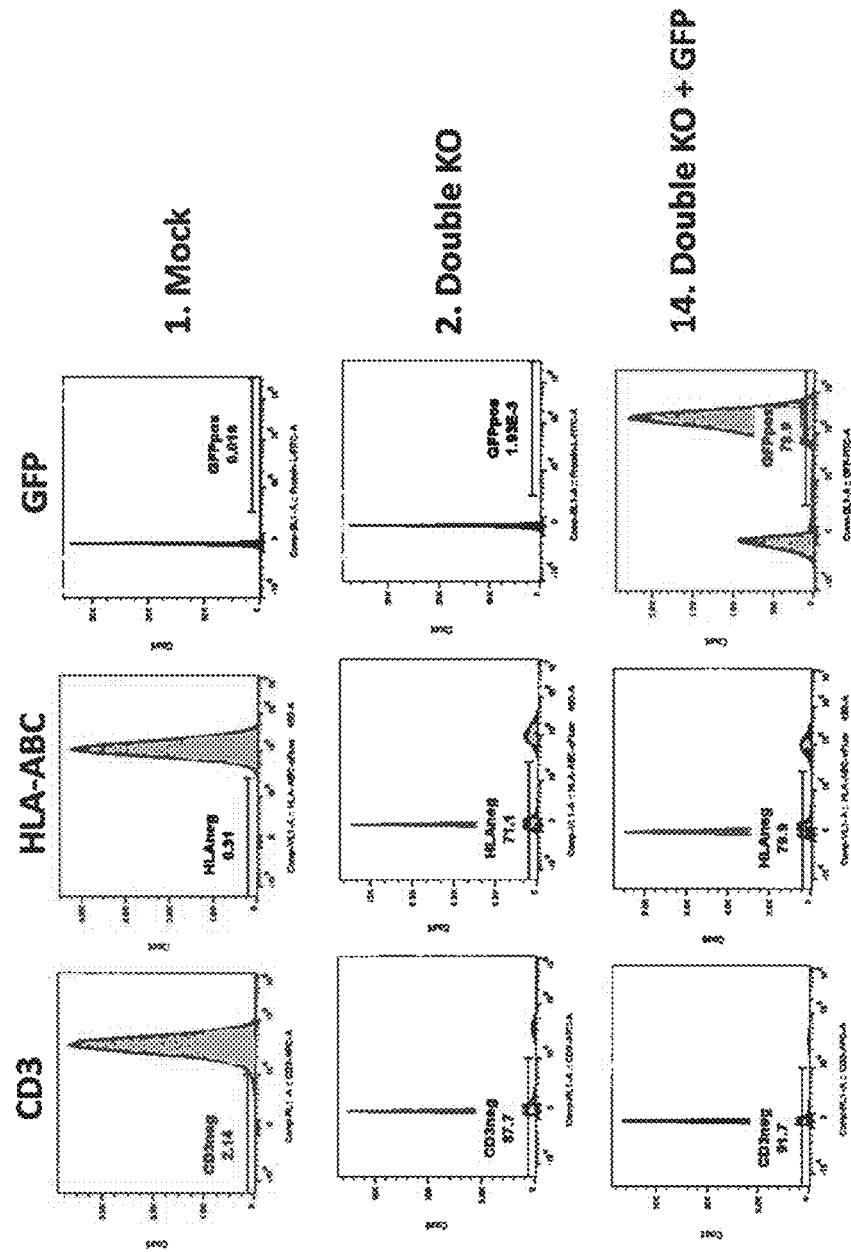

FIG. 20 shows results of FACS analysis of targeted integration into healthy donor T cells treated as indicated. Cells treated with TRAC and B2M ZFNs are referred to as "DKO" (for double-knockout). The top panels show expression of CD3, HLA-ABC and GFP following mock transfections (sample 1 in FIG. 19); the middle panels show expression of the same proteins in DKO cells and no donor (sample 2 in FIG. 19); and the bottom panel shows expression in and DKO cells also treated with a GFP donor (sample 14 in FIG. 19).

Figure 21:
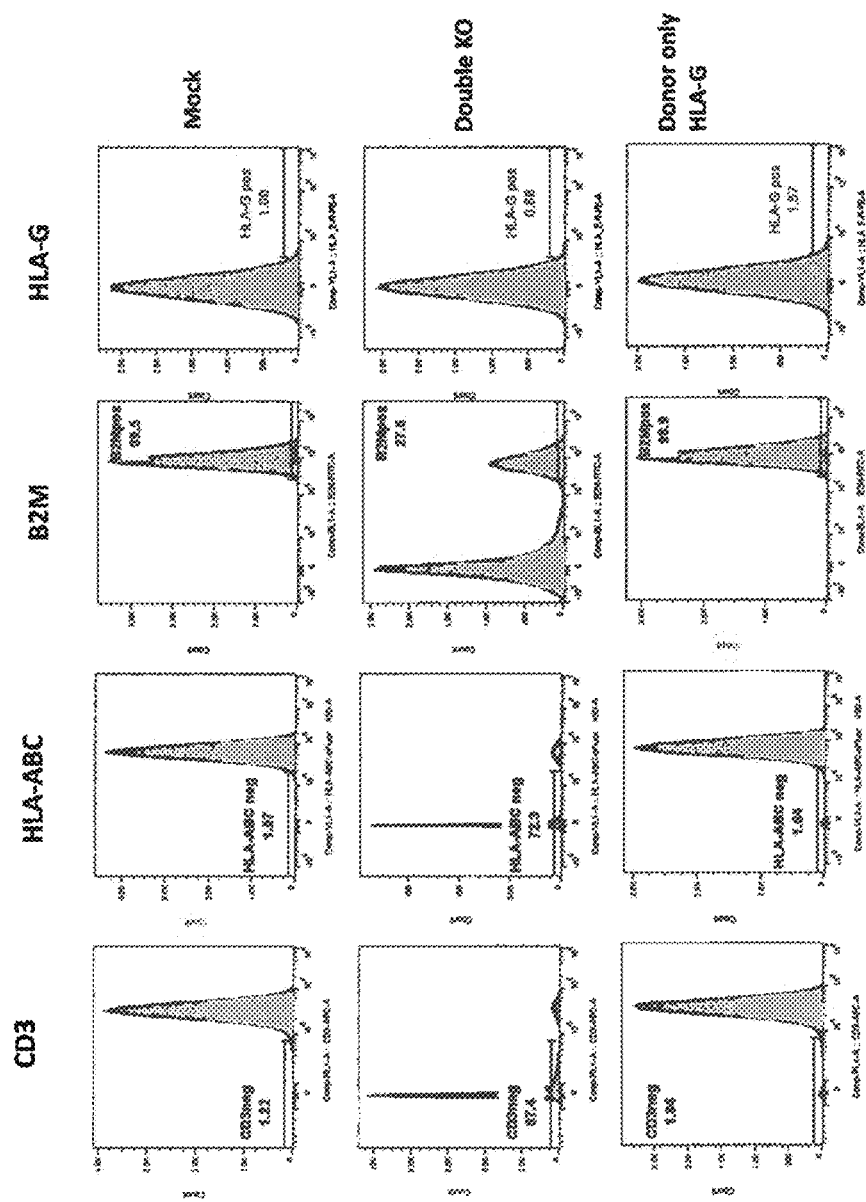

FIG. 21 shows results of FACS analysis of targeted integration into healthy donor T cells treated as indicated. Cells treated with TRAC and B2M ZFNs are referred to as "DKO" (for double-knockout). The top panels show expression of the indicated proteins (CD3, HLA-ABC, B2M and HLA-G) following mock transfections (sample 1 in FIG. 19); the middle panels show expression of the same proteins in TRAC/B2M DKO cells and no donor (sample 2 in FIG. 19); and the bottom panel shows expression in cells treated only with HLA-G donor (sample 3 in FIG. 19).

Figure 22:
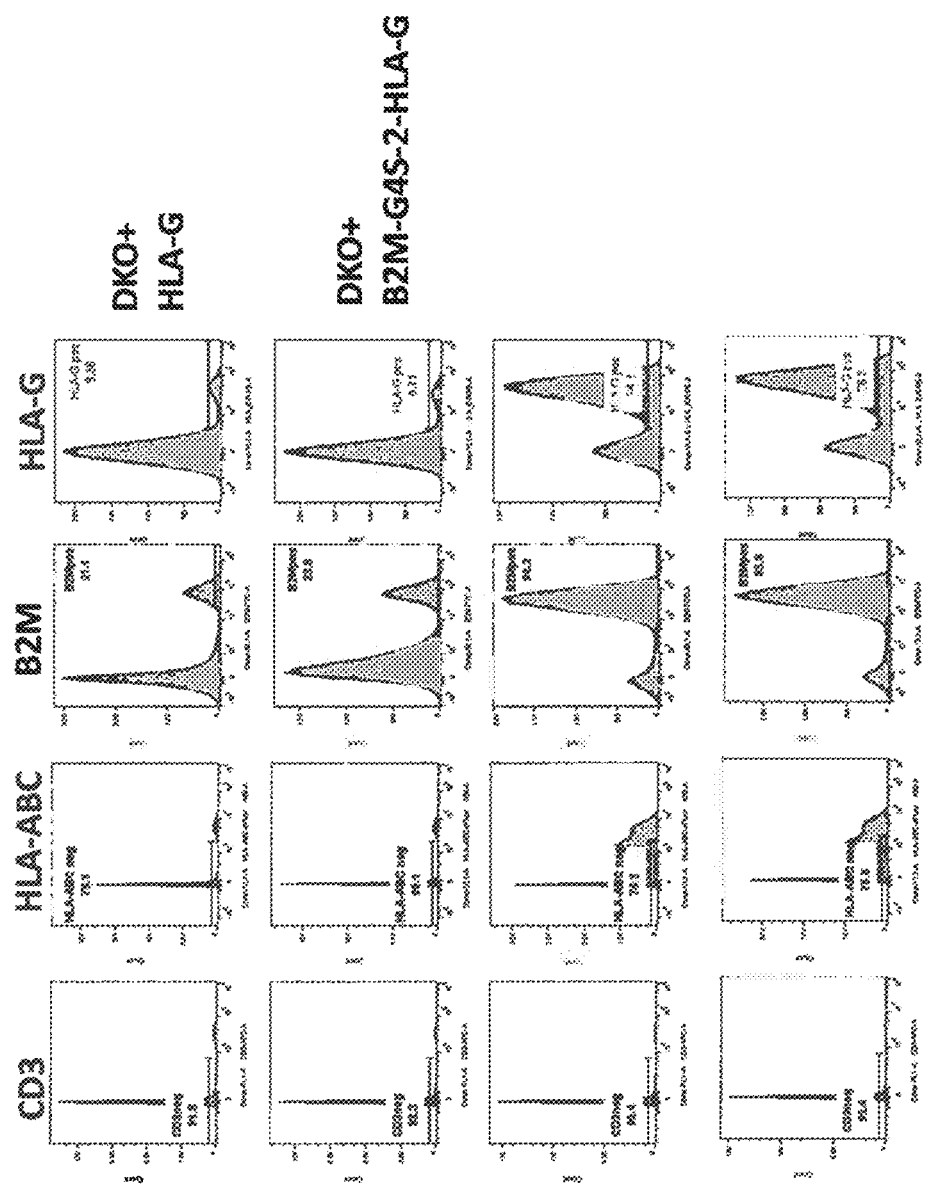

FIG. 22 shows results of FACS analysis of targeted integration into healthy donor T cells treated as indicated. Cells treated with TRAC and B2M ZFNs are referred to as "DKO" (for double-knockout). The top panels show expression of the indicated proteins (CD3, HLA-ABC, B2M and HLA-G) following transfection of an HLA-G donor into DKO cells (sample 6 in FIG. 19); the panels second from the top show expression of the same proteins following transfection of a donor including B2M and HLA-G transgenes in DKO cells (sample 7 in FIG. 19); the panels second from the bottom show expression of the same proteins following transfection of a donor including B2M and HLA-G transgenes in DKO cells (sample 8 in FIG. 19); and the bottom panels show expression of the same proteins following transfection of a donor including B2M and HLA-G transgenes in DKO cells (sample 9 in FIG. 19).

Figure 23:
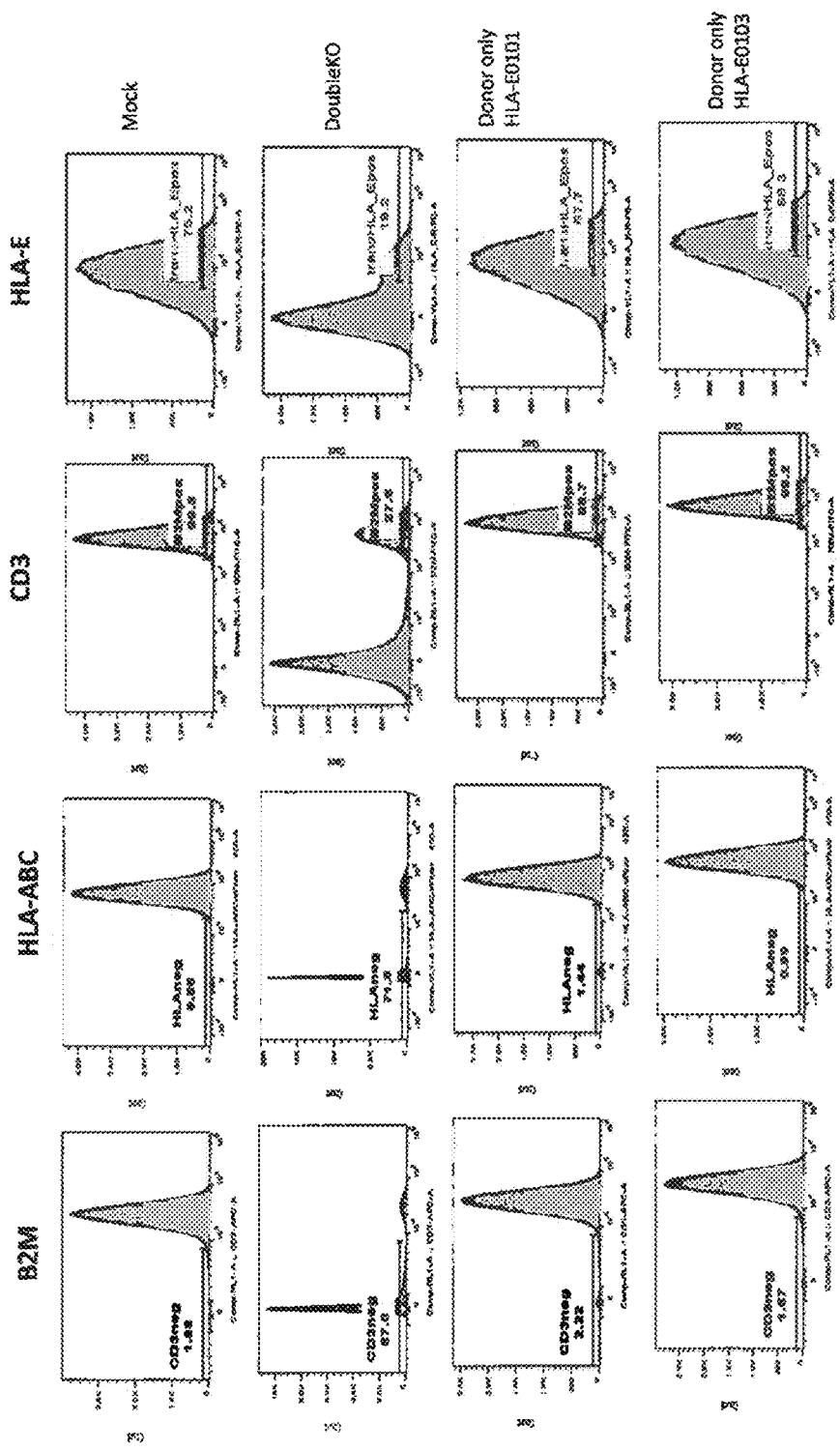

FIG. 23 shows results of FACS analysis of targeted integration into healthy donor T cells treated as indicated. Cells treated with TRAC and B2M ZFNs are referred to as "DKO" (for double-knockout). The top panels show mock transfections (no donor or ZFN, sample 1 in FIG. 19); the panels second from the top show expression of the indicated proteins (CD3, HLA-ABC, B2M and HLA-E) in DKO cells (sample 2 in FIG. 19); the panels second from the bottom show expression of the same proteins following transfection of an HLA-E donor only (sample 4 in FIG. 19); and the bottom panels show expression of the same proteins following transfection of an HLA donor only (sample 5 in FIG. 19).

Figure 24:
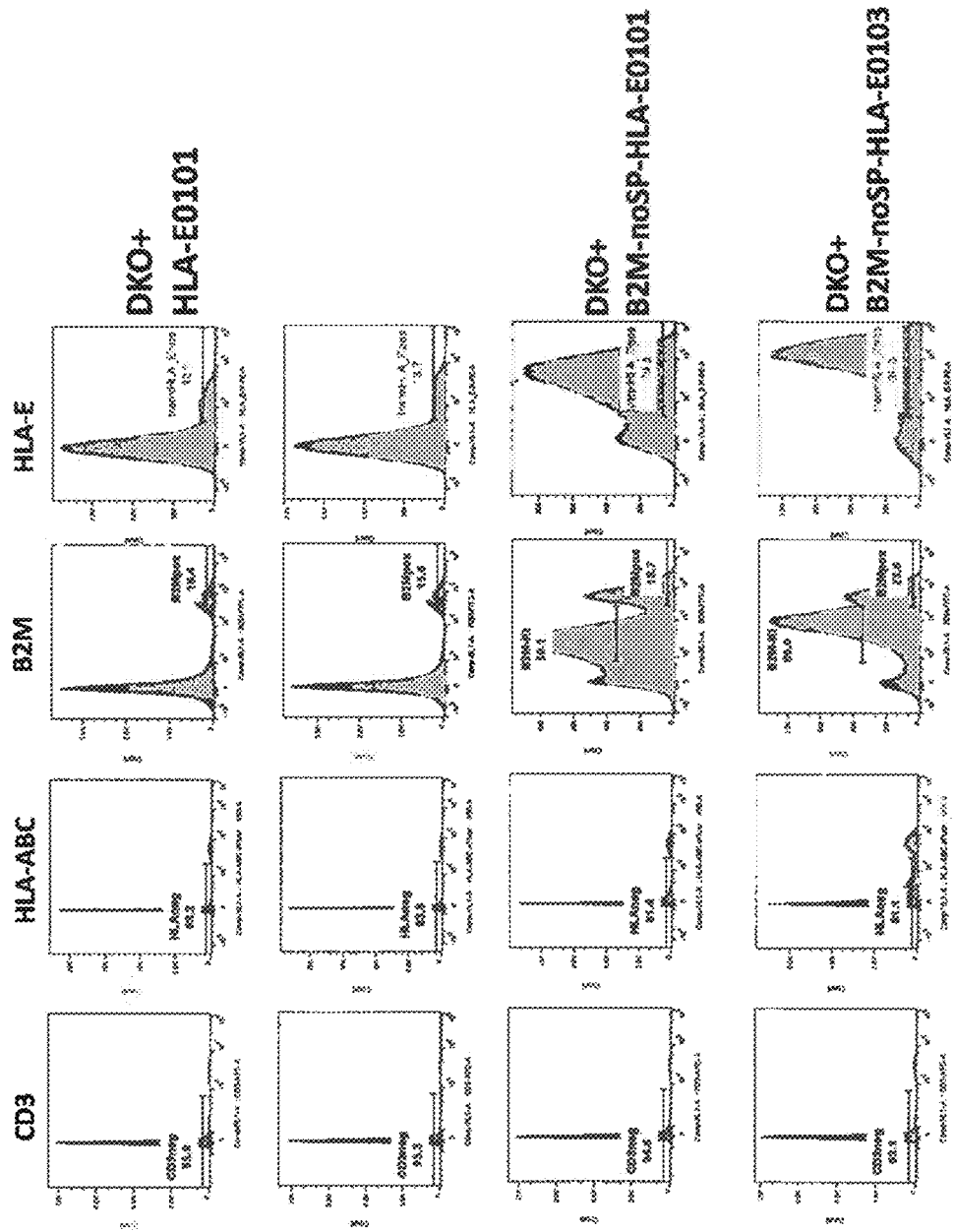

FIG. 24 shows results of FACS analysis of targeted integration into healthy donor T cells treated as indicated. Cells treated with TRAC and B2M ZFNs are referred to as "DKO" (for double-knockout). The top panels show expression of the indicated proteins (CD3, HLA-ABC, B2M and HLA-E) in DKO cells with the HLA-E0101 donor construct (sample 10 in FIG. 19); the panels second from the top show expression of the indicated proteins in DKO cells with the HLA-E0103 donor construct (sample 11 in FIG. 19); the panels second from the bottom show expression of the same proteins following transfection of a B2M and HLA-E donor in DKO cells (sample 12 in FIG. 19); and the bottom panels show expression of the same proteins following transfection of a B2M and HLA-E donor in DKO cells (sample 13 in FIG. 19).

Figures 25, 26:
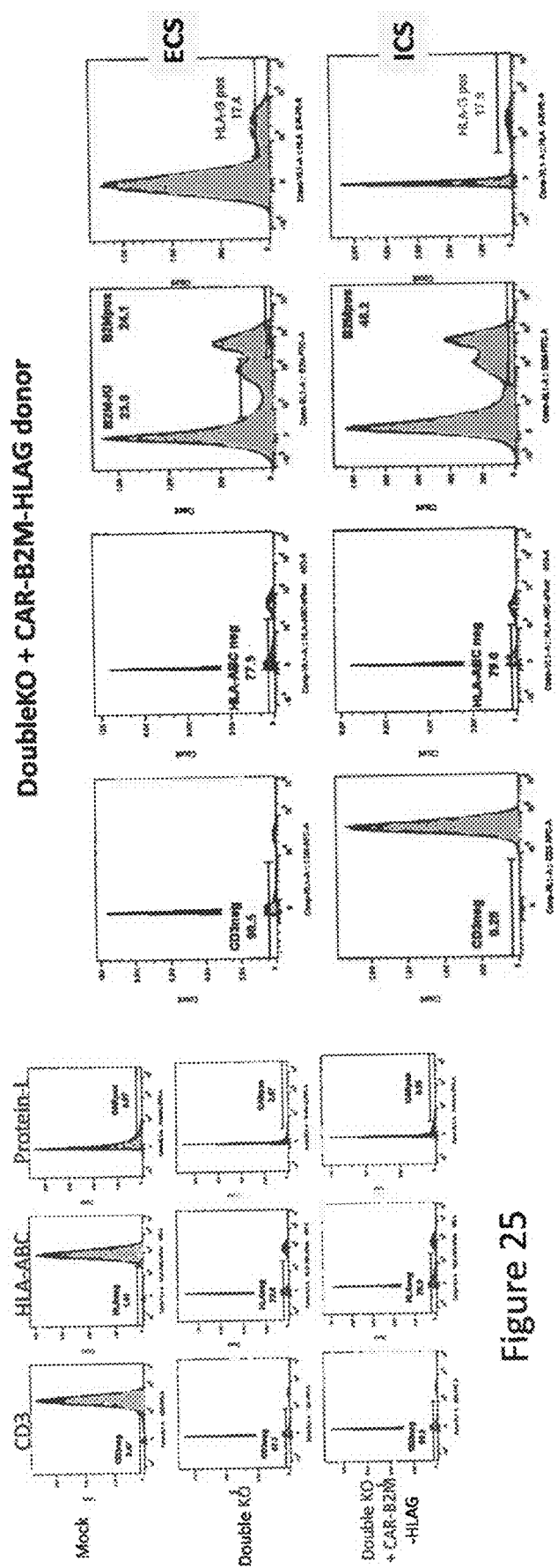

FIG. 25 shows results of FACS analysis of targeted integration into healthy donor T cells treated as indicated. Cells treated with TRAC and B2M ZFNs are referred to as "DKO" (for double-knockout). The top panels show expression of the indicated proteins (CD3, HLA-ABC, and Protein L=CAR) following mock transfections (sample 1 in FIG. 19); the middle panels show expression of the same proteins in TRAC/B2M DKO cells (sample 2 in FIG. 19) and no donor; and the bottom panel shows expression in DKO cells treated with a CAR-B2M-HLA-G donor (sample 15 in FIG. 19).

FIG. 26 shows results of FACS analysis evaluating expression of the indicated proteins (CD3, HLA-ABC, B2M and HLA-G) on the cell surface (top panels labeled ECS) and intracellularly (bottom panels labeled ICS) in DKO cells with a CAR-B2M-HLAG donor (sample 15 in FIG. 19).

DETAILED DESCRIPTION

Disclosed herein are compositions and methods for generating T cells in which expression of one or more CAR(s) or CAR and modified HLA-E or HLA-G is effective at killing cells expressing the CAR-targeted antigen. Further, killing is effective when the CAR or CAR-HLA-E or CAR-HLA-G expression construct is integrated into a TCR gene and/or a B2M gene. Cells modified in this manner can be used as therapeutics, for example, in adoptive cell therapy, as the lack of a TCR complex as a result of integration of the CAR into a TCR gene prevents these T cells from targeting other non-antigen bearing cells, while the knockout of the HLA complex through integration of the CAR into B2M eliminates or reduces an HLA-based immune response against the introduced armed T cells. Cells that are further modified to express a modified HLA-E or HLA-G complex also may evade killing by host NK cells. Additionally, other genes of interest may be inserted into cells bearing the CAR and optionally a modified HLA-E or HLA-G, and/or other genes of interest may be knocked out.

General

Practice of the methods, as well as preparation and use of the compositions disclosed herein employ, unless otherwise indicated, conventional techniques in molecular biology, biochemistry, chromatin structure and analysis, computational chemistry, cell culture, recombinant DNA and related fields as are within the skill of the art. These techniques are fully explained in the literature. See, for example, Sambrook et al. MOLECULAR CLONING: A LABORATORY MANUAL, Second edition, Cold Spring Harbor Laboratory Press, 1989 and Third edition, 2001; Ausubel et al., CURRENT PROTOCOLS IN MOLECULAR BIOLOGY, John Wiley & Sons, New York, 1987 and periodic updates; the series METHODS IN ENZYMOLOGY, Academic Press, San Diego; Wolffe, CHROMATIN STRUCTURE AND FUNCTION, Third edition, Academic Press, San Diego, 1998; METHODS IN ENZYMOLOGY, Vol. 304, "Chromatin" (P. M. Wassarman and A. P. Wolffe, eds.), Academic Press, San Diego, 1999; and METH- ODS IN MOLECULAR BIOLOGY, Vol. 119, "Chromatin Protocols" (P. B. Becker, ed.) Humana Press, Totowa, 1999.

Definitions

The terms "nucleic acid," "polynucleotide," and "oligonucleotide" are used interchangeably and refer to a deoxyribonucleotide or ribonucleotide polymer, in linear or circular conformation, and in either single- or double-stranded form. For the purposes of the present disclosure, these terms are not to be construed as limiting with respect to the length of a polymer. The terms can encompass known analogues of natural nucleotides, as well as nucleotides that are modified in the base, sugar and/or phosphate moieties (e.g., phosphorothioate backbones). In general, an analogue of a particular nucleotide has the same base-pairing specificity; i.e., an analogue of A will base-pair with T.

The terms "polypeptide," "peptide" and "protein" are used interchangeably to refer to a polymer of amino acid residues. The term also applies to amino acid polymers in which one or more amino acids are chemical analogues or modified derivatives of corresponding naturally-occurring amino acids.

"Binding" refers to a sequence-specific, non-covalent interaction between macromolecules (e.g., between a protein and a nucleic acid). Not all components of a binding interaction need be sequence-specific (e.g., contacts with phosphate residues in a DNA backbone), as long as the interaction as a whole is sequence-specific. Such interactions are generally characterized by a dissociation constant ($K_d$) of $10^{-6}$ $M^{-1}$ or lower. "Affinity" refers to the strength of binding: increased binding affinity being correlated with a lower $K_d$. "Non-specific binding" refers to, non-covalent interactions that occur between any molecule of interest (e.g. an engineered nuclease) and a macromolecule (e.g. DNA) that are not dependent on target sequence.

A "DNA binding molecule" is a molecule that can bind to DNA. Such DNA binding molecule can be a polypeptide, a domain of a protein, a domain within a larger protein or a polynucleotide. In some embodiments, the polynucleotide is DNA, while in other embodiments, the polynucleotide is RNA. In some embodiments, the DNA binding molecule is a protein domain of a nuclease (e.g. the FokI domain), while in other embodiments, the DNA binding molecule is a guide RNA component of an RNA-guided nuclease (e.g. Cas9 or Cfp1).

A "binding protein" is a protein that is able to bind non-covalently to another molecule. A binding protein can bind to, for example, a DNA molecule (a DNA-binding protein), an RNA molecule (an RNA-binding protein) and/or a protein molecule (a protein-binding protein). In the case of a protein-binding protein, it can bind to itself (to form homodimers, homotrimers, etc.) and/or it can bind to one or more molecules of a different protein or proteins. A binding protein can have more than one type of binding activity. For example, zinc finger proteins have DNA-binding, RNA-binding and protein-binding activity.

A "zinc finger DNA binding protein" (or binding domain) is a protein, or a domain within a larger protein, that binds DNA in a sequence-specific manner through one or more zinc fingers, which are regions of amino acid sequence within the binding domain whose structure is stabilized through coordination of a zinc ion. The term zinc finger DNA binding protein is often abbreviated as zinc finger protein or ZFP. The term "zinc finger nuclease" includes one ZFN as well as a pair of ZFNs (the members of the pair are referred to as "left and right" or "first and second" or "pair") that dimerize to cleave the target gene.

A "TALE DNA binding domain" or "TALE" is a polypeptide comprising one or more TALE repeat domains/units. The repeat domains, each comprising a repeat variable diresidue (RVD), are involved in binding of the TALE to its cognate target DNA sequence. A single "repeat unit" (also referred to as a "repeat") is typically 33-35 amino acids in length and exhibits at least some sequence homology with other TALE repeat sequences within a naturally occurring TALE protein. TALE proteins may be designed to bind to a target site using canonical or non-canonical RVDs within the repeat units. See, e.g., U.S. Pat. Nos. 8,586,526 and 9,458,205. The term "TALEN" includes one TALEN as well as a pair of TALENs (the members of the pair are referred to as "left and right" or "first and second" or "pair") that dimerize to cleave the target gene.

Zinc finger and TALE DNA-binding domains can be "engineered" to bind to a predetermined nucleotide sequence, for example via engineering (altering one or more amino acids) of the recognition helix region of a naturally occurring zinc finger protein or by engineering of the amino acids involved in DNA binding (the repeat variable diresidue or RVD region). Therefore, engineered zinc finger proteins or TALE proteins are proteins that are non-naturally occurring. Non-limiting examples of methods for engineering zinc finger proteins and TALEs are design and selection. A designed protein is a protein not occurring in nature whose design/composition results principally from rational criteria. Rational criteria for design include application of substitution rules and computerized algorithms for processing information in a database storing information of existing ZFP or TALE designs (canonical and non-canonical RVDs) and binding data. See, for example, U.S. Pat. Nos. 9,458,205; 8,586,526; 6,140,081; 6,453,242; and 6,534,261; see also WO 98/53058; WO 98/53059; WO 98/53060; WO 02/016536 and WO 03/016496.

A "selected" zinc finger protein, TALE protein or CRISPR/Cas system is not found in nature and whose production results primarily from an empirical process such as phage display, interaction trap or hybrid selection. See e.g., U.S. Pat. Nos. 5,789,538; 5,925,523; 6,007,988; 6,013,453; 6,200,759; WO 95/19431; WO 96/06166; WO 98/53057; WO 98/54311; WO 00/27878; WO 01/60970; WO 01/88197 and WO 02/099084. In addition, TALE proteins (which typically exhibit a one-to-one correspondence as between RVD and nucleotide bound in the target site) and sgRNAs of CRISPR/Cas systems can readily be designed to ZFP target sites to which ZFPs bind. See, e.g., U.S. Pat. Nos. 9,873,894 and 8,586,526.

"TtAgo" is a prokaryotic Argonaute protein thought to be involved in gene silencing. TtAgo is derived from the bacteria *Thermus thermophilus*. See, e.g. Swarts et al, ibid, G. Sheng et al., (2013) *Proc. Natl. Acad. Sci. U.S.A.* 111, 652). A "TtAgo system" is all the components required including e.g. guide DNAs for cleavage by a TtAgo enzyme.

"Recombination" refers to a process of exchange of genetic information between two polynucleotides. For the purposes of this disclosure, "homologous recombination (HR)" refers to the specialized form of such exchange that takes place, for example, during repair of double-strand breaks in cells via homology-directed repair mechanisms. This process requires nucleotide sequence homology, uses a "donor" molecule to template repair of a "target" molecule (i.e., the one that experienced the double-strand break), and is variously known as "non-crossover gene conversion" or "short tract gene conversion," because it leads to the transfer of genetic information from the donor to the target. Without wishing to be bound by any particular theory, such transfer can involve mismatch correction of heteroduplex DNA that forms between the broken target and the donor, and/or "synthesis-dependent strand annealing," in which the donor is used to resynthesize genetic information that will become part of the target, and/or related processes. Such specialized HR often results in an alteration of the sequence of the target molecule such that part or all of the sequence of the donor polynucleotide is incorporated into the target polynucleotide.

In the methods of the disclosure, one or more targeted nucleases as described herein create a double-stranded break (DSB) in the target sequence (e.g., cellular chromatin) at a predetermined site (e.g. a gene or locus of interest), and a "donor" polynucleotide, having homology to the nucleotide sequence in the region of the break, can be introduced into the cell. The presence of the DSB has been shown to facilitate integration of the donor sequence. Optionally, the construct has homology to the nucleotide sequence in the region of the break. The donor sequence may be physically integrated or, alternatively, the donor polynucleotide is used as a template for repair of the break via homologous recombination, resulting in the introduction of all or part of the nucleotide sequence as in the donor into the cellular chromatin. Thus, a first sequence in cellular chromatin can be altered and, in certain embodiments, can be converted into a sequence present in a donor polynucleotide. Thus, the use of the terms "replace" or "replacement" can be understood to represent replacement of one nucleotide sequence by another, (i.e., replacement of a sequence in the informational sense), and does not necessarily require physical or chemical replacement of one polynucleotide by another.

In any of the methods described herein, additional pairs of zinc-finger proteins can be used for additional double-stranded cleavage of additional target sites within the cell.

In certain embodiments of methods for targeted recombination and/or replacement and/or alteration of a sequence in a region of interest in cellular chromatin, a chromosomal sequence is altered by homologous recombination with an exogenous "donor" nucleotide sequence. Such homologous recombination is stimulated by the presence of a double-stranded break in cellular chromatin, if sequences homologous to the region of the break are present.

In any of the methods described herein, the first nucleotide sequence (the "donor sequence") can contain sequences that are homologous, but not identical, to genomic sequences in the region of interest, thereby stimulating homologous recombination to insert a non-identical sequence in the region of interest. Thus, in certain embodiments, portions of the donor sequence that are homologous to sequences in the region of interest exhibit between about 80 to 99% (or any integer therebetween) sequence identity to the genomic sequence that is replaced. In other embodiments, the homology between the donor and genomic sequence is higher than 99%, for example if only 1 nucleotide differs as between donor and genomic sequences of over 100 contiguous base pairs. In certain cases, a non-homologous portion of the donor sequence can contain sequences not present in the region of interest, such that new sequences are introduced into the region of interest. In these instances, the non-homologous sequence is generally flanked by sequences of 50-1,000 base pairs (or any integral value therebetween) or any number of base pairs greater than 1,000, that are homologous or identical to sequences in the region of interest. In other embodiments, the donor sequence is non-homologous to the first sequence and is inserted into the genome by non-homologous recombination mechanisms.

Any of the methods described herein can be used for partial or complete inactivation of one or more target sequences in a cell by targeted integration of donor sequence that disrupts expression of the gene(s) of interest. Cell lines with partially or completely inactivated genes are also provided.

Furthermore, the methods of targeted integration as described herein can also be used to integrate one or more exogenous sequences. The exogenous nucleic acid sequence can comprise, for example, one or more genes or cDNA molecules, or any type of coding or noncoding sequence, as well as one or more control elements (e.g., promoters). In addition, the exogenous nucleic acid sequence may produce one or more RNA molecules (e.g., small hairpin RNAs (shRNAs), inhibitory RNAs (RNAis), microRNAs (miRNAs), etc.).

"Cleavage" refers to the breakage of the covalent backbone of a DNA molecule. Cleavage can be initiated by a variety of methods including, but not limited to, enzymatic or chemical hydrolysis of a phosphodiester bond. Both single-stranded cleavage and double-stranded cleavage are possible, and double-stranded cleavage can occur as a result of two distinct single-stranded cleavage events. DNA cleavage can result in the production of either blunt ends or staggered ends. In certain embodiments, fusion polypeptides are used for targeted double-stranded DNA cleavage.

A "cleavage half-domain" is a polypeptide sequence which, in conjunction with a second polypeptide (either identical or different) forms a complex having cleavage activity (preferably double-strand cleavage activity). The terms "first and second cleavage half-domains;" "+ and − cleavage half-domains" and "right and left cleavage half-domains" are used interchangeably to refer to pairs of cleavage half-domains that dimerize.

An "engineered cleavage half-domain" is a cleavage half-domain that has been modified so as to form obligate heterodimers with another cleavage half-domain (e.g., another engineered cleavage half-domain). See, also, U.S. Pat. Nos. 7,888,121; 7,914,796; 8,034,598; 8,623,618 and U.S. Patent Publication No. 2011/0201055, incorporated herein by reference in their entireties.

The term "sequence" refers to a nucleotide sequence of any length, which can be DNA or RNA; can be linear, circular or branched and can be either single-stranded or double stranded. The term "donor sequence" refers to a nucleotide sequence that is inserted into a genome. A donor sequence can be of any length, for example between 2 and 10,000 nucleotides in length (or any integer value therebetween or thereabove), preferably between about 100 and 1,000 nucleotides in length (or any integer therebetween), more preferably between about 200 and 500 nucleotides in length.

"Chromatin" is the nucleoprotein structure comprising the cellular genome. Cellular chromatin comprises nucleic acid, primarily DNA, and protein, including histones and non-histone chromosomal proteins. The majority of eukaryotic cellular chromatin exists in the form of nucleosomes, wherein a nucleosome core comprises approximately 150 base pairs of DNA associated with an octamer comprising two each of histones H2A, H2B, H3 and H4; and linker DNA (of variable length depending on the organism) extends between nucleosome cores. A molecule of histone H1 is generally associated with the linker DNA. For the purposes of the present disclosure, the term "chromatin" is meant to encompass all types of cellular nucleoprotein, both prokaryotic and eukaryotic. Cellular chromatin includes both chromosomal and episomal chromatin.

A "chromosome," is a chromatin complex comprising all or a portion of the genome of a cell. The genome of a cell is often characterized by its karyotype, which is the collection of all the chromosomes that comprise the genome of the cell. The genome of a cell can comprise one or more chromosomes.

An "episome" is a replicating nucleic acid, nucleoprotein complex or other structure comprising a nucleic acid that is not part of the chromosomal karyotype of a cell. Examples of episomes include plasmids and certain viral genomes.

A "target site" or "target sequence" is a nucleic acid sequence that defines a portion of a nucleic acid to which a binding molecule will bind, provided sufficient conditions for binding exist. For example, the sequence 5' GAATTC 3' is a target site for the Eco RI restriction endonuclease. The term includes contiguous or non-contiguous base pairs of any sequence as well as a "paired" target site (for example paired target sites for ZFNs and/or TALENs as described herein). Following binding of one or more DNA-binding domains (e.g., ZFP, TALE, single guide RNA) of a nuclease to their respective target sites, cleavage and modification (e.g., donor integration and/or indel modifications) may occur anywhere at or near the target site, including but not limited to, within the sequences bound by the DNA-binding domain, between paired target sites, and/or adjacent to (e.g., within 1-50 (including 1, 2, 3, 4, 5, 6, 7, 8, 9, 10, 11, 12, 13, 14, 15, 16, 17, 18, 19, 20, 21, 22, 23, 24, 25 or more) or more base pairs 3' or 5' to any of the target sites.

An "exogenous" molecule is a molecule that is not normally present in a cell but can be introduced into a cell by one or more genetic, biochemical or other methods. "Normal presence in the cell" is determined with respect to the particular developmental stage and environmental conditions of the cell. Thus, for example, a molecule that is present only during embryonic development of muscle is an exogenous molecule with respect to an adult muscle cell. Similarly, a molecule induced by heat shock is an exogenous molecule with respect to a non-heat-shocked cell. An exogenous molecule can comprise, for example, a functioning version of a malfunctioning endogenous molecule or a malfunctioning version of a normally-functioning endogenous molecule.

An exogenous molecule can be, among other things, a small molecule, such as is generated by a combinatorial chemistry process, or a macromolecule such as a protein, nucleic acid, carbohydrate, lipid, glycoprotein, lipoprotein, polysaccharide, any modified derivative of the above molecules, or any complex comprising one or more of the above molecules. Nucleic acids include DNA and RNA, can be single- or double-stranded; can be linear, branched or circular; and can be of any length. See, e.g., U.S. Pat. Nos. 8,703,489 and 9,255,259. Nucleic acids include those capable of forming duplexes, as well as triplex-forming nucleic acids. See, for example, U.S. Pat. Nos. 5,176,996 and 5,422,251. Proteins include, but are not limited to, DNA-binding proteins, transcription factors, chromatin remodeling factors, methylated DNA binding proteins, polymerases, methylases, demethylases, acetylases, deacetylases, kinases, phosphatases, integrases, recombinases, ligases, topoisomerases, gyrases and helicases.

An exogenous molecule can be the same type of molecule as an endogenous molecule, e.g., an exogenous protein or nucleic acid. For example, an exogenous nucleic acid can comprise an infecting viral genome, a plasmid or episome introduced into a cell, or a chromosome that is not normally present in the cell. Methods for the introduction of exogenous molecules into cells are known to those of skill in the art and include, but are not limited to, lipid-mediated transfer (i.e., liposomes, including neutral and cationic lipids), electroporation, direct injection, cell fusion, particle bombardment, calcium phosphate co-precipitation, DEAE-dextran-mediated transfer and viral vector-mediated transfer. An exogenous molecule can also be the same type of molecule as an endogenous molecule but derived from a different species than the cell is derived from. For example, a human nucleic acid sequence may be introduced into a cell line originally derived from a mouse or hamster.

By contrast, an "endogenous" molecule is one that is normally present in a particular cell at a particular developmental stage under particular environmental conditions. For example, an endogenous nucleic acid can comprise a chromosome, the genome of a mitochondrion, chloroplast or other organelle, or a naturally-occurring episomal nucleic acid. Additional endogenous molecules can include proteins, for example, transcription factors and enzymes.

A "fusion" molecule is a molecule in which two or more subunit molecules are linked, preferably covalently. The subunit molecules can be the same chemical type of molecule, or can be different chemical types of molecules. Examples of the first type of fusion molecule include, but are not limited to, fusion proteins (for example, a fusion between a ZFP or TALE DNA-binding domain and one or more activation domains) and fusion nucleic acids (for example, a nucleic acid encoding the fusion protein described supra). Examples of the second type of fusion molecule include, but are not limited to, a fusion between a triplex-forming nucleic acid and a polypeptide, and a fusion between a minor groove binder and a nucleic acid. The term also includes systems in which a polynucleotide component associates with a polypeptide component to form a functional molecule (e.g., a CRISPR/Cas system in which a single guide RNA associates with a functional domain to modulate gene expression).

Expression of a fusion protein in a cell can result from delivery of the fusion protein to the cell or by delivery of a polynucleotide encoding the fusion protein to a cell, wherein the polynucleotide is transcribed, and the transcript is translated, to generate the fusion protein. Trans-splicing, polypeptide cleavage and polypeptide ligation can also be involved in expression of a protein in a cell. Methods for polynucleotide and polypeptide delivery to cells are presented elsewhere in this disclosure.

A "gene," for the purposes of the present disclosure, includes a DNA region encoding a gene product (see infra), as well as all DNA regions which regulate the production of the gene product, whether or not such regulatory sequences are adjacent to coding and/or transcribed sequences. Accordingly, a gene includes, but is not necessarily limited to, promoter sequences, terminators, translational regulatory sequences such as ribosome binding sites and internal ribosome entry sites, enhancers, silencers, insulators, boundary elements, replication origins, matrix attachment sites and locus control regions.

A "safe harbor" locus is a locus within the genome wherein a gene may be inserted without any deleterious effects on the host cell. Most beneficial is a safe harbor locus in which expression of the inserted gene sequence is not perturbed by any read-through expression from neighboring genes. Non-limiting examples of safe harbor loci that are targeted by nuclease(s) include CCR5, CCR5, HPRT, AAVS1, Rosa and albumin. See, e.g., U.S. Pat. Nos. 8,771, 985; 8,110,379; 7,951,925; U.S. Publication Nos. 20100218264; 20110265198; 20130137104; 20130122591; 20130177983; 20130177960; 20150056705 and 20150159172).

"Gene expression" refers to the conversion of the information, contained in a gene, into a gene product. A gene product can be the direct transcriptional product of a gene (e.g., mRNA, tRNA, rRNA, antisense RNA, ribozyme, structural RNA or any other type of RNA) or a protein produced by translation of an mRNA. Gene products also include RNAs which are modified, by processes such as capping, polyadenylation, methylation, and editing, and proteins modified by, for example, methylation, acetylation, phosphorylation, ubiquitination, ADP-ribosylation, myristilation, and glycosylation. "Modulation" or "modification" of gene expression refers to a change in the activity of a gene. Modulation of expression can include, but is not limited to, gene activation and gene repression, including by modification of the gene via binding of an exogenous molecule (e.g., engineered transcription factor). Modulation may also be achieved by modification of the gene sequence via genome editing (e.g., cleavage, alteration, inactivation, random mutation). Gene inactivation refers to any reduction in gene expression as compared to a cell that has not been modified as described herein. Thus, gene inactivation may be partial or complete.

A "region of interest" is any region of cellular chromatin, such as, for example, a gene or a non-coding sequence within or adjacent to a gene, in which it is desirable to bind an exogenous molecule. Binding can be for the purposes of targeted DNA cleavage and/or targeted recombination. A region of interest can be present in a chromosome, an episome, an organellar genome (e.g., mitochondrial, chloroplast), or an infecting viral genome, for example. A region of interest can be within the coding region of a gene, within transcribed non-coding regions such as, for example, leader sequences, trailer sequences or introns, or within non-transcribed regions, either upstream or downstream of the coding region. A region of interest can be as small as a single nucleotide pair or up to 2,000 nucleotide pairs in length, or any integral value of nucleotide pairs.

"Eukaryotic" cells include, but are not limited to, fungal cells (such as yeast), plant cells, animal cells, mammalian cells and human cells (e.g., T-cells).

The terms "operative linkage" and "operatively linked" (or "operably linked") are used interchangeably with reference to a juxtaposition of two or more components (such as sequence elements), in which the components are arranged such that both components function normally and allow the possibility that at least one of the components can mediate a function that is exerted upon at least one of the other components. By way of illustration, a transcriptional regulatory sequence, such as a promoter, is operatively linked to a coding sequence if the transcriptional regulatory sequence controls the level of transcription of the coding sequence in response to the presence or absence of one or more transcriptional regulatory factors. A transcriptional regulatory sequence is generally operatively linked in cis with a coding sequence, but need not be directly adjacent to it. For example, an enhancer is a transcriptional regulatory sequence that is operatively linked to a coding sequence, even though they are not contiguous.

With respect to fusion polypeptides, the term "operatively linked" can refer to the fact that each of the components performs the same function in linkage to the other component as it would if it were not so linked. For example, with respect to a fusion polypeptide in which a DNA-binding domain (e.g., ZFP, TALE) is fused to an activation domain, the DNA-binding domain and the activation domain are in operative linkage if, in the fusion polypeptide, the DNA-binding domain portion is able to bind its target site and/or its binding site, while the activation domain is able to up-regulate gene expression. When a fusion polypeptide in which a DNA-binding domain is fused to a cleavage domain, the DNA-binding domain and the cleavage domain are in operative linkage if, in the fusion polypeptide, the DNA-binding domain portion is able to bind its target site and/or its binding site, while the cleavage domain is able to cleave DNA in the vicinity of the target site. Similarly, with respect to a fusion polypeptide in which a DNA-binding domain is fused to an activation or repression domain, the DNA-binding domain and the activation or repression domain are in operative linkage if, in the fusion polypeptide, the DNA-binding domain portion is able to bind its target site and/or its binding site, while the activation domain is able to upregulate gene expression or the repression domain is able to downregulate gene expression.

A "functional fragment" of a protein, polypeptide or nucleic acid is a protein, polypeptide or nucleic acid whose sequence is not identical to the full-length protein, polypeptide or nucleic acid, yet retains the same function as the full-length protein, polypeptide or nucleic acid. A functional fragment can possess more, fewer, or the same number of residues as the corresponding native molecule, and/or can contain one or more amino acid or nucleotide substitutions. Methods for determining the function of a nucleic acid (e.g., coding function, ability to hybridize to another nucleic acid) are well-known in the art. Similarly, methods for determining protein function are well-known. For example, the DNA-binding function of a polypeptide can be determined, for example, by filter-binding, electrophoretic mobility-shift, or immunoprecipitation assays. DNA cleavage can be assayed by gel electrophoresis. See Ausubel et al., supra. The ability of a protein to interact with another protein can be determined, for example, by co-immunoprecipitation, two-hybrid assays or complementation, both genetic and biochemical. See, for example, Fields et al. (1989) Nature 340:245-246; U.S. Pat. No. 5,585,245 and PCT WO 98/44350.

A "vector" is capable of transferring gene sequences to target cells. Typically, "vector construct," "expression vector," and "gene transfer vector," mean any nucleic acid construct capable of directing the expression of a gene of interest and which can transfer gene sequences to target cells. Thus, the term includes cloning, and expression vehicles, as well as integrating vectors.

A "reporter gene" or "reporter sequence" refers to any sequence that produces a protein product that is easily measured, preferably although not necessarily in a routine assay. Suitable reporter genes include, but are not limited to, sequences encoding proteins that mediate antibiotic resistance (e.g., ampicillin resistance, neomycin resistance, G418 resistance, puromycin resistance), sequences encoding colored or fluorescent or luminescent proteins (e.g., green fluorescent protein, enhanced green fluorescent protein, red fluorescent protein, luciferase), and proteins which mediate enhanced cell growth and/or gene amplification (e.g., dihydrofolate reductase). Epitope tags include, for example, one or more copies of FLAG, His, myc, Tap, HA or any detectable amino acid sequence. "Expression tags" include sequences that encode reporters that may be operably linked to a desired gene sequence in order to monitor expression of the gene of interest.

The terms "subject" and "patient" are used interchangeably and refer to mammals such as human patients and non-human primates, as well as experimental animals such as rabbits, dogs, cats, rats, mice, and other animals. Accordingly, the term "subject" or "patient" as used herein means any mammalian patient or subject to which the expression cassettes of the invention can be administered. Subjects of the present invention include those with a disorder or those at risk for developing a disorder.

The terms "treating" and "treatment" as used herein refer to reduction in severity and/or frequency of symptoms, elimination of symptoms and/or underlying cause, prevention of the occurrence of symptoms and/or their underlying cause, and improvement or remediation of damage. Cancer and graft versus host disease are non-limiting examples of conditions that may be treated using the compositions and methods described herein. Thus, "treating" and "treatment" includes:

(i) preventing the disease or condition from occurring in a mammal, in particular, when such mammal is predisposed to the condition but has not yet been diagnosed as having it;

(ii) inhibiting the disease or condition, i.e., arresting its development;

(iii) relieving the disease or condition, i.e., causing regression of the disease or condition; or (iv) relieving the symptoms resulting from the disease or condition, i.e., relieving pain without addressing the underlying disease or condition.

As used herein, the terms "disease" and "condition" may be used interchangeably or may be different in that the particular malady or condition may not have a known causative agent (so that etiology has not yet been worked out) and it is therefore not yet recognized as a disease but only as an undesirable condition or syndrome, wherein a more or less specific set of symptoms have been identified by clinicians.

A "pharmaceutical composition" refers to a formulation of a compound of the invention and a medium generally accepted in the art for the delivery of the biologically active compound to mammals, e.g., humans. Such a medium includes all pharmaceutically acceptable carriers, diluents or excipients therefor.

"Effective amount" or "therapeutically effective amount" refers to that amount of a compound of the invention which, when administered to a mammal, preferably a human, is sufficient to effect treatment in the mammal, preferably a human. The amount of a composition of the invention which constitutes a "therapeutically effective amount" will vary depending on the compound, the condition and its severity, the manner of administration, and the age of the mammal to be treated, but can be determined routinely by one of ordinary skill in the art having regard to his own knowledge and to this disclosure.

DNA-Binding Domains

Described herein are compositions comprising a DNA-binding domain that specifically binds to a target site in any gene comprising an HLA gene or an HLA regulator, or a TCR gene, immunological checkpoint gene (e.g., CISH, PD1, CTLA-4, etc.) and/or additional gene (e.g., safe harbor). Any DNA-binding domain can be used in the compositions and methods disclosed herein, including but not limited to a zinc finger DNA-binding domain, a TALE DNA binding domain, the DNA-binding portion (sgRNA) of a CRISPR/Cas nuclease, or a DNA-binding domain from a meganuclease. The DNA-binding domain may bind to any target sequence within the gene, including, but not limited to, a target sequence of 12 or more nucleotides as shown in any of target sites disclosed herein (for example a target site of 12 to 20 or more contiguous or non-contiguous base pairs as shown in Table 1). In certain embodiments, the DNA binding domain binds (in a sequence-specific manner) to a target site in a TCR gene or TCR regulatory gene and modulates expression of a TCR gene. In some embodiments, the DNA-binding domain binds to a target site in TCRA, while in other embodiments, the zinc finger binds to a target site in TRBC. In other embodiments, the DNA binding domain binds in a sequence-specific manner to a target site in a B2M gene and modulates expression of a B2M gene. In still further embodiments, the DNA-binding domain binds in a sequence-specific manner to an immunological checkpoint gene such as a CISH (e.g., target sites as shown in Table 1) or PD1 gene (e.g., target sites as shown in U.S. Pat. No. 8,563,314). Multiple DNA-binding domains (binding to the same or different genes) can be used together for modification of multiple genes at the same time (e.g., multiplexing via multiple nuclease-mediated knock outs and/or targeted integration of a donor).

In certain embodiments, the DNA binding domain comprises a zinc finger protein. Preferably, the zinc finger protein is non-naturally occurring in that it is engineered to bind to a target site of choice. See, for example, Beerli et al. (2002) *Nature Biotechnol.* 20:135-141; Pabo et al. (2001) *Ann. Rev. Biochem.* 70:313-340; Isalan et al. (2001) *Nature Biotechnol.* 19:656-660; Segal et al. (2001) *Curr. Opin. Biotechnol.* 12:632-637; Choo et al. (2000) *Curr. Opin. Struct. Biol.* 10:411-416; U.S. Pat. Nos. 6,453,242; 6,534,261; 6,599,692; 6,503,717; 6,689,558; 7,030,215; 6,794,136; 7,067,317; 7,262,054; 7,070,934; 7,361,635; 7,253,273; and U.S. Patent Publication Nos. 2005/0064474; 2007/0218528; 2005/0267061, all incorporated herein by reference in their entireties.

An engineered zinc finger binding domain can have a novel binding specificity, compared to a naturally-occurring zinc finger protein. Engineering methods include, but are not limited to, rational design and various types of selection. Rational design includes, for example, using databases comprising triplet (or quadruplet) nucleotide sequences and individual zinc finger amino acid sequences, in which each triplet or quadruplet nucleotide sequence is associated with one or more amino acid sequences of zinc fingers which bind the particular triplet or quadruplet sequence. See, for example, U.S. Pat. Nos. 6,453,242 and 6,534,261, incorporated by reference herein in their entireties.

Exemplary selection methods, including phage display and two-hybrid systems, are disclosed in U.S. Pat. Nos. 5,789,538; 5,925,523; 6,007,988; 6,013,453; 6,410,248; 6,140,466; 6,200,759; and 6,242,568; as well as WO 98/37186; WO 98/53057; WO 00/27878; WO 01/88197 and GB 2,338,237. In addition, enhancement of binding specificity for zinc finger binding domains has been described, for example, in U.S. Pat. No. 6,794,136.

In addition, as disclosed in these and other references, zinc finger domains and/or multi-fingered zinc finger proteins may be linked together using any suitable linker sequences, including for example, linkers of 5 or more amino acids in length. See, also, U.S. Pat. Nos. 6,479,626; 6,903,185; and 7,153,949 for exemplary linker sequences 6 or more amino acids in length. The proteins described herein may include any combination of suitable linkers between the individual zinc fingers of the protein. In addition, enhancement of binding specificity for zinc finger binding domains has been described, for example, in U.S. Pat. No. 6,794,136.

Selection of target sites; ZFPs and methods for design and construction of fusion proteins (and polynucleotides encoding same) are known to those of skill in the art and described in detail in U.S. Pat. Nos. 6,140,081; 5,789,538; 6,453,242; 6,534,261; 5,925,523; 6,007,988; 6,013,453; 6,200,759; WO 95/19431; WO 96/06166; WO 98/53057; WO 98/54311; WO 00/27878; WO 01/60970 WO 01/88197; WO 02/099084; WO 98/53058; WO 98/53059; WO 98/53060; WO 02/016536 and WO 03/016496.

In certain embodiments, the DNA binding domain is an engineered zinc finger protein that binds (in a sequence-specific manner) to a target site in a TCR gene or TCR regulatory gene and modulates expression of a TCR gene. In some embodiments, the zinc finger protein binds to a target site in TCRA, while in other embodiments, the zinc finger binds to a target site in TRBC. In other embodiments, the DNA binding domain in an engineered zinc finger protein that binds in a sequence-specific manner to a target site in a B2M gene and modulates expression of a B2M gene. In still further embodiments, the DNA-binding domain binds in a sequence-specific manner to an immunological checkpoint gene such as a CISH or PD1 gene.

Usually, the ZFPs include at least three fingers. Certain of the ZFPs include four, five or six fingers. The ZFPs that include three fingers typically recognize a target site that includes 9 or 10 nucleotides; ZFPs that include four fingers typically recognize a target site that includes 12 to 14 nucleotides; while ZFPs having six fingers can recognize target sites that include 18 to 21 nucleotides. The ZFPs can also be fusion proteins that include one or more regulatory domains, which domains can be transcriptional activation or repression domains. ZFPs may further comprise modifications to the backbone regions as described in U.S. Patent Publication No. 20180087072.

In some embodiments, the DNA-binding domain may be derived from a nuclease. For example, the recognition sequences of homing endonucleases and meganucleases such as I-SceI, I-CeuI, PI-PspI, PI-Sce, I-SceIV, I-CsmI, I-PanI, I-SceII, I-PpoI, I-SceIII, I-CreI, I-TevI, I-TevII and I-TevIII are known. See also U.S. Pat. Nos. 5,420,032; 6,833,252; Belfort et al. (1997) *Nucleic Acids Res.* 25:3379-3388; Dujon et al. (1989) *Gene* 82:115-118; Perler et al. (1994) *Nucleic Acids Res.* 22, 1125-1127; Jasin (1996) *Trends Genet.* 12:224-228; Gimble et al. (1996) *J. Mol. Biol.* 263:163-180; Argast et al. (1998) *J. Mol. Biol.* 280:345-353 and the New England Biolabs catalogue. In addition, the DNA-binding specificity of homing endonucleases and meganucleases can be engineered to bind non-natural target sites. See, for example, Chevalier et al. (2002) *Molec. Cell* 10:895-905; Epinat et al. (2003) *Nucleic Acids Res.* 31:2952-2962; Ashworth et al. (2006) *Nature* 441:656-659; Paques et al. (2007) *Current Gene Therapy* 7:49-66; U.S. Patent Publication No. 20070117128.

In other embodiments, the DNA binding domain comprises an engineered domain from a TAL effector similar to those derived from the plant pathogens *Xanthomonas* (see Boch et al, (2009) *Science* 326: 1509-1512 and Moscou and Bogdanove, (2009) *Science* 326: 1501) and Ralstonia (see Heuer et al (2007) *Applied and Environmental Microbiology* 73(13): 4379-4384); U.S. Patent Publication Nos. 20110301073 and 20110145940. The plant pathogenic bacteria of the genus *Xanthomonas* are known to cause many diseases in important crop plants. Pathogenicity of *Xanthomonas* depends on a conserved type III secretion (T3 S) system which injects more than 25 different effector proteins into the plant cell. Among these injected proteins are transcription activator-like effectors (TALE) which mimic plant transcriptional activators and manipulate the plant transcriptome (see Kay et al (2007) *Science* 318:648-651). These proteins contain a DNA binding domain and a transcriptional activation domain. One of the most well characterized TALEs is AvrBs3 from *Xanthomonas* campestris pv. Vesicatoria (see Bonas et al (1989) *Mol Gen Genet* 218: 127-136 and WO2010079430). TALEs contain a centralized domain of tandem repeats, each repeat containing approximately 34 amino acids, which are key to the DNA binding specificity of these proteins. In addition, they contain a nuclear localization sequence and an acidic transcriptional activation domain (for a review see Schornack S, et al (2006) *J Plant Physiol* 163(3): 256-272). In addition, in the phytopathogenic bacteria *Ralstonia solanacearum* two genes, designated brg11 and hpx17 have been found that are homologous to the AvrBs3 family of *Xanthomonas* in the *R. solanacearum* biovar 1 strain GMI1000 and in the biovar 4 strain RS 1000 (See Heuer et al (2007) *Appl and Envir Micro* 73(13): 4379-4384). These genes are 98.9% identical in nucleotide sequence to each other but differ by a deletion of 1,575 bp in the repeat domain of hpx17. However, both gene products have less than 40% sequence identity with AvrBs3 family proteins of *Xanthomonas*.

Specificity of these TAL effectors depends on the sequences found in the tandem repeats. The repeated sequence comprises approximately 102 base pairs and the repeats are typically 91-100% homologous with each other (Bonas et al, ibid). Polymorphism of the repeats is usually located at positions 12 and 13 and there appears to be a one-to-one correspondence between the identity of the hypervariable diresidues (the repeat variable diresidue or RVD region) at positions 12 and 13 with the identity of the contiguous nucleotides in the TAL-effector's target sequence (see Moscou and Bogdanove, (2009) *Science* 326:1501 and Boch et al (2009) *Science* 326:1509-1512). Experimentally, the natural code for DNA recognition of these TAL-effectors has been determined such that an HD sequence at positions 12 and 13 (Repeat Variable Diresidue or RVD) leads to a binding to cytosine (C), NG binds to T, NI to A, C, G or T, NN binds to A or G, and ING binds to T. These DNA binding repeats have been assembled into proteins with new combinations and numbers of repeats, to make artificial transcription factors that are able to interact with new sequences and activate the expression of a non-endogenous reporter gene in plant cells (Boch et al, ibid). Engineered TAL proteins have been linked to a FokI cleavage half domain to yield a TAL effector domain nuclease fusion (TALEN), including TALENs with atypical RVDs. See, e.g., U.S. Pat. No. 8,586,526.

In some embodiments, the TALEN comprises an endonuclease (e.g., FokI) cleavage domain or cleavage half-domain. In other embodiments, the TALE-nuclease is a mega TAL. These mega TAL nucleases are fusion proteins comprising a TALE DNA binding domain and a meganuclease cleavage domain. The meganuclease cleavage domain is active as a monomer and does not require dimerization for activity. (See Boissel et al., (2013) *Nucl Acid Res:* 1-13, doi: 10.1093/nar/gkt1224).

In still further embodiments, the nuclease comprises a compact TALEN. These are single chain fusion proteins linking a TALE DNA binding domain to a TevI nuclease domain. The fusion protein can act as either a nickase localized by the TALE region, or can create a double strand break, depending upon where the TALE DNA binding domain is located with respect to the TevI nuclease domain (see Beurdeley et al (2013) *Nat Comm* 4:1762 DOI: 10.1038/ncomms2782). In addition, the nuclease domain may also exhibit DNA-binding functionality. Any TALENs may be used in combination with additional TALENs (e.g., one or more TALENs (cTALENs or FokI-TALENs) with one or more mega-TALEs.

In addition, as disclosed in these and other references, zinc finger domains and/or multi-fingered zinc finger proteins or TALEs may be linked together using any suitable linker sequences, including for example, linkers of 5 or more amino acids in length. See, also, U.S. Pat. Nos. 6,479,626; 6,903,185; and 7,153,949 for exemplary linker sequences 6 or more amino acids in length. The proteins described herein may include any combination of suitable linkers between the individual zinc fingers of the protein. In addition, enhancement of binding specificity for zinc finger binding domains has been described, for example, in U.S. Pat. No. 6,794,136.

In certain embodiments, the DNA-binding domain is part of a CRISPR/Cas nuclease system, including a single guide RNA (sgRNA) that binds to DNA. See, e.g., U.S. Pat. Nos. 9,873,894; and 8,697,359U.S. Patent Publication No. 20150159172. The CRISPR (clustered regularly interspaced short palindromic repeats) locus, which encodes RNA components of the system, and the cas (CRISPR-associated) locus, which encodes proteins (Jansen et al., 2002. *Mol. Microbiol.* 43: 1565-1575; Makarova et al., 2002. *Nucleic Acids Res.* 30: 482-496; Makarova et al., 2006. *Biol. Direct* 1: 7; Haft et al., 2005. *PLoS Comput. Biol.* 1: e60) make up the gene sequences of the CRISPR/Cas nuclease system. CRISPR loci in microbial hosts contain a combination of CRISPR-associated (Cas) genes as well as non-coding RNA elements capable of programming the specificity of the CRISPR-mediated nucleic acid cleavage.

The Type II CRISPR is one of the most well characterized systems and carries out targeted DNA double-strand break in four sequential steps. First, two non-coding RNA, the pre-crRNA array and tracrRNA, are transcribed from the CRISPR locus. Second, tracrRNA hybridizes to the repeat regions of the pre-crRNA and mediates the processing of pre-crRNA into mature crRNAs containing individual spacer sequences. Third, the mature crRNA:tracrRNA complex directs functional domain (e.g., nuclease such as Cas) to the target DNA via Watson-Crick base-pairing between the spacer on the crRNA and the protospacer on the target DNA next to the protospacer adjacent motif (PAM), an additional requirement for target recognition. Finally, Cas9 mediates cleavage of target DNA to create a double-stranded break within the protospacer. Activity of the CRISPR/Cas system comprises of three steps: (i) insertion of alien DNA sequences into the CRISPR array to prevent future attacks, in a process called 'adaptation', (ii) expression of the relevant proteins, as well as expression and processing of the array, followed by (iii) RNA-mediated interference with the alien nucleic acid. Thus, in the bacterial cell, several of the so-called 'Cas' proteins are involved with the natural function of the CRISPR/Cas system and serve roles in functions such as insertion of the alien DNA etc.

In certain embodiments, Cas protein may be a "functional derivative" of a naturally occurring Cas protein. A "functional derivative" of a native sequence polypeptide is a compound having a qualitative biological property in common with a native sequence polypeptide. "Functional derivatives" include, but are not limited to, fragments of a native sequence and derivatives of a native sequence polypeptide and its fragments, provided that they have a biological activity in common with a corresponding native sequence polypeptide. A biological activity contemplated herein is the ability of the functional derivative to hydrolyze a DNA substrate into fragments. The term "derivative" encompasses both amino acid sequence variants of polypeptide, covalent modifications, and fusions thereof such as derivative Cas proteins. Suitable derivatives of a Cas polypeptide or a fragment thereof include but are not limited to mutants, fusions, covalent modifications of Cas protein or a fragment thereof. Cas protein, which includes Cas protein or a fragment thereof, as well as derivatives of Cas protein or a fragment thereof, may be obtainable from a cell or synthesized chemically or by a combination of these two procedures. The cell may be a cell that naturally produces Cas protein, or a cell that naturally produces Cas protein and is genetically engineered to produce the endogenous Cas protein at a higher expression level or to produce a Cas protein from an exogenously introduced nucleic acid, which nucleic acid encodes a Cas that is same or different from the endogenous Cas. In some case, the cell does not naturally produce Cas protein and is genetically engineered to produce a Cas protein. In some embodiments, the Cas protein is a small Cas9 ortholog for delivery via an AAV vector (Ran et a! (2015) *Nature* 510, p. 186). Thus, the DNA-binding domain may comprise a sgRNA that binds to a target site or at least 9 nucleotides as shown in Table 1.

In some embodiments, the DNA binding domain is part of a TtAgo system (see Swarts et al, ibid; Sheng et al, ibid). In eukaryotes, gene silencing is mediated by the Argonaute (Ago) family of proteins. In this paradigm, Ago is bound to small (19-31 nt) RNAs. This protein-RNA silencing complex recognizes target RNAs via Watson-Crick base pairing between the small RNA and the target and endonucleolytically cleaves the target RNA (Vogel (2014) *Science* 344: 972-973). In contrast, prokaryotic Ago proteins bind to small single-stranded DNA fragments and likely function to detect and remove foreign (often viral) DNA (Yuan et al., (2005) *Mol. Cell* 19, 405; Olovnikov, et al. (2013) *Mol. Cell* 51, 594; Swarts et al., ibid). Exemplary prokaryotic Ago proteins include those from *Aquifex aeolicus*, *Rhodobacter sphaeroides*, and *Thermus thermophilus*.

One of the most well-characterized prokaryotic Ago protein is the one from *T. thermophilus* (TtAgo; Swarts et al. ibid). TtAgo associates with either 15 nt or 13-25 nt single-stranded DNA fragments with 5' phosphate groups. This "guide DNA" bound by TtAgo serves to direct the protein-DNA complex to bind a Watson-Crick complementary DNA sequence in a third-party molecule of DNA. Once the sequence information in these guide DNAs has allowed identification of the target DNA, the TtAgo-guide DNA complex cleaves the target DNA. Such a mechanism is also supported by the structure of the TtAgo-guide DNA complex while bound to its target DNA (G. Sheng et al., ibid). Ago from *Rhodobacter sphaeroides* (RsAgo) has similar properties (Olivnikov et al. ibid).

Exogenous guide DNAs of arbitrary DNA sequence can be loaded onto the TtAgo protein (Swarts et al. ibid.). Since the specificity of TtAgo cleavage is directed by the guide DNA, a TtAgo-DNA complex formed with an exogenous, investigator-specified guide DNA will therefore direct TtAgo target DNA cleavage to a complementary investigator-specified target DNA. In this way, one may create a targeted double-strand break in DNA. Use of the TtAgo-guide DNA system (or orthologous Ago-guide DNA systems from other organisms) allows for targeted cleavage of genomic DNA within cells. Such cleavage can be either single- or double-stranded. For cleavage of mammalian genomic DNA, it would be preferable to use of a version of TtAgo codon optimized for expression in mammalian cells. Further, it might be preferable to treat cells with a TtAgo-DNA complex formed in vitro where the TtAgo protein is fused to a cell-penetrating peptide. Further, it might be preferable to use a version of the TtAgo protein that has been altered via mutagenesis to have improved activity at 37° C. Ago-RNA-mediated DNA cleavage could be used to affect a panopoly of outcomes including gene knock-out, targeted gene addition, gene correction, targeted gene deletion using techniques standard in the art for exploitation of DNA breaks. Thus, any DNA-binding domain can be used for binding to and modification (e.g., modulation of expression and/or genetic modification via insertions and/or deletions) of cells as described herein. In certain embodiments, the DNA-binding domain(s) of the molecule(s) that result(s) in modification of the target gene(s) bind(s) to a target site comprising at least 9 nucleotides of a target site shown in Table 1.

Fusion Molecules

Fusion molecules comprising DNA-binding domains (e.g., ZFPs or TALEs, CRISPR/Cas components such as single guide RNAs) as described herein associated with a heterologous regulatory (functional) domain (or functional fragment thereof) are also provided. Common domains include, e.g., transcription factor domains (activators, repressors, co-activators, co-repressors), silencers, oncogenes (e.g., myc, jun, fos, myb, max, mad, rel, ets, bcl, myb, mos family members etc.); DNA repair enzymes and their associated factors and modifiers; DNA rearrangement enzymes and their associated factors and modifiers; chromatin associated proteins and their modifiers (e.g. kinases, acetylases and deacetylases); and DNA modifying enzymes (e.g., methyltransferases, topoisomerases, helicases, ligases, kinases, phosphatases, polymerases, endonucleases) and their associated factors and modifiers. Such fusion molecules include transcription factors comprising the DNA-binding domains described herein and a transcriptional regulatory domain as well as nucleases comprising the DNA-binding domains and one or more nuclease domains.

Suitable domains for achieving activation (transcriptional activation domains) include the HSV VP16 activation domain (see, e.g., Hagmann et al., *J. Virol.* 71, 5952-5962 (1997)) nuclear hormone receptors (see, e.g., Torchia et al., *Curr. Opin. Cell. Biol.* 10:373-383 (1998)); the p65 subunit of nuclear factor kappa B (Bitko & Barik, *J. Virol.* 72:5610-5618 (1998) and Doyle & Hunt, *Neuroreport* 8:2937-2942 (1997)); Liu et al., *Cancer Gene Ther.* 5:3-28 (1998)), or artificial chimeric functional domains such as VP64 (Beerli et al., (1998) *Proc. Natl. Acad. Sci. USA* 95:14623-33), and degron (Molinari et al., (1999) *EMBO J.* 18, 6439-6447). Additional exemplary activation domains include, Oct 1, Oct-2A, Sp1, AP-2, and CTF1 (Seipel et al., *EMBO J.* 11, 4961-4968 (1992) as well as p300, CBP, PCAF, SRC1 PvALF, AtHD2A and ERF-2. See, for example, Robyr et al. (2000) *Mol. Endocrinol.* 14:329-347; Collingwood et al. (1999) *J. Mol. Endocrinol.* 23:255-275; Leo et al. (2000) *Gene* 245:1-11; Manteuffel-Cymborowska (1999) *Acta Biochim. Pol.* 46:77-89; McKenna et al. (1999) *J. Steroid Biochem. Mol. Biol.* 69:3-12; Malik et al. (2000) *Trends Biochem. Sci.* 25:277-283; and Lemon et al. (1999) *Curr. Opin. Genet. Dev.* 9:499-504. Additional exemplary activation domains include, but are not limited to, OsGAI, HALF-1, C1, AP1, ARF-5, -6, -7, and -8, CPRF 1, CPRF4, MYC-RP/GP, and TRAB 1. See, for example, Ogawa et al. (2000) *Gene* 245:21-29; Okanami et al. (1996) *Genes Cells* 1:87-99; Goff et al. (1991) *Genes Dev.* 5:298-309; Cho et al. (1999) *Plant Mol. Biol.* 40:419-429; Ulmason et al. (1999) *Proc. Natl. Acad. Sci. USA* 96:5844-5849; Sprenger-Haussels et al. (2000) *Plant J.* 22:1-8; Gong et al. (1999) *Plant Mol. Biol.* 41:33-44; and Hobo et al. (1999) *Proc. Natl. Acad. Sci. USA* 96:15,348-15,353.

It will be clear to those of skill in the art that, in the formation of a fusion protein (or a nucleic acid encoding same) between a DNA-binding domain and a functional domain, either an activation domain or a molecule that interacts with an activation domain is suitable as a functional domain. Essentially any molecule capable of recruiting an activating complex and/or activating activity (such as, for example, histone acetylation) to the target gene is useful as an activating domain of a fusion protein. Insulator domains, localization domains, and chromatin remodeling proteins such as ISWI-containing domains and/or methyl binding domain proteins suitable for use as functional domains in fusion molecules are described, for example, in U.S. Pat. No. 7,053,264.

Exemplary repression domains include, but are not limited to, KRAB A/B, KOX, TGF-beta-inducible early gene (TIEG), v-erbA, SID, MBD2, MBD3, members of the DNMT family (e.g., DNMT1, DNMT3A, DNMT3B), Rb, and MeCP2. See, for example, Bird et al. (1999) *Cell* 99:451-454; Tyler et al. (1999) *Cell* 99:443-446; Knoepfler et al. (1999) *Cell* 99:447-450; and Robertson et al. (2000) *Nature Genet.* 25:338-342. Additional exemplary repression domains include, but are not limited to, ROM2 and AtHD2A. See, for example, Chem et al. (1996) *Plant Cell* 8:305-321; and Wu et al. (2000) *Plant J.* 22:19-27.

Fusion molecules are constructed by methods of cloning and biochemical conjugation that are well known to those of skill in the art. Fusion molecules comprise a DNA-binding domain (e.g., ZFP, TALE, sgRNA) associated with a functional domain (e.g., a transcriptional activation or repression domain). Fusion molecules also optionally comprise nuclear localization signals (such as, for example, that from the SV40 medium T-antigen) and epitope tags (such as, for example, FLAG and hemagglutinin). Fusion proteins (and nucleic acids encoding them) are designed such that the translational reading frame is preserved among the components of the fusion.

Fusions between a polypeptide component of a functional domain (or a functional fragment thereof) on the one hand, and a non-protein DNA-binding domain (e.g., antibiotic, intercalator, minor groove binder, nucleic acid) on the other, are constructed by methods of biochemical conjugation known to those of skill in the art. See, for example, the Pierce Chemical Company (Rockford, IL) Catalogue. Methods and compositions for making fusions between a minor groove binder and a polypeptide have been described. Mapp et al. (2000) *Proc. Natl. Acad. Sci. USA* 97:3930-3935. Furthermore, single guide RNAs of the CRISPR/Cas system associate with functional domains to form active transcriptional regulators and nucleases.

In certain embodiments, the target site is present in an accessible region of cellular chromatin. Accessible regions can be determined as described, for example, in U.S. Pat. Nos. 7,217,509 and 7,923,542. If the target site is not present in an accessible region of cellular chromatin, one or more accessible regions can be generated as described in U.S. Pat. Nos. 7,785,792 and 8,071,370. In additional embodiments, the DNA-binding domain of a fusion molecule is capable of binding to cellular chromatin regardless of whether its target site is in an accessible region or not. For example, such DNA-binding domains are capable of binding to linker DNA and/or nucleosomal DNA. Examples of this type of "pioneer" DNA binding domain are found in certain steroid receptor and in hepatocyte nuclear factor 3 (HNF3) (Cordingley et al. (1987) *Cell* 48:261-270; Pina et al. (1990) *Cell* 60:719-731; and Cirillo et al. (1998) *EMBO J.* 17:244-254).

The fusion molecule may be formulated with a pharmaceutically acceptable carrier, as is known to those of skill in the art. See, for example, Remington's Pharmaceutical Sciences, 17th ed., 1985; and U.S. Pat. Nos. 6,453,242 and 6,534,261.

The functional component/domain of a fusion molecule can be selected from any of a variety of different components capable of influencing transcription of a gene once the fusion molecule binds to a target sequence via its DNA binding domain. Hence, the functional component can include, but is not limited to, various transcription factor domains, such as activators, repressors, co-activators, co-repressors, and silencers.

Additional exemplary functional domains are disclosed, for example, in U.S. Pat. Nos. 6,534,261 and 6,933,113.

Functional domains that are regulated by exogenous small molecules or ligands may also be selected. For example, RheoSwitch® technology may be employed wherein a functional domain only assumes its active conformation in the presence of the external RheoChem™ ligand (see for example US 20090136465). Thus, the ZFP may be operably linked to the regulatable functional domain wherein the resultant activity of the ZFP-TF is controlled by the external ligand.

Nucleases

In certain embodiments, the fusion molecule comprises a DNA-binding binding domain associated with a cleavage (nuclease) domain. As such, gene modification can be achieved using a nuclease, for example an engineered nuclease. Engineered nuclease technology is based on the engineering of naturally occurring DNA-binding proteins. For example, engineering of homing endonucleases with tailored DNA-binding specificities has been described. Chames et al. (2005) *Nucleic Acids Res* 33(20):e178; Arnould et al. (2006) *J. Mol. Biol.* 355:443-458. In addition, engineering of ZFPs has also been described. See, e.g., U.S. Pat. Nos. 6,534,261; 6,607,882; 6,824,978; 6,979,539; 6,933,113; 7,163,824; and 7,013,219.

In addition, ZFPs and/or TALEs can be fused to nuclease domains to create ZFNs and TALENs—a functional entity that is able to recognize its intended nucleic acid target through its engineered (ZFP or TALE) DNA binding domain and cause the DNA to be cut near the DNA binding site via the nuclease activity.

Thus, the methods and compositions described herein are broadly applicable and may involve any nuclease of interest. Non-limiting examples of nucleases include meganucleases, TALENs and zinc finger nucleases. The nuclease may comprise heterologous DNA-binding and cleavage domains (e.g., zinc finger nucleases; meganuclease DNA-binding domains with heterologous cleavage domains) or, alternatively, the DNA-binding domain of a naturally-occurring nuclease may be altered to bind to a selected target site (e.g., a meganuclease that has been engineered to bind to site different than the cognate binding site).

In any of the nucleases described herein, the nuclease can comprise an engineered TALE DNA-binding domain and a nuclease domain (e.g., endonuclease and/or meganuclease domain), also referred to as TALENs. Methods and compositions for engineering these TALEN proteins for robust, site specific interaction with the target sequence of the user's choosing have been published (see U.S. Pat. No. 8,586,526). In some embodiments, the TALEN comprises an endonuclease (e.g., FokI) cleavage domain or cleavage half-domain. In other embodiments, the TALE-nuclease is a mega TAL. These mega TAL nucleases are fusion proteins comprising a TALE DNA binding domain and a meganuclease cleavage domain. The meganuclease cleavage domain is active as a monomer and does not require dimerization for activity. (See Boissel et al., (2013) *Nucl Acid Res:* 1-13, doi: 10.1093/nar/gkt1224). In addition, the nuclease domain may also exhibit DNA-binding functionality.

In still further embodiments, the nuclease comprises a compact TALEN (cTALEN). These are single chain fusion proteins linking a TALE DNA binding domain to a TevI nuclease domain. The fusion protein can act as either a nickase localized by the TALE region, or can create a double strand break, depending upon where the TALE DNA binding domain is located with respect to the TevI nuclease domain (see Beurdeley et al (2013) *Nat Comm:* 1-8 DOI: 10.1038/ncomms2782). Any TALENs may be used in combination with additional TALENs (e.g., one or more TALENs (cTALENs or FokI-TALENs) with one or more mega-TALs) or other DNA cleavage enzymes.

In certain embodiments, the nuclease comprises a meganuclease (homing endonuclease) or a portion thereof that exhibits cleavage activity. Naturally-occurring meganucleases recognize 15-40 base-pair cleavage sites and are commonly grouped into four families: the LAGLIDADG family ("LAGLIDADG" disclosed as SEQ ID NO:63), the GIY-YIG family, the His-Cyst box family and the HNH family. Exemplary homing endonucleases include I-SceI, I-CeuI, PI-PspI, PI-Sce, I-SceIV, I-CsmI, I-PanI, I-SceII, I-PpoI, I-SceIII, I-CreI, I-TevI, I-TevII and I-TevIII. Their recognition sequences are known. See also U.S. Pat. Nos. 5,420,032; 6,833,252; Belfort et al. (1997) *Nucleic Acids Res.* 25:3379-3388; Dujon et al. (1989) *Gene* 82:115-118; Perler et al. (1994) *Nucleic Acids Res.* 22, 1125-1127; Jasin (1996) *Trends Genet.* 12:224-228; Gimble et al. (1996) *J. Mol. Biol.* 263:163-180; Argast et al. (1998) *J. Mol. Biol.* 280:345-353 and the New England Biolabs catalogue.

DNA-binding domains from naturally-occurring meganucleases, primarily from the LAGLIDADG family ("LAGLIDADG" disclosed as SEQ ID NO:63), have been used to promote site-specific genome modification in plants, yeast, *Drosophila*, mammalian cells and mice, but this approach has been limited to the modification of either homologous genes that conserve the meganuclease recognition sequence (Monet et al. (1999), *Biochem. Biophysics. Res. Common.* 255: 88-93) or to pre-engineered genomes into which a recognition sequence has been introduced (Route et al. (1994), *Mol. Cell. Biol.* 14: 8096-106; Chilton et al. (2003), *Plant Physiology.* 133: 956-65; Puchta et al. (1996), *Proc. Natl. Acad. Sci. USA* 93: 5055-60; Rong et al. (2002), *Genes Dev.* 16: 1568-81; Gouble et al. (2006), *J. Gene Med.* 8(5):616-622). Accordingly, attempts have been made to engineer meganucleases to exhibit novel binding specificity at medically or biotechnologically relevant sites (Porteus et al. (2005), *Nat. Biotechnol.* 23: 967-73; Sussman et al. (2004), *J. Mol. Biol.* 342:31-41; Epinat et al. (2003), *Nucleic Acids Res.* 31:2952-62; Chevalier et al. (2002) *Molec. Cell* 10:895-905; Epinat et al. (2003) *Nucleic Acids Res.* 31:2952-2962; Ashworth et al. (2006) *Nature* 441:656-659; Paques et al. (2007) *Current Gene Therapy* 7:49-66; U.S. Patent Publication Nos. 20070117128; 20060206949; 20060153826; 20060078552; and 20040002092). In addition, naturally-occurring or engineered DNA-binding domains from meganucleases can be operably linked with a cleavage domain from a heterologous nuclease (e.g., FokI) and/or cleavage domains from meganucleases can be operably linked with a heterologous DNA-binding domain (e.g., ZFP or TALE).

In other embodiments, the nuclease is a zinc finger nuclease (ZFN) or TALE DNA binding domain-nuclease fusion (TALEN). ZFNs and TALENs comprise a DNA binding domain (zinc finger protein or TALE DNA binding domain) that has been engineered to bind to a target site in a gene of choice and cleavage domain or a cleavage half-domain (e.g., from a restriction and/or meganuclease as described herein).

As described in detail above, zinc finger binding domains and TALE DNA binding domains can be engineered to bind to a sequence of choice. See, for example, Beerli et al. (2002) *Nature Biotechnol.* 20:135-141; Pabo et al. (2001) *Ann. Rev. Biochem.* 70:313-340; Isalan et al. (2001) *Nature Biotechnol.* 19:656-660; Segal et al. (2001) *Curr. Opin. Biotechnol.* 12:632-637; Choo et al. (2000) *Curr. Opin. Struct. Biol.* 10:411-416. An engineered zinc finger binding domain or TALE protein can have a novel binding specificity, compared to a naturally-occurring protein. Engineering methods include, but are not limited to, rational design and various types of selection. Rational design includes, for example, using databases comprising triplet (or quadruplet) nucleotide sequences and individual zinc finger or TALE amino acid sequences, in which each triplet or quadruplet nucleotide sequence is associated with one or more amino acid sequences of zinc fingers or TALE repeat units which bind the particular triplet or quadruplet sequence. See, for example, U.S. Pat. Nos. 6,453,242 and 6,534,261, incorporated by reference herein in their entireties.

Selection of target sites; and methods for design and construction of fusion proteins (and polynucleotides encoding same) are known to those of skill in the art and described in detail in U.S. Pat. Nos. 7,888,121 and 8,409,861, incorporated by reference in their entireties herein.

In addition, as disclosed in these and other references, zinc finger domains, TALEs and/or multi-fingered zinc finger proteins may be linked together using any suitable linker sequences, including for example, linkers of 5 or more amino acids in length. See, e.g., U.S. Pat. Nos. 6,479,626; 6,903,185; and 7,153,949 for exemplary linker sequences 6 or more amino acids in length. The proteins described herein may include any combination of suitable linkers between the individual zinc fingers of the protein. See, also, U.S. Pat. No. 8,772,453.

Thus, nucleases such as ZFNs, TALENs and/or meganucleases can comprise any DNA-binding domain and any nuclease (cleavage) domain (cleavage domain, cleavage half-domain). As noted above, the cleavage domain may be heterologous to the DNA-binding domain, for example a zinc finger or TAL-effector DNA-binding domain and a cleavage domain from a nuclease or a meganuclease DNA-binding domain and cleavage domain from a different nuclease. Heterologous cleavage domains can be obtained from any endonuclease or exonuclease. Exemplary endonucleases from which a cleavage domain can be derived include, but are not limited to, restriction endonucleases and homing endonucleases. See, for example, 2002-2003 Catalogue, New England Biolabs, Beverly, MA; and Belfort et al. (1997) *Nucleic Acids Res.* 25:3379-3388. Additional enzymes which cleave DNA are known (e.g., S1 Nuclease; mung bean nuclease; pancreatic DNase I; micrococcal nuclease; yeast HO endonuclease; see also Linn et al. (eds.) Nucleases, Cold Spring Harbor Laboratory Press, 1993). One or more of these enzymes (or functional fragments thereof) can be used as a source of cleavage domains and cleavage half-domains.

Similarly, a cleavage half-domain can be derived from any nuclease or portion thereof, as set forth above, that requires dimerization for cleavage activity. In general, two fusion proteins are required for cleavage if the fusion proteins comprise cleavage half-domains. Alternatively, a single protein comprising two cleavage half-domains can be used. The two cleavage half-domains can be derived from the same endonuclease (or functional fragments thereof), or each cleavage half-domain can be derived from a different endonuclease (or functional fragments thereof). In addition, the target sites for the two fusion proteins are preferably disposed, with respect to each other, such that binding of the two fusion proteins to their respective target sites places the cleavage half-domains in a spatial orientation to each other that allows the cleavage half-domains to form a functional cleavage domain, e.g., by dimerizing. Thus, in certain embodiments, the near edges of the target sites are separated by 5-8 nucleotides or by 15-18 nucleotides. However, any integral number of nucleotides or nucleotide pairs can intervene between two target sites (e.g., from 2 to 50 nucleotide pairs or more). In general, the site of cleavage lies between the target sites, but may lie 1 or more kilobases away from the cleavage site, including between 1-50 base pairs (or any value therebetween including 1-5, 1-10, and 1-20 base pairs), 1-100 base pairs (or any value therebetween), 100-500 base pairs (or any value therebetween), 500 to 1000 base pairs (or any value therebetween) or even more than 1 kb from the cleavage site.

Restriction endonucleases (restriction enzymes) are present in many species and are capable of sequence-specific binding to DNA (at a recognition site), and cleaving DNA at or near the site of binding. Certain restriction enzymes (e.g., Type IIS) cleave DNA at sites removed from the recognition site and have separable binding and cleavage domains. For example, the Type IIS enzyme FokI catalyzes double-stranded cleavage of DNA, at 9 nucleotides from its recognition site on one strand and 13 nucleotides from its recognition site on the other. See, for example, U.S. Pat. Nos. 5,356,802; 5,436,150 and 5,487,994; as well as Li et al. (1992) *Proc. Natl. Acad. Sci. USA* 89:4275-4279; Li et al. (1993) *Proc. Natl. Acad. Sci. USA* 90:2764-2768; Kim et al. (1994a) *Proc. Natl. Acad. Sci. USA* 91:883-887; Kim et al. (1994b) *J. Biol. Chem.* 269:31,978-31,982. Thus, in one embodiment, fusion proteins comprise the cleavage domain (or cleavage half-domain) from at least one Type IIS restriction enzyme and one or more zinc finger binding domains, which may or may not be engineered.

An exemplary Type IIS restriction enzyme, whose cleavage domain is separable from the binding domain, is Fok I. This particular enzyme is active as a dimer. Bitinaite et al. (1998) *Proc. Natl. Acad. Sci. USA* 95: 10,570-10,575. Accordingly, for the purposes of the present disclosure, the portion of the Fok I enzyme used in the disclosed fusion proteins is considered a cleavage half-domain. Thus, for targeted double-stranded cleavage and/or targeted replacement of cellular sequences using zinc finger-Fok I fusions, two fusion proteins, each comprising a FokI cleavage half-domain, can be used to reconstitute a catalytically active cleavage domain. Alternatively, a single polypeptide molecule containing a zinc finger binding domain and two Fok I cleavage half-domains can also be used. Parameters for targeted cleavage and targeted sequence alteration using zinc finger-Fok I fusions are provided elsewhere in this disclosure.

A cleavage domain or cleavage half-domain can be any portion of a protein that retains cleavage activity, or that retains the ability to multimerize (e.g., dimerize) to form a functional cleavage domain.

Exemplary Type IIS restriction enzymes are described in International Publication WO 07/014275, incorporated herein in its entirety. Additional restriction enzymes also contain separable binding and cleavage domains, and these are contemplated by the present disclosure. See, for example, Roberts et al. (2003) *Nucleic Acids Res.* 31:418-420.

In certain embodiments, the cleavage domain comprises one or more engineered cleavage half-domain (also referred to as dimerization domain mutants) that minimize or prevent homodimerization, as described, for example, in U.S. Pat. Nos. 7,914,796; 8,034,598 and 8,623,618; and U.S. Patent Publication No. 20110201055, the disclosures of all of which are incorporated by reference in their entireties herein. Amino acid residues at positions 446, 447, 479, 483, 484, 486, 487, 490, 491, 496, 498, 499, 500, 531, 534, 537, and 538 of Fok I are all targets for influencing dimerization of the Fok I cleavage half-domains.

Exemplary engineered cleavage half-domains of Fok I that form obligate heterodimers include a pair in which a first cleavage half-domain includes mutations at amino acid residues at positions 490 and 538 of Fok I and a second cleavage half-domain includes mutations at amino acid residues 486 and 499.

Thus, in one embodiment, a mutation at 490 replaces Glu (E) with Lys (K); the mutation at 538 replaces Iso (I) with Lys (K); the mutation at 486 replaced Gln (Q) with Glu (E); and the mutation at position 499 replaces Iso (I) with Lys (K). Specifically, the engineered cleavage half-domains described herein were prepared by mutating positions 490 (E→K) and 538 (I→K) in one cleavage half-domain to produce an engineered cleavage half-domain designated "E490K:I538K" and by mutating positions 486 (Q→E) and 499 (I→L) in another cleavage half-domain to produce an engineered cleavage half-domain designated "Q486E: I499L". The engineered cleavage half-domains described herein are obligate heterodimer mutants in which aberrant cleavage is minimized or abolished. See, e.g., U.S. Pat. Nos. 7,914,796 and 8,034,598, the disclosures of which are incorporated by reference in their entireties for all purposes. In certain embodiments, the engineered cleavage half-domain comprises mutations at positions 486, 499 and 496 (numbered relative to wild-type FokI), for instance mutations that replace the wild type Gln (Q) residue at position 486 with a Glu (E) residue, the wild type Iso (I) residue at position 499 with a Leu (L) residue and the wild-type Asn (N) residue at position 496 with an Asp (D) or Glu (E) residue (also referred to as a "ELD" and "ELE" domains, respectively). In other embodiments, the engineered cleavage half-domain comprises mutations at positions 490, 538 and 537 (numbered relative to wild-type FokI), for instance mutations that replace the wild type Glu (E) residue at position 490 with a Lys (K) residue, the wild type Iso (I) residue at position 538 with a Lys (K) residue, and the wild-type His (H) residue at position 537 with a Lys (K) residue or a Arg (R) residue (also referred to as "KKK" and "KKR" domains, respectively). In other embodiments, the engineered cleavage half-domain comprises mutations at positions 490 and 537 (numbered relative to wild-type FokI), for instance mutations that replace the wild type Glu (E) residue at position 490 with a Lys (K) residue and the wild-type His (H) residue at position 537 with a Lys (K) residue or a Arg (R) residue (also referred to as "KIK" and "KIR" domains, respectively). See, e.g., U.S. Pat. Nos. 7,914,796; 8,034,598 and 8,623,618, the disclosures of which are incorporated by reference in its entirety for all purposes. In other embodiments, the engineered cleavage half domain comprises the "Sharkey" and/or "Sharkey" mutations (see Guo et al, (2010) *J. Mol. Biol.* 400(1):96-107).

Alternatively, nucleases may be assembled in vivo at the nucleic acid target site using so-called "split-enzyme" technology (see e.g. U.S. Patent Publication No. 20090068164). Components of such split enzymes may be expressed either on separate expression constructs or can be linked in one open reading frame where the individual components are separated, for example, by a self-cleaving 2A peptide or IRES sequence. Components may be individual zinc finger binding domains or domains of a meganuclease nucleic acid binding domain.

Nucleases (e.g., ZFNs and/or TALENs) can be screened for activity prior to use, for example in a yeast-based chromosomal system as described in as described in U.S. Pat. No. 8,563,314.

In certain embodiments, the nuclease comprises a CRISPR/Cas system. The CRISPR (clustered regularly interspaced short palindromic repeats) locus, which encodes RNA components of the system, and the Cas (CRISPR-associated) locus, which encodes proteins (Jansen et al., 2002. *Mol. Microbiol.* 43: 1565-1575; Makarova et al., 2002. *Nucleic Acids Res.* 30: 482-496; Makarova et al., 2006. *Biol. Direct* 1: 7; Haft et al., 2005. *PLoS Comput. Biol.* 1: e60) make up the gene sequences of the CRISPR/Cas nuclease system. CRISPR loci in microbial hosts contain a combination of CRISPR-associated (Cas) genes as well as non-coding RNA elements capable of programming the specificity of the CRISPR-mediated nucleic acid cleavage.

The Type II CRISPR is one of the most well characterized systems and carries out targeted DNA double-strand break in four sequential steps. First, two non-coding RNA, the pre-crRNA array and tracrRNA, are transcribed from the CRISPR locus. Second, tracrRNA hybridizes to the repeat regions of the pre-crRNA and mediates the processing of pre-crRNA into mature crRNAs containing individual spacer sequences. Third, the mature crRNA:tracrRNA complex directs Cas9 to the target DNA via Watson-Crick base-pairing between the spacer on the crRNA and the protospacer on the target DNA next to the protospacer adjacent motif (PAM), an additional requirement for target recognition. Finally, Cas9 mediates cleavage of target DNA to create a double-stranded break within the protospacer. Activity of the CRISPR/Cas system comprises of three steps: (i) insertion of alien DNA sequences into the CRISPR array to prevent future attacks, in a process called 'adaptation', (ii) expression of the relevant proteins, as well as expression and processing of the array, followed by (iii) RNA-mediated interference with the alien nucleic acid. Thus, in the bacterial cell, several of the so-called 'Cas' proteins are involved with the natural function of the CRISPR/Cas system and serve roles in functions such as insertion of the alien DNA etc.

In certain embodiments, Cas protein may be a "functional derivative" of a naturally occurring Cas protein. A "functional derivative" of a native sequence polypeptide is a compound having a qualitative biological property in common with a native sequence polypeptide. "Functional derivatives" include, but are not limited to, fragments of a native sequence and derivatives of a native sequence polypeptide and its fragments, provided that they have a biological activity in common with a corresponding native sequence polypeptide. A biological activity contemplated herein is the ability of the functional derivative to hydrolyze a DNA substrate into fragments. The term "derivative" encompasses both amino acid sequence variants of polypeptide, covalent modifications, and fusions thereof. Suitable derivatives of a Cas polypeptide or a fragment thereof include but are not limited to mutants, fusions, covalent modifications of Cas protein or a fragment thereof. Cas protein, which includes Cas protein or a fragment thereof, as well as derivatives of Cas protein or a fragment thereof, may be obtainable from a cell or synthesized chemically or by a combination of these two procedures. The cell may be a cell that naturally produces Cas protein, or a cell that naturally produces Cas protein and is genetically engineered to produce the endogenous Cas protein at a higher expression level or to produce a Cas protein from an exogenously introduced nucleic acid, which nucleic acid encodes a Cas that is same or different from the endogenous Cas. In some case, the cell does not naturally produce Cas protein and is genetically engineered to produce a Cas protein.

Exemplary CRISPR/Cas nuclease systems targeted to TCR genes and other genes are disclosed for example, in U.S. Publication No. 20150056705. The nuclease(s) may make one or more double-stranded and/or single-stranded cuts in the target site. In certain embodiments, the nuclease comprises a catalytically inactive cleavage domain (e.g., FokI and/or Cas protein). See, e.g., U.S. Pat. Nos. 9,200,266; 8,703,489 and Guillinger et al. (2014) *Nature Biotech.* 32(6):577-582. The catalytically inactive cleavage domain may, in combination with a catalytically active domain act as a nickase to make a single-stranded cut. Therefore, two nickases can be used in combination to make a double-stranded cut in a specific region. Additional nickases are also known in the art, for example, McCaffrey et al. (2016) *Nucleic Acids Res.* 44(2):e11. doi: 10.1093/nar/gkv878. Epub 2015 Oct. 19.

Target Sites

As described in detail above, DNA-binding domains can be engineered to bind to any sequence of choice. An engineered DNA-binding domain can have a novel binding specificity, compared to a naturally-occurring DNA-binding domain.

The nucleases described herein target a TCR or B2M gene for example in a target site of at least 9 nucleotides (e.g., 9, 10, 11, 12, 13, 14, 15, 16, 17, 18, 19, 20, 21 or more contiguous or non-contiguous) as shown in Table 1. Thus, the compositions described herein include cells in which: a TCR gene is modified (e.g., via insertions and/or deletions including insertion of a CAR or a CAR-HLA-E or CAR-HLA-G transgene) in exon c2 of the TCRA gene: a B2M gene is modified (e.g., via insertions and/or deletions including insertion of a CAR transgene) of exon 1 of the B2M gene; and/or a HPRT gene is modified (e.g., via insertions and/or deletions including insertion of a CAR or CAR-HLA-E or CAR-HLA-G transgene). The modifications may be within the target site or, alternatively, adjacent (e.g., within 1-5, 1-10 or 1-20 nucleotides) of the 3' or 5' edge of the target site. In still further embodiments, the modification may be between paired target sites of Table 1.

Donors

Any donor may be inserted integrated into the genome following nuclease-mediated cleavage as described herein. The donor may comprise one or more coding sequences (e.g., CARs); one or more RNAs (RNAi, shRNA, etc.); one or more non-coding sequences; and/or other sequences. The donor construct may be delivered to the cell or subject in mRNA form or using a viral or non-viral DNA vector as described herein. In certain embodiments, the donor is delivered in mRNA form or is carried on one or more AAV vectors, including but not limited to AAV1, AAV3, AAV4, AAV5, AAV6, AAV8, AAV8.2, AAV9 and AAVrh10 and/or pseudotyped AAV such as AAV2/8, AAV2/5 and AAV2/6.

In certain embodiments, the donor comprises one or more transgenes, including but not limited to one or more CAR-encoding sequences; as well one or more B2M encoding sequences; one or more HLA-G and/or HLA-E encoding sequences; one or more reporters (e.g., GFP), etc.

CAR-encoding sequences (to make CAR positive (+) T cells) may comprise extracellular single chain variable fragment (scFv) with specificity for a particular tumor antigen linked to an intracellular signaling part comprising a costimulatory domain and an activating domain. The costimulatory domain can be derived from, e.g., CD28, and the activating domain can be derived from, e.g., CD3-zeta. CAR transgenes may include two, three, four, or more costimulatory domains. The CAR scFv can be designed to target, for example, CD19, which is a transmembrane protein expressed by cells in the B cell lineage, including all normal B cells and B cell malignances, including but not limited to NHL, CLL, and non-T cell ALL. See, e.g., U.S. Pat. No. 9,855,298. In certain embodiments, the CAR comprises a CAR designated FMC63-CD8BBZ, in which FMC63 is an anti-CD19 scFv sequence (see, U.S. Pat. No. 9,701,758) and CD8BBZ refers to the portions of the CAR excluding the scFv (CD8 hinge/transmembrane domain (CD8), co-stimulation domain from 41BB gene (BB), activation domain from CD3z gene (Z)).

Any HLA-E and/or HLA-G-encoding sequence can be used in the compositions and methods described herein, including but not limited to allelic variants and/or functional fragments thereof. In certain embodiments, the transgene comprises a sequence encoding one of the two major HLA-E allelic variants is used: HLA-E*0101 (also referred to herein as ER or HLA-E0101) or HLA-E*0103 (also referred to herein as EG or HLA-E0103). HLA-E0101 and HLA-E0103 differ at only one amino acid position, where an arginine at position 107 in HLA-E0101 is replaced by a glycine in HLA-E0103 (Celik et al, ibid). In another embodiment, the donor comprises a fusion protein, for example a B2M-HLA-G and/or HLA-E fusion proteins. The components of the transgene encoding the fusion protein may be in any order including but not limited to: B2M gene sequences before HLA-G and/or HLA-E gene sequences; or HLA-G and/or HLA-E gene sequences before B2M gene sequences.

One or more donors may be used to introduce the transgenes, including, by way of example one donor for a CAR sequence, a B2M sequence, an HLA-E and/or HLA-G sequence (e.g., with a self-cleaving 2A peptide and/or linker between one or more of the sequences). In certain embodiments, the donor comprises a 2A sequence between the CAR-encoding sequence(s) and the sequence encoding B2M/HLA-G or E (e.g., a sequence encoding a B2M-HLA-G/E fusion protein). Alternatively, one donor for a CAR sequence and one or more separate donors for B2M, HLA-E and/or HLA-G genes may be used, for example a first CAR donor and a second donor for the B2M/HLA-E/G fusion protein (which may also further comprise one or more CAR sequences). In certain embodiments, the donor comprises a transgene encoding a CAR and a B2M-HLA-E and/or G fusion protein with a self-cleaving 2A peptide between the CAR and fusion protein and, additionally, one or more linkers (e.g., 1, 2, 3, 4, 5, 6 or more G4S4 linkers (SEQ ID NO: 68 between the protein coding sequences of the fusion proteins.

Any of the donors described herein may include homology arms (to the gene targeted by the nuclease) of any length. See, e.g., U.S. Pat. No. 8,822,221; 7,972,854. "Long homology arms" are ~1 Kb in length, while "short homology arms" are anywhere from ~250 bp to 750 bp in length.

Furthermore, any of the donors may include any combination of components, including but not limited to, homology arms; one or more transgenes (whose expression is driven by the same or different control elements) such as a reporter, B2M, HLA-G, HLA-E and/or one or more CARs; as well as additional sequences such as one or more constitutive or inducible promoters (e.g., PGK), one or more enhancer sequences (e.g., TCR enhancer sequences); 2A sequences; polyadenylation signal(s); IRES sequence, 5'UTR and/or 3' UTR regions; and/or one or more (G4S) 4 linkers (SEQ ID NO: 69). In certain embodiments, a *Xenopus* beta globin sequence (e.g., in the 5'UTR).

Any of the donors may comprise a WPRE sequence. Any WPRE sequence can be used in the practice of the present invention. Non-limiting examples of suitable sequences are disclosed in U.S. Patent Publication No. 20160326548 and U.S. Pat. Nos. 6,136,597; 6,284,469; 6,312,912; and 6,287,814. In certain embodiments, the WPRE sequence comprises a mutation as compared to wild-type. See, e.g., U.S. Pat. No. 7,419,829 and Zanta-Boussif et al. (2009) *Gene Therapy* 16:605-619 or a truncation (Choi et al, ibid). One or more of the same or different WPRE sequences may also be used. The WPRE may be in the 3'UTR and/or 5'UTR of the donor. In certain embodiments, the WPRE sequences comprise:

(SEQ ID NO: 64)
AATCAACCTCTGGATTACAAAATTTGTGAAAGATTGACTGGTATTCTTAA

CTATGTTGCTCCTTTTACGCTATGTGGATACGCTGCTTTAATGCCTTTGT

ATCATGCTATTGCTTCCCGTATGGCTTTCATTTTCTCCTCCTTGTATAAA

TCCTGGTTGCTGTCTCTTTATGAGGAGTTGTGGCCCGTTGTCAGGCAACG

TGGCGTGGTGTGCACTGTGTTTGCTGACGCAACCCCCACTGGTTGGGGCA

TTGCCACCACCTGTCAGCTCCTTTCCGGGACTTTCGCTTTCCCCCTCCCT

ATTGCCACGGCGGAACTCATCGCCGCCTGCCTTGCCCGCTGCTGGACAGG

GGCTCGGCTGTTGGGCACTGACAATTCCGTGGTGTTGTCGGGGAAGCTGA

CGTCCTTTCCATGGCTGCTCGCCTGTGTTGCCACCTGGATTCTGCGCGGG

ACGTCCTTCTGCTACGTCCCTTCGGCCCTCAATCCAGCGGACCTTCCTTC

CCGCGGCCTGCTGCCGGCTCTGCGGCCTCTTCCGCGTCTTCGCCTTCGCC

CTCAGACGAGTCGGATCTCCCTTTGGGCCGCCTCCCCGCCTG

In addition, the donors may include one or more T cell receptor enhancer, including TCRa enhancer sequence. See, e.g., Ho & Leiden (1990) *Mol. Cell. Biol.* 10(9):4720-4727; Kappes et al. (1991) *Proc. Nat'l. Acad. Sci.* USA 88:2204-2208. In certain embodiments, the T cell receptor enhancer comprises the sequence:

(SEQ ID NO: 65)
GATATCATTGGTCAATTGCAGCAGACATGTCTCTTGTGGTGTAAAGCCTC

ATAGCATCTTCCTGCTGGAGTCCACCTGGCAGCCCAAAGCCTCAGCAAGT

GCTGGGGACAGAGAGATAGAAAGGCTTTGCTGTGGCTCAACTCAGTTGTA

CTTTCTCAAGCTCCTTTTGGTTATCTGCTCTGTCTATGTAGTTGCTTCCT

GGAAAATGGTTAAAGTCAAACCTCCTCTGTTTGGGGCAGCACAAAATGTT

GCTAAGGCGTTAGAAGACAACATAGGAGCAGTTAAACCACAGCCAGTTTT

TGCTCGCTTTCGAAAGACCACAGCTATTAGACAGAAAACCTCCTGTACTG

GAAGTGGCCCTGAAACAGCATCTGTGCTGACAGACACTGGGCTTGCTATG

GTTGCTGCTCATCATGCTCAGCTG.

In other embodiments, a TCRα enhancer sequence as follows:

(SEQ ID NO: 66)
CTCCCATTTCCATGACGTCATGGTTAAACCTCTTTTACCTGCTTTAACC
CTTTGAAGCTCTCCCGCAGAAGCCACATCCTCTG.

Thus, non-limiting examples of donors include:
(1) A donor with long homology arms (long arms) comprising the following sequences: a PGK promoter sequence operably linked to a transgene (GFP, CAR, etc.) flanked by homology arms (to B2M) of ~1 Kb in size each;
(2) A donor with short homology arms (short arms) comprising the following: a PGK promoter sequence operably linked to a transgene flanked by homology arms (to B2M) of 250 bp in size each;
(3) The donor of (2) further comprising a WPRE sequence in the 3' UTR, for example a WPRE sequence comprising:

(SEQ ID NO: 64)
AATCAACCTCTGGATTACAAAATTTGTGAAAGATTGACTGGTATTC

TTAACTATGTTGCTCCTTTTACGCTATGTGGATACGCTGCTTTAATG

CCTTTGTATCATGCTATTGCTTCCCGTATGGCTTTCATTTTCTCCTCC

TTGTATAAATCCTGGTTGCTGTCTCTTTATGAGGAGTTGTGGCCCGT

TGTCAGGCAACGTGGCGTGGTGTGCACTGTGTTTGCTGACGCAACC

CCCACTGGTTGGGGCATTGCCACCACCTGTCAGCTCCTTTCCGGGA

CTTTCGCTTTCCCCCTCCCTATTGCCACGGCGGAACTCATCGCCGCC

TGCCTTGCCCGCTGCTGGACAGGGGCTCGGCTGTTGGGCACTGACA

ATTCCGTGGTGTTGTCGGGGAAGCTGACGTCCTTTCCATGGCTGCT

CGCCTGTGTTGCCACCTGGATTCTGCGCGGGACGTCCTTCTGCTAC

GTCCCTTCGGCCCTCAATCCAGCGGACCTTCCTTCCCGCGGCCTGC

TGCCGGCTCTGCGGCCTCTTCCGCGTCTTCGCCTTCGCCCTCAGACG

AGTCGGATCTCCCTTTGGGCCGCCTCCCCGCCTG;

(4) The donor of (2) further comprising a T cell enhancer sequence upstream of the PGK promoter, for example a sequence as follows:

(SEQ ID NO: 65)
GATATCATTGGTCAATTGCAGCAGACATGTCTCTTGTGGTGTAAAG

CCTCATAGCATCTTCCTGCTGGAGTCCACCTGGCAGCCCAAAGCCT

CAGCAAGTGCTGGGACAGAGAGATAGAAAGGCTTTGCTGTGGCT

CAACTCAGTTGTACTTTCTCAAGCTCCTTTTGGTTATCTGCTCTGTC

TATGTAGTTGCTTCCTGGAAAATGGTTAAAGTCAAACCTCCTCTGT

TTGGGGCAGCACAAAATGTTGCTAAGGCGTTAGAAGACAACATAG

-continued

```
GAGCAGTTAAACCACAGCCAGTTTTTGCTCGCTTTCGAAAGACCAC

AGCTATTAGACAGAAAACCTCCTGTACTGGAAGTGGCCCTGAAAC

AGCATCTGTGCTGACAGACACTGGGCTTGCTATGGTTGCTGCTCAT

CATGCTCAGCTG;
```
or (5) The donor of (2) further comprising a TCRα enhancer sequence, for example a sequence as follows:

```
                                        (SEQ ID NO: 66)
CTCCCATTTCCATGACGTCATGGTTAAACCTCTTTTACCTGCTTTAA

CCCTTTGAAGCTCTCCCGCAGAAGCCACATCCTCTG;
```

(6) The donor of (2) further including a sequence from the 5' untranslated region of the *Xenopus* beta globin gene, optionally a sequence as follows:

```
                                        (SEQ ID NO: 67)
TGCTTGTTCTTTTTGCAGAAGCTCAGAATAAACGCTCAACTTTGGC

AGAT
```

(7) a donor containing with short homology arms (a left arm of 423 bp and a right arm of 393 bp) to TRAC site E flanking a transgene (e.g., GFP, CAR, B2M, HLA-E and/or HLA-G) driven by the hPGK promotor. The donor also optionally comprises a 'miseq tag' that allows quantitation of TI into the TRAC locus by miseq;

(8) a donor with long homology arms (a left arm of 1000 bp and a right arm of 992 bp) to TRAC site E flanking a transgene (e.g., GFP, CAR, B2M, HLA-E and/or HLA-G) driven by the hPGK promotor. The donor does not comprise a 'miseq tag';

(9) a donor with short homology arms (left arm of 350 bp and a right arm of 393 bp) to TRAC site E flanking a transgene (e.g., GFP, CAR, B2M, HLA-E and/or HLA-G) driven by the hPGK promotor and a mutated WPRE element (following the transgene). The donor also optionally contains a 'miseq tag';

(10) a donor containing with short homology arms (a left arm of 423 bp and a right arm of 393 bp) to TRAC site E flanking a FMC63-CD8BBZ CAR transgene driven by the hPGK promotor. The donor also optionally comprises a 'miseq tag' that allows quantitation of TI into the TRAC locus by miseq;

(11) the donor of (10) further comprising a WPRE sequence following the transgene sequence;

(12) a donor with short homology arms (360 bp and a right arm of 393 bp) to TRAC site E flanking a FMC63-CD8BBZ CAR transgene linked by a self-cleaving P2A peptide to a fusion protein expressing B2M and HLA-E. The transgene is driven by the hPGK promotor and is followed by a mutated WPRE element. The donor also optionally contains a 'miseq tag';

(13) the donor of (12) in which HLA-E is replaced with HLA-G;

(14) the donor of (13) comprising both HLA-E and HLA-G;

(15) a donor with long homology arms (e.g., a left arm of 1000 bp and a right arm of 992 bp) to TRAC site E flanking a HLA-G transgene driven by the hPGK promotor;

(16) the donor of (15) in which the HLA-G transgene is replaced with an HLA-E transgene (e.g., HLA E0101 or E0103 (Celik et al, ibid));

(17) a donor (15) further comprising an HLA-G transgene;

(18) a donor of any of (15) to (17) further comprising a B2M-encoding sequence linked to the HLA-E and/or HLA-G transgene, optionally via a linker with 1, 2, 3, 4, 5, 6 or more copies of the G4S peptide (SEQ ID NO: 68) between any of the transgene (e.g., between B2M and HLA-G; between B2M and HLA-E; between B2M, HLA-G and HLA-E; between HLA-G and HLA-E, etc.);

(19) a donor of any of (15) to (18) optionally further comprising a signal peptide before one or more of the transgenes (e.g., B2M and HLA-E/G or only B2M, for example a donor in which does not comprise a single peptide for HLA-G);

(20) a donor of any of (15) to (19) further comprising a CAR transgene (e.g., FMC63-CD8BBZ), optionally linked by a self-cleaving P2A peptide to a fusion protein expressing B2M and HLA-G and/or HLA-E.; and

(21) the donor of (20) further comprising a mutated WPRE element and optionally a miseq tag.

Delivery

The proteins (e.g., transcription factors, nucleases, TCR and CAR molecules), polynucleotides and/or compositions comprising the proteins and/or polynucleotides described herein may be delivered to a target cell by any suitable means, including, for example, by injection of the protein and/or mRNA components. In some aspects, the nucleases and/or donors are delivered as mRNAs and the transgene is delivered via other modalities such as viral vectors, minicircle DNA, plasmid DNA, single-stranded DNA, linear DNA, liposomes, nanoparticles and the like. See, e.g., U.S. Patent No. 20140335063. In some embodiments, the proteins are introduced into the cell by cell squeezing (see Kollmannsperger et al (2016) *Nat Comm* 7, 10372 doi: 10.1038/ncomms10372).

Suitable cells include but not limited to eukaryotic and prokaryotic cells and/or cell lines. Non-limiting examples of such cells or cell lines generated from such cells include T-cells, COS, CHO (e.g., CHO-S, CHO-K1, CHO-DG44, CHO-DUXB11, CHO-DUKX, CHOK1SV), VERO, MDCK, W138, V79, B14AF28-G3, BHK, HaK, NS0, SP2/0-Ag14, HeLa, HEK293 (e.g., HEK293-F, HEK293-H, HEK293-T), and perC6 cells as well as insect cells such as *Spodoptera fugiperda* (Sf), or fungal cells such as *Saccharomyces, Pichia* and *Schizosaccharomyces*. In certain embodiments, the cell line is a CHO-K1, MDCK or HEK293 cell line. Suitable cells also include stem cells such as, by way of example, embryonic stem cells, induced pluripotent stem cells (iPS cells), hematopoietic stem cells, neuronal stem cells and mesenchymal stem cells.

Methods of delivering proteins comprising DNA-binding domains as described herein are described, for example, in U.S. Pat. Nos. 6,453,242; 6,503,717; 6,534,261; 6,599,692; 6,607,882; 6,689,558; 6,824,978; 6,933,113; 6,979,539; 7,013,219; and 7,163,824, the disclosures of all of which are incorporated by reference herein in their entireties.

DNA binding domains and fusion proteins comprising these DNA binding domains as described herein may also be delivered using vectors containing sequences encoding one or more of the DNA-binding protein(s). Additionally, additional nucleic acids (e.g., donors) also may be delivered via these vectors. Any vector systems may be used including, but not limited to, plasmid vectors, retroviral vectors, lentiviral vectors, adenovirus vectors, poxvirus vectors; herpesvirus vectors and adeno-associated virus vectors, etc. See, also, U.S. Pat. Nos. 6,534,261; 6,607,882; 6,824,978; 6,933,113; 6,979,539; 7,013,219; and 7,163,824, incorporated by reference herein in their entireties. Furthermore, it will be apparent that any of these vectors may comprise one or more DNA-binding protein-encoding sequences and/or additional nucleic acids as appropriate. Thus, when one or more DNA-binding proteins as described herein are introduced into the cell, and additional DNAs as appropriate, they may be carried on the same vector or on different vectors. When multiple vectors are used, each vector may comprise a sequence encoding one or multiple DNA-binding proteins and additional nucleic acids as desired.

Conventional viral and non-viral based gene transfer methods can be used to introduce nucleic acids encoding engineered DNA-binding proteins in cells (e.g., mammalian cells) and target tissues and to co-introduce additional nucleotide sequences as desired. Such methods can also be used to administer nucleic acids (e.g., encoding DNA-binding proteins and/or donors) to cells in vitro. In certain embodiments, nucleic acids are administered for in vivo or ex vivo gene therapy uses. Non-viral vector delivery systems include DNA plasmids, naked nucleic acid, and nucleic acid complexed with a delivery vehicle such as a liposome, lipid nanoparticle or poloxamer. Viral vector delivery systems include DNA and RNA viruses, which have either episomal or integrated genomes after delivery to the cell. For a review of gene therapy procedures, see Anderson, *Science* 256:808-813 (1992); Nabel & Felgner, *TIBTECH* 11:211-217 (1993); Mitani & Caskey, *TIBTECH* 11:162-166 (1993); Dillon, *TIBTECH* 11:167-175 (1993); Miller, *Nature* 357:455-460 (1992); Van Brunt, *Biotechnology* 6(10):1149-1154 (1988); Vigne, *Restorative Neurology andNeuroscience* 8:35-36 (1995); Kremer & Perricaudet, *British Medical Bulletin* 51(1):31-44 (1995); Haddada et al., in *Current Topics in Microbiology and Immunology* Doerfler and Bohm (eds.) (1995); and Yu et al., *Gene Therapy* 1:13-26 (1994).

Methods of non-viral delivery of nucleic acids include electroporation, lipofection, microinjection, biolistics, virosomes, liposomes, lipid nanoparticles, immunoliposomes, polycation or lipid:nucleic acid conjugates, naked DNA, mRNA, artificial virions, and agent-enhanced uptake of DNA. Sonoporation using, e.g., the Sonitron 2000 system (Rich-Mar) can also be used for delivery of nucleic acids. In a preferred embodiment, one or more nucleic acids are delivered as mRNA. Also preferred is the use of capped mRNAs to increase translational efficiency and/or mRNA stability. Especially preferred are ARCA (anti-reverse cap analog) caps or variants thereof. See U.S. Pat. Nos. 7,074,596 and 8,153,773, incorporated by reference herein.

Additional exemplary nucleic acid delivery systems include those provided by Amaxa Biosystems (Cologne, Germany), Maxcyte, Inc. (Rockville, Maryland), BTX Molecular Delivery Systems (Holliston, MA) and Copernicus Therapeutics Inc, (see for example U.S. Pat. No. 6,008,336). Lipofection is described in e.g., U.S. Pat. Nos. 5,049,386, 4,946,787; and 4,897,355) and lipofection reagents are sold commercially (e.g., Transfectam™, Lipofectin™, and Lipofectamine™ RNAiMAX). Cationic and neutral lipids that are suitable for efficient receptor-recognition lipofection of polynucleotides include those of Felgner, WO 91/17424, WO 91/16024. Delivery can be to cells (ex vivo administration) or target tissues (in vivo administration).

The preparation of lipid:nucleic acid complexes, including targeted liposomes such as immunolipid complexes, is well known to one of skill in the art (see, e.g., Crystal, *Science* 270:404-410 (1995); Blaese et al., *Cancer Gene Ther.* 2:291-297 (1995); Behr et al., *Bioconjugate Chem.* 5:382-389 (1994); Remy et al., *Bioconjugate Chem.* 5:647-654 (1994); Gao et al., *Gene Therapy* 2:710-722 (1995); Ahmad et al., *Cancer Res.* 52:4817-4820 (1992); U.S. Pat. Nos. 4,186,183, 4,217,344, 4,235,871, 4,261,975, 4,485,054, 4,501,728, 4,774,085, 4,837,028, and 4,946,787).

Additional methods of delivery include the use of packaging the nucleic acids to be delivered into EnGeneIC delivery vehicles (EDVs). These EDVs are specifically delivered to target tissues using bispecific antibodies where one arm of the antibody has specificity for the target tissue and the other has specificity for the EDV. The antibody brings the EDVs to the target cell surface and then the EDV is brought into the cell by endocytosis. Once in the cell, the contents are released (see MacDiarmid et al (2009) *Nature Biotechnology* 27(7) p. 643).

The use of RNA or DNA viral based systems for the delivery of nucleic acids encoding engineered DNA-binding proteins, and/or donors (e.g. CARs or ACTRs) as desired takes advantage of highly evolved processes for targeting a virus to specific cells in the body and trafficking the viral payload to the nucleus. Viral vectors can be administered directly to patients (in vivo) or they can be used to treat cells in vitro and the modified cells are administered to patients (ex vivo). Conventional viral based systems for the delivery of nucleic acids include, but are not limited to, retroviral, lentivirus, adenoviral, adeno-associated, vaccinia and herpes simplex virus vectors for gene transfer. Integration in the host genome is possible with the retrovirus, lentivirus, and adeno-associated virus gene transfer methods, often resulting in long term expression of the inserted transgene. Additionally, high transduction efficiencies have been observed in many different cell types and target tissues.

The tropism of a retrovirus can be altered by incorporating foreign envelope proteins, expanding the potential target population of target cells. Lentiviral vectors are retroviral vectors that are able to transduce or infect non-dividing cells and typically produce high viral titers. Selection of a retroviral gene transfer system depends on the target tissue. Retroviral vectors are comprised of cis-acting long terminal repeats with packaging capacity for up to 6-10 kb of foreign sequence. The minimum cis-acting LTRs are sufficient for replication and packaging of the vectors, which are then used to integrate the therapeutic gene into the target cell to provide permanent transgene expression. Widely used retroviral vectors include those based upon murine leukemia virus (MuLV), gibbon ape leukemia virus (GaLV), Simian Immunodeficiency virus (SIV), human immunodeficiency virus (HIV), and combinations thereof (see, e.g., Buchscher et al., *J. Virol.* 66:2731-2739 (1992); Johann et al., *J. Virol.* 66:1635-1640 (1992); Sommerfelt et al., *Virol.* 176:58-59 (1990); Wilson et al., *J. Virol.* 63:2374-2378 (1989); Miller et al., *J. Virol.* 65:2220-2224 (1991); PCT/US94/05700).

In applications in which transient expression is preferred, adenoviral based systems can be used. Adenoviral based vectors are capable of very high transduction efficiency in many cell types and do not require cell division. With such vectors, high titer and high levels of expression have been obtained. This vector can be produced in large quantities in a relatively simple system. Adeno-associated virus ("AAV") vectors are also used to transduce cells with target nucleic acids, e.g., in the in vitro production of nucleic acids and peptides, and for in vivo and ex vivo gene therapy procedures (see, e.g., West et al., *Virology* 160:38-47 (1987); U.S. Pat. No. 4,797,368; WO 93/24641; Kotin, *Human Gene*

*Therapy* 5:793-801 (1994); Muzyczka, *J. Clin. Invest.* 94:1351 (1994). Construction of recombinant AAV vectors are described in a number of publications, including U.S. Pat. No. 5,173,414; Tratschin et al., *Mol. Cell. Biol.* 5:3251-3260 (1985); Tratschin, et al., *Mol. Cell. Biol.* 4:2072-2081 (1984); Hermonat & Muzyczka, *PNAS USA* 81:6466-6470 (1984); and Samulski et al., *J. Virol.* 63:03822-3828 (1989).

At least six viral vector approaches are currently available for gene transfer in clinical trials, which utilize approaches that involve complementation of defective vectors by genes inserted into helper cell lines to generate the transducing agent.

pLASN and MFG-S are examples of retroviral vectors that have been used in clinical trials (Dunbar et al., *Blood* 85:3048-305 (1995); Kohn et al., *Nat. Med.* 1:1017-102 (1995); Malech et al., *PNAS USA* 94:22 12133-12138 (1997)). PA317/pLASN was the first therapeutic vector used in a gene therapy trial. (Blaese et al., *Science* 270:475-480 (1995)). Transduction efficiencies of 50% or greater have been observed for MFG-S packaged vectors. (Ellem et al., *Immunol Immunother.* 44(1): 10-20 (1997); Dranoff et al., *Hum. Gene Ther.* 1:111-2 (1997).

Recombinant adeno-associated virus vectors (rAAV) are a promising alternative gene delivery system based on the defective and nonpathogenic parvovirus adeno-associated type 2 virus. All vectors are derived from a plasmid that retains only the AAV 145 bp inverted terminal repeats flanking the transgene expression cassette. Efficient gene transfer and stable transgene delivery due to integration into the genomes of the transduced cell are key features for this vector system. (Wagner et al., *Lancet* 351:9117 1702-3 (1998), Kearns et al., *Gene Ther.* 9:748-55 (1996)). Other AAV serotypes, including AAV1, AAV3, AAV4, AAV5, AAV6, AAV8, AAV8.2, AAV9 and AAVrh10 and pseudotyped AAV such as AAV2/8, AAV2/5 and AAV2/6 can also be used in accordance with the present invention.

Replication-deficient recombinant adenoviral vectors (Ad) can be produced at high titer and readily infect a number of different cell types. Most adenovirus vectors are engineered such that a transgene replaces the Ad E1a, E1b, and/or E3 genes; subsequently the replication defective vector is propagated in human 293 cells that supply deleted gene function in trans. Ad vectors can transduce multiple types of tissues in vivo, including nondividing, differentiated cells such as those found in liver, kidney and muscle. Conventional Ad vectors have a large carrying capacity. An example of the use of an Ad vector in a clinical trial involved polynucleotide therapy for antitumor immunization with intramuscular injection (Sterman et al., *Hum. Gene Ther.* 7:1083-9 (1998)). Additional examples of the use of adenovirus vectors for gene transfer in clinical trials include Rosenecker et al., *Infection* 24:1 5-10 (1996); Sterman et al., *Hum. Gene Ther.* 9:7 1083-1089 (1998); Welsh et al., *Hum. Gene Ther.* 2:205-18 (1995); Alvarez et al., *Hum. Gene Ther.* 5:597-613 (1997); Topf et al., *Gene Ther.* 5:507-513 (1998); Sterman et al., *Hum. Gene Ther.* 7:1083-1089 (1998).

Packaging cells are used to form virus particles that are capable of infecting a host cell. Such cells include 293 cells, which package adenovirus, and ψ2 cells or PA317 cells, which package retrovirus. Viral vectors used in gene therapy are usually generated by a producer cell line that packages a nucleic acid vector into a viral particle. The vectors typically contain the minimal viral sequences required for packaging and subsequent integration into a host (if applicable), other viral sequences being replaced by an expression cassette encoding the protein to be expressed. The missing viral functions are supplied in trans by the packaging cell line. For example, AAV vectors used in gene therapy typically only possess inverted terminal repeat (ITR) sequences from the AAV genome which are required for packaging and integration into the host genome. Viral DNA is packaged in a cell line, which contains a helper plasmid encoding the other AAV genes, namely rep and cap, but lacking ITR sequences. The cell line is also infected with adenovirus as a helper. The helper virus promotes replication of the AAV vector and expression of AAV genes from the helper plasmid. The helper plasmid is not packaged in significant amounts due to a lack of ITR sequences. Contamination with adenovirus can be reduced by, e.g., heat treatment to which adenovirus is more sensitive than AAV. In addition, AAV can be manufactured using a baculovirus system (see e.g. U.S. Pat. Nos. 6,723,551 and 7,271,002).

Purification of AAV particles from a 293 or baculovirus system typically involves growth of the cells which produce the virus, followed by collection of the viral particles from the cell supernatant or lysing the cells and collecting the virus from the crude lysate. AAV is then purified by methods known in the art including ion exchange chromatography (e.g. see U.S. Pat. Nos. 7,419,817 and 6,989,264), ion exchange chromatography and CsCl density centrifugation (e.g. PCT publication WO2011094198A10), immunoaffinity chromatography (e.g. WO2016128408) or purification using AVB Sepharose (e.g. GE Healthcare Life Sciences).

In many gene therapy applications, it is desirable that the gene therapy vector be delivered with a high degree of specificity to a particular tissue type. Accordingly, a viral vector can be modified to have specificity for a given cell type by expressing a ligand as a fusion protein with a viral coat protein on the outer surface of the virus. The ligand is chosen to have affinity for a receptor known to be present on the cell type of interest. For example, Han et al., (*Proc. Natl. Acad. Sci. USA* 92:9747-9751 (1995)), reported that Moloney murine leukemia virus can be modified to express human heregulin fused to gp70, and the recombinant virus infects certain human breast cancer cells expressing human epidermal growth factor receptor. This principle can be extended to other virus-target cell pairs, in which the target cell expresses a receptor and the virus expresses a fusion protein comprising a ligand for the cell-surface receptor. For example, filamentous phage can be engineered to display antibody fragments (e.g., FAB or Fv) having specific binding affinity for virtually any chosen cellular receptor. Although the above description applies primarily to viral vectors, the same principles can be applied to nonviral vectors. Such vectors can be engineered to contain specific uptake sequences which favor uptake by specific target cells.

Gene therapy vectors can be delivered in vivo by administration to an individual patient, typically by systemic administration (e.g., intravenous, intraperitoneal, intramuscular, subdermal, or intracranial infusion) or topical application, as described below. Alternatively, vectors can be delivered to cells ex vivo, such as cells explanted from an individual patient (e.g., lymphocytes, bone marrow aspirates, tissue biopsy) or universal donor hematopoietic stem cells, followed by re-implantation of the cells into a patient, usually after selection for cells which have incorporated the vector.

Ex vivo cell transfection for diagnostics, research, transplant or for gene therapy (e.g., via re-infusion of the transfected cells into the host organism) is well known to those of skill in the art. In a preferred embodiment, cells are isolated from the subject organism, transfected with a DNA-binding proteins nucleic acid (gene or cDNA), and re-infused back into the subject organism (e.g., patient). Various cell types suitable for ex vivo transfection are well known to those of skill in the art (see, e.g., Freshney et al., *Culture of Animal Cells, A Manual of Basic Technique* (3rd ed. 1994)) and the references cited therein for a discussion of how to isolate and culture cells from patients).

In one embodiment, stem cells are used in ex vivo procedures for cell transfection and gene therapy. The advantage to using stem cells is that they can be differentiated into other cell types in vitro, or can be introduced into a mammal (such as the donor of the cells) where they will engraft in the bone marrow. Methods for differentiating CD34+ cells in vitro into clinically important immune cell types using cytokines such a GM-CSF, IFN-γ and TNF-α are known (see Inaba et al., *J. Exp. Med.* 176:1693-1702 (1992)).

Stem cells are isolated for transduction and differentiation using known methods. For example, stem cells are isolated from bone marrow cells by panning the bone marrow cells with antibodies which bind unwanted cells, such as CD4+ and CD8+ (T cells), CD45+ (panB cells), GR-1 (granulocytes), and lad (differentiated antigen presenting cells) (see Inaba et al., *J. Exp. Med.* 176:1693-1702 (1992)).

Stem cells that have been modified may also be used in some embodiments. For example, neuronal stem cells that have been made resistant to apoptosis may be used as therapeutic compositions where the stem cells also contain the ZFP TFs of the invention. Resistance to apoptosis may come about, for example, by knocking out BAX and/or BAK using BAX- or BAK-specific ZFNs (see, US Patent Publication No. 20100003756) in the stem cells, or those that are disrupted in a caspase, again using caspase-6 specific ZFNs for example. These cells can be transfected with the ZFP TFs that are known to regulate TCR.

Vectors (e.g., retroviruses, adenoviruses, liposomes, etc.) containing therapeutic DNA-binding proteins (or nucleic acids encoding these proteins) can also be administered directly to an organism for transduction of cells in vivo. Alternatively, naked DNA can be administered. Administration is by any of the routes normally used for introducing a molecule into ultimate contact with blood or tissue cells including, but not limited to, injection, infusion, topical application and electroporation. Suitable methods of administering such nucleic acids are available and well known to those of skill in the art, and, although more than one route can be used to administer a particular composition, a particular route can often provide a more immediate and more effective reaction than another route.

Methods for introduction of DNA into hematopoietic stem cells are disclosed, for example, in U.S. Pat. No. 5,928,638. Vectors useful for introduction of transgenes into hematopoietic stem cells, e.g., CD34+ cells, include adenovirus Type 35.

Vectors suitable for introduction of transgenes into immune cells (e.g., T-cells) include non-integrating lentivirus vectors. See, for example, Ory et al. (1996) *Proc. Natl. Acad. Sci. USA* 93:11382-11388; Dull et al. (1998) *J. Virol.* 72:8463-8471; Zuffery et al. (1998) *J. Virol.* 72:9873-9880; Follenzi et al. (2000) *Nature Genetics* 25:217-222.

Pharmaceutically acceptable carriers are determined in part by the particular composition being administered, as well as by the particular method used to administer the composition. Accordingly, there is a wide variety of suitable formulations of pharmaceutical compositions available, as described below (see, e.g., *Remington's Pharmaceutical Sciences*, 17th ed., 1989).

As noted above, the disclosed methods and compositions can be used in any type of cell including, but not limited to, prokaryotic cells, fungal cells, Archaeal cells, plant cells, insect cells, animal cells, vertebrate cells, mammalian cells and human cells, including T-cells and stem cells of any type. Suitable cell lines for protein expression are known to those of skill in the art and include, but are not limited to COS, CHO (e.g., CHO-S, CHO-K1, CHO-DG44, CHO-DUXB11), VERO, MDCK, WI38, V79, B14AF28-G3, BHK, HaK, NS0, SP2/0-Ag14, HeLa, HEK293 (e.g., HEK293-F, HEK293-H, HEK293-T), perC6, insect cells such as *Spodoptera fugiperda* (Sf), and fungal cells such as *Saccharomyces*, *Pichia* and *Schizosaccharomyces*. Progeny, variants and derivatives of these cell lines can also be used.

Applications

The disclosed compositions and methods can be used for any application in which it is desired to generate T cells that respond (armed T-cells) to specific surface antigens on cells, including, but not limited to, therapeutic and research applications.

For example, the disclosed compositions can be used in vivo and/or ex vivo (cell therapies) to disrupt the expression of functional endogenous TCRs and/or HLA complexes in T cells modified for adoptive cell therapy to express one or more exogenous CARs, exogenous TCRs, or other cancer-specific receptor molecules, thereby treating and/or preventing the cancer. In addition, in such settings, abrogation of functional TCR expression and/or HLA expression within a cell can eliminate or substantially reduce the risk of an unwanted cross reaction with healthy, nontargeted tissue (i.e. a graft-vs-host response). Further, inclusion of a modified HLA-E or HLA-G transgene such that the cell will express a modified HLA-E or HLA-G complex can help avoid killing by host NK cells. Thus, universal donor T cells can be generated comprising a CAR, optionally with a modified HLA-E or HLA-G complex, such that these universal cells can be given to any patient in need thereof.

Further, the engineered, CAR-comprising T cells may comprise additional transgenes that may be useful for adoptive cell therapy. For example, these cells may comprise suicide genes regulated by an exogenous signal to cause the engineered T cells to apoptose upon activation of the expression of the suicide gene (Wang et al. (2017) *J. Hematol Oncol* 10:53). Overexpression of the CD40L in CAR-T cells has also been shown to be beneficial to the potency of the CAR-Ts (see Curran et al (2015) *Mol Ther.* 23:769-78). Several groups have now devised the "fourth generation" CAR T-cells combining IL-12 secretion with CAR expression. Koneru and colleagues (*Oncoimmunology* (2015); 4:e994446) used the so called 'T-cells redirected for universal cytokine-mediated killing' (TRUCK) to treat ovarian cancer in an orthotropic ovarian tumorgraft model.

Other transgenes may comprise additional CAR sequences that are specific for other antigens of interest or a transgene expressing a modified HLA-E or HLA-G. It has been shown that the adoptive transfer of T cells expressing anti-CD19 chimeric antigen receptors (CARs) has remarkable curative potential against advanced B-cell malignancies, but multiple trials have also reported patient relapses due to the emergence of CD19-negative leukemic cells. Thus, use of two CARs, and optionally expressing a modified HLA-E or HLA-G complex, wherein one CAR is specific for CD19 and the other specific for CD20 may prevent relapse. Additionally, rather than use of two separate CAR constructs, the CAR transgene itself may encode a bi-specific CAR, capable of recognizing both CD19 and CD20 (Zah et al (2016) *Cancer Immunol Res,* 4(6): 498-508). T cells armed with CD19-specific CARs, and optionally comprising a modified HLA-E or HLA-G complex, may have therapeutic use for the treatment of B-cell malignancies such as B-cell lymphomas and other hematological cancers such as ALL, AML and NHL (Scheuermann and Racila (1995) *LeukLymphoma.* 18(5-6):385-97). Other cancers that can be targeted using CAR armed T cells include malignant gliomas (see Clinical Trial Identifier:NCT01454596), Squamous Cell Cancer of the Head and Neck (SCCHN) (see Clinical Trial Identifier: NCT01818323), neuroblastoma (see Clinical Trial Identifier: NCT01822652), malignant pleural mesothelioma (see Clinical Trial Identifier: NCT01722149), advanced sarcoma (see Clinical Trial Identifier: NCT00902044), renal carcinomas, (Kakarla and Gottschalk, (2014) *Cancer J* 20(2): 151-155). Thus, the compositions and methods described herein can be used for treating any cancer, including but not limited to ovarian, brain, prostrate, liver, kidney, leukemias, lymphomas, spinal cord and CNS, etc.

Other antigens that have therapeutic value for potential targeting with a CAR include other antigens associated with a tumor cell or with cancer associate processes such as BCMA, EpCAM, CEA, HER-2, gpA33, mucins, TAG-72, CAIX, PSMA, folate-binding antibodies, folate receptor FR-a, CD19, CD20, CD22, EGFR, EGFRvIII, EpCam, EphA2, ERBB2/HER2, ERBB3, FAP, MET, Igκ, IL-1RAP, IGF1R, EPHA3, Lewis Y, NKG2D ligands, ROR1, FR-a, GD2, GPC3, IL-13Ra2, L1-CAM, MUC1, PD-L1, PSCA, PSMA, VEGFR2, c-MET, CD133, TRAILR1, TRAILR2, RANKL, FAP, VEGF, VEGFR, αVβ3 and α5β1 integrins, CD30, CD33, CD52, CD70, CD123, CD138, CD171, CD16V, CTLA4, and enascin.

Other potential applications of the methods and compositions disclosed herein include additional engineering methods such as modulating other genes of interest. These other genes include check point inhibitor genes such as PD1 and/or CTLA4, where knock out of these genes may prevent tumor-mediated suppression of a T cell response. Further, a T cell comprising insertion of a CAR of interest into a TCR related gene may be further engineered to knock out a B2M gene, and a T cell comprising the CAR integrated into a B2M gene may be further engineered to knock out a TCR related gene. These modified T cells may also comprise a modified HLA-E or HLA-G complex such that the engineered T cells are capable of evading killing by host NK cells. These additional mutations may be useful for creating a universal T cell for 'off the shelf' applications.

Methods and compositions also include stem cell compositions wherein the TCRA and/or TCRB and/or B2M genes within the stem cells has been modulated (modified) and the cells further comprise one or more CARs. For example, TCR knock out or knock down modulated allogeneic hematopoietic stem cells can be introduced into an HLA-matched patient following bone marrow ablation. These altered CAR-comprising HSC would allow the re-colonization of the patient but would not cause potential GvHD. The introduced cells may also have other alterations to help during subsequent therapy (e.g., chemotherapy resistance) to treat the underlying disease. The TCR and/or HLA null cells, optionally comprising a modified HLA-E or HLA-G complex, also have use as an "off the shelf" therapy in emergency room situations with trauma patients.

The methods and compositions of the invention are also useful for the design and implementation of in vitro and in vivo models, for example, animal models of TCR or and associated disorders, which allows for the study of these disorders.

All patents, patent applications and publications mentioned herein are hereby incorporated by reference in their entireties.

Although disclosure has been provided in some detail by way of illustration and example for the purposes of clarity and understanding, it will be apparent to those of skill in the art that various changes and modifications can be practiced without departing from the spirit or scope of the disclosure. Accordingly, the foregoing disclosure and following examples should not be construed as limiting. In particular, although exemplified with zinc finger protein DNA-binding domains, any DNA-binding domain can be used for targeted modification, including but not limited to TAL-effector domain DNA-binding domains, sgRNAs (of CRISPR/Cas systems) and/or Ttago DNA-binding domains, including any DNA-binding domain that binds 12-25 nucleotides of the target sites exemplified below.

EXAMPLES

Example 1: Design of Nucleases

TCRA-specific, B2M-specific, CISH-specific, PD1-specific, CTLA-4 and HPRT-specific ZFNs were designed and constructed to enable site specific introduction of double strand DNA breaks essentially as described in Urnov et al. (2005) *Nature* 435(7042):646-651, Lombardo et al (2007) *Nat Biotechnol.* November; 25(11): 1298-306, and U.S. Patent Publications 20150164954, 20140301990 and U.S. Pat. Nos. 8,563,314, 8,956,828, 9,402,879 and 9,597,357; and U.S. Application No. 62/583,724. See, also, U.S. Pat. No. 9,873,894 for sgRNA of CRISPR/Cas systems for binding and modification of these and other genes. In addition, recognition helices for exemplary ZFN pairs as well as the target sequence are shown below in Table 1. Target sites of the zinc-finger designs are shown in the first column. Nucleotides in the target site that are targeted by the ZFP recognition helices are indicated in uppercase letters; non-targeted nucleotides indicated in lowercase. For TRAC-specific ZFN, see also U.S. patent application Ser. No. 16/009,975. For B2M-specific ZFN, see also U.S. Patent Publication 20170173080. For CISH-specific ZFNs, see U.S. Provisional Patent application 62/583,724.

Linkers used to join the FokI nuclease domain and the ZFP DNA binding domain are also shown (see U.S. Patent Publication 20150132269). For example, the amino acid sequence of the domain linker L0 is DNA binding domain-QLVKS-FokI nuclease domain (SEQ ID NO: 70). Similarly, the amino acid sequences for the domain linker N7a is FokI nuclease domain-SGTPHEVGVYTL-DNA binding domain (SEQ ID NO: 37), and N7c is FokI nuclease domain-SGAIRCHDEFWF-DNA binding domain (SEQ ID NO:38). Also indicated where appropriate are modifications to the zinc finger backbone as described in U.S. Patent Publication No. 20180087072. In the notation used in Table 1, "Qm5" means that at position minus 5 (relative to the helix which is numbered −1 to +6) of the indicated finger, the arginine at this position has been replaced with a glutamine (Q), while "Qm14" means that the arginine (R) normally present in position minus 14 has been replaced with a glutamine (Q). The abbreviation "n" as in nQm5 means that the mutation is in the N-terminal finger of the two-finger module used in the build of the 5 or 6 fingered protein. "None" indicates no changes outside the recognition helix region.

TABLE 1

Zinc-finger Designs

| ZFN Name target sequence | F1 | F2 | F3 | F4 | F5 | F6 | Domain linker |
|---|---|---|---|---|---|---|---|
| TCR-α (TCRA) Zinc-finger Designs ||||||||
| SBS55266 5'tcAAGC TGGTCGAG aAAAGCTt tgaaac (SEQ ID NO: 1) | QSSDLSR (SEQ ID NO: 7) | QSGNRTT (SEQ ID NO: 8) | RSANLAR (SEQ ID NO: 9) | DRSALAR (SEQ ID NO: 10) | RSDVLSE (SEQ ID NO: 11) | KHSTRRV (SEQ ID NO: 12) | N7c |
| SBS53853 5'aaCAGG TAaGACAG GGGTCTAg cctggg (SEQ ID NO: 2) | TMHQRVE (SEQ ID NO: 13) | TSGHLSR (SEQ ID NO: 14) | RSDHLTQ (SEQ ID NO: 15) | DSANLSR (SEQ ID NO: 16) | QSGSLTR (SEQ ID NO: 17) | AKWNLDA (SEQ ID NO: 18) | L0 |
| SBS68813 agGATTCG GAACCCAA TCACtgac aggt (SEQ ID NO: 39) | DQSNLRA (SEQ ID NO: 31) nQm5 | TSSNRKT (SEQ ID NO: 41) none | LQQTLAD (SEQ ID NO: 42) nQm5 | QSGNLAR (SEQ ID NO: 43) none | RREDLIT (SEQ ID NO: 44) nQm5 | TSSNLSR (SEQ ID NO: 45) none | L0<br><br>KKR R416E |
| SBS68812 ctCCTGAA AGTGGCCG Ggtttaat ctgc (SEQ ID NO: 40) | RSDHLST (SEQ ID NO: 46) nQm5 | DRSHLAR (SEQ ID NO: 47) none | LKQHLNE (SEQ ID NO: 48) nQm5s | QSGNLAR (SEQ ID NO: 43) nQm5 | HNSSLKD (SEQ ID NO: 49) none | N/A<br><br>N/A | L0<br><br>ELD R416E |
| SBS68877 agGATTCG GAACCCAA TCACtgac aggt (SEQ ID NO: 39) | DQSNLRA (SEQ ID NO: 31) nQm5 | TSSNRKT (SEQ ID NO: 41) none | LQQTLAD (SEQ ID NO: 42) nQm5 | QSGNLAR (SEQ ID NO: 43) none | RREDLIT (SEQ ID NO: 44) nQm5 | TSSNLSR (SEQ ID NO: 45) none | L0<br><br>KKR K525S |
| SBS68876 ctCCTGAA AGTGGCCG Ggtttaat ctgc (SEQ ID NO: 40) | RSDHLST (SEQ ID NO: 46) nQm5 | DRSHLAR (SEQ ID NO: 47) none | LKQHLNE (SEQ ID NO: 48) nQm5s | QSGNLAR (SEQ ID NO: 43) nQm5 | HNSSLKD (SEQ ID NO: 49) none | N/A<br><br>N/A | L0<br><br>ELD K525S |
| B2M Zinc-finger Designs ||||||||
| SBS57071 gcCACGGA gCGAGACA TCTCGgcc cgaa (SEQ ID NO: 3) | RSDDLSK (SEQ ID NO: 24) | DSSARKK (SEQ ID NO: 25) | DRSNLSR (SEQ ID NO: 26) | QRTHLRD (SEQ ID NO: 27) | QSGHLAR (SEQ ID NO: 28) | DSSNREA (SEQ ID NO: 29) | L0 |
| SBS57531 gaGTAGCG cGAGCACA GCtaaggc cacg (SEQ ID NO: 4) | AQCCLFH (SEQ ID NO: 30) | DQSNLRA (SEQ ID NO: 31) | RSANLTR (SEQ ID NO: 32) | RSDDLTR (SEQ ID NO: 33) | QSGSLTR (SEQ ID NO: 17) | N/A | N6a |

TABLE 1-continued

Zinc-finger Designs

| ZFN Name target sequence | F1 | F2 | F3 | F4 | F5 | F6 | Domain linker |
|---|---|---|---|---|---|---|---|
| HPRT Zinc-finger designs | | | | | | | |
| SBS37706 acCCAGAT ACAaACAA TGgataga aaac (SEQ ID NO: 5) | RSDVLSA (SEQ ID NO: 19) | QNATRIN (SEQ ID NO: 20) | QSGDLTR (SEQ ID NO: 21) | TSGNLTR (SEQ ID NO: 22) | QSNDLNS (SEQ ID NO: 23) | N/A | 5, 6 |
| SBS48407 tgCAAAAG gTAGGAAA AGgaccaa ccag (SEQ ID NO: 6) | RSDNLSV (SEQ ID NO: 34) | QSGDLTR (SEQ ID NO: 21) | RSDYLAK (SEQ ID NO: 35) | RSDNLSV (SEQ ID NO: 34) | QNANRIT (SEQ ID NO: 36) | N/A | 5, 6 |
| CISH Zinc-finger designs | | | | | | | |
| SBS59488 ggAAGGCC cCAGCAGG CAAGGgct gcat (SEQ ID NO: 50) | RSDHLSQ (SEQ ID NO: 52) | QNATRTK (SEQ ID NO: 53) | RSDNLSE (SEQ ID NO: 54) | KRCNLRC (SEQ ID NO: 55) | DRSTRTK (SEQ ID NO: 56) | RRDNLHS (SEQ ID NO: 57) | L0 |
| SBS59489 gaGGAGGT gGCAGAGG GTACCcca gccc (SEQ ID NO: 51) | GHTSLKR (SEQ ID NO: 58) | TSGHLSR (SEQ ID NO: 14) | RSDNLAR (SEQ ID NO: 59) | QNVSRPR (SEQ ID NO: 60) | TSGHLSR (SEQ ID NO: 14) | QSGHLSR (SEQ ID NO: 61) | L0 |

All ZFNs were tested and found to bind to their target sites and found to be active as nucleases.

The ZFPs as described herein may also include one or more mutations to phosphate contact residues of the zinc finger protein and/or the FokI domain, for example, the nR-SQabc mutant (to ZFP backbone) and/or R416S and/or K525S mutants (to FokI), described in U.S. Publication No. 20180087072. For example, ZFN SBS #68812 and SBS #68813 both comprise mutations in ZFP backbone and in the FokI domain to reduce non-specific phosphate contact with the DNA backbone, and the mutations are indicated in Table 1.

Figure 1:
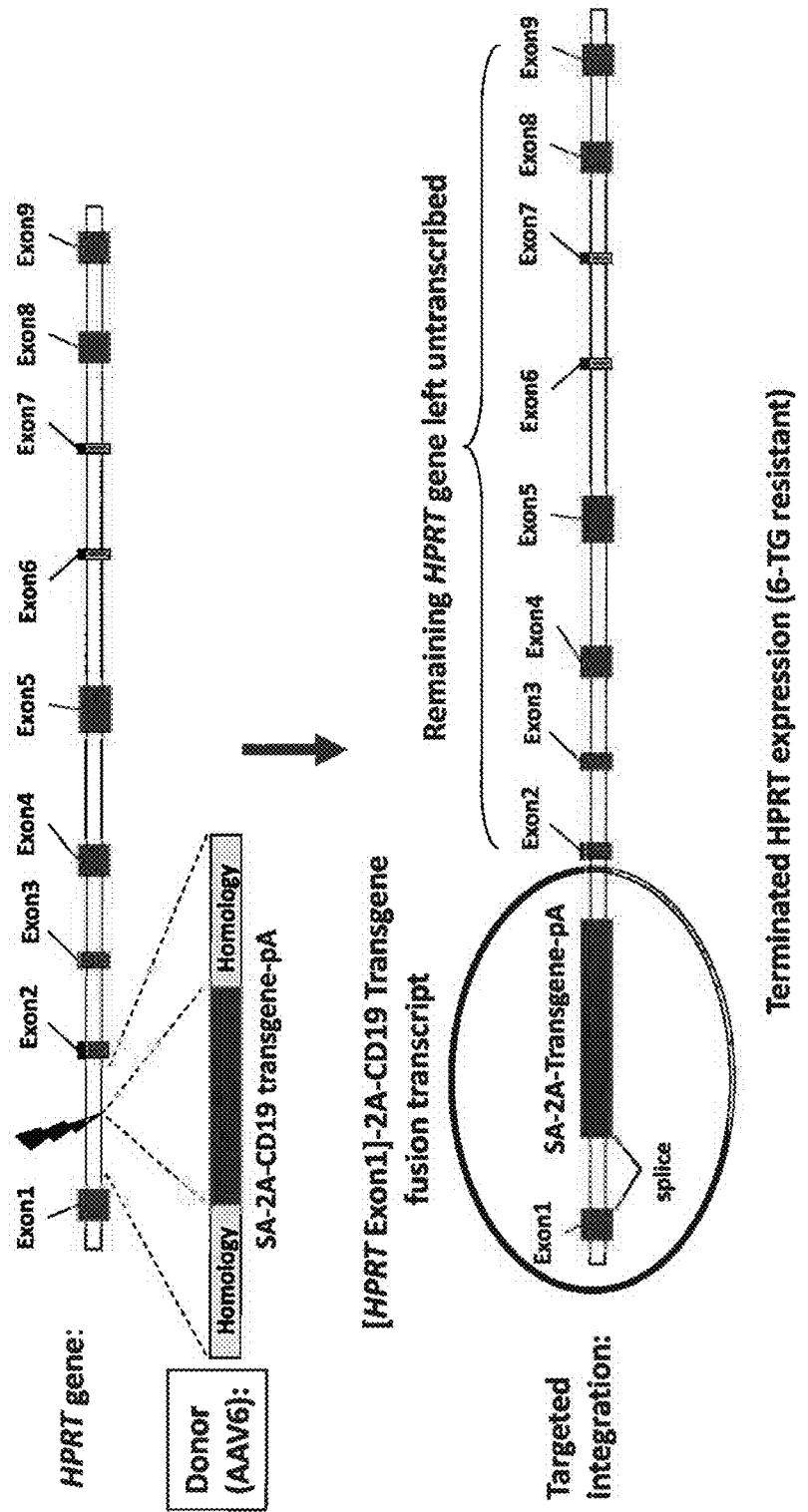
FIG. 1 is a depiction of the HPRT gene showing the organization of introns and exons on the genomic version of the gene and the design of the CD19 expressing transgene for insertion into Intron 1. The transgene donor construct has homology arms ("homology") flanking the CD19 transgene and also has a splice acceptor (SA) such that upon maturation of the transcript, exon 1 of HPRT will be linked to the CD19 gene. The construct also comprises a 2A self-cleaving site between exon1 of HPRT and CD19. Also present is a poly A sequence at the end of the CD19 coding sequence. When transcribed and matured, the construct will result in eventual translation of only the CD19 coding sequences. Cells comprising the inserted CD19 transgene cassette will not express the HPRT gene, and thus will be resistant to 6-thioguanine ("6-TG"), allowing selection of only those cells with the inserted cassette in the presence of 6-TG.

Thus, the nucleases described herein (e.g., nucleases comprising a ZFP) bind to their target sites and cleave the TCRA gene, thereby making genetic modifications within a TCRA gene comprising any of SEQ ID NOs:1-2, including modifications (insertions and/or deletions) within and/or adjacent any of these sequences (e.g., the target sequences shown in any of SEQ ID NOs: 1-2; and/or between paired target sites) and/or modifications within TTGAAA of exon 2. The nucleases described herein (e.g., nucleases comprising a ZFP) bind to their target sites and cleave the B2M gene, thereby making genetic modifications within a B2M gene comprising any of SEQ ID NOs:3-4, including modifications (insertions and/or deletions) within and/or adjacent any of these sequences (e.g., the target sequences shown in any of SEQ ID NOs:3-4; and/or between paired target sites) and/or modifications within GCCTTA of exon 1. The nucleases described herein (e.g., nucleases comprising a ZFP) bind to their target sites and cleave the HPRT gene, thereby making genetic modifications (e.g., insertion of a CAR-encoding transgene) within an HPRT gene comprising any of SEQ ID NOs:5-6, including modifications (insertions and/or deletions) within and/or adjacent any of these sequences (e.g., the target sequences shown in any of SEQ ID NOs:5 or 6; and/or between paired target sites) and/or modifications within intron 1, including modification in which the transgene is expressed from the endogenous HPRT promoter (but the HPRT gene is not expressed). See, FIG. 1.

Furthermore, the DNA-binding domains (ZFPs) all bound to their target sites and ZFP, TALE and sRNA DNA-binding domains that recognize these target sites (target sites that are 12 or more nucleotides in length of the target sequences as shown in Table 1) are also formulated into active engineered transcription factors when associated with one or more transcriptional regulatory domains.

Example 2: Construction of CD19 Bearing K562 Cells

Figure 2B:
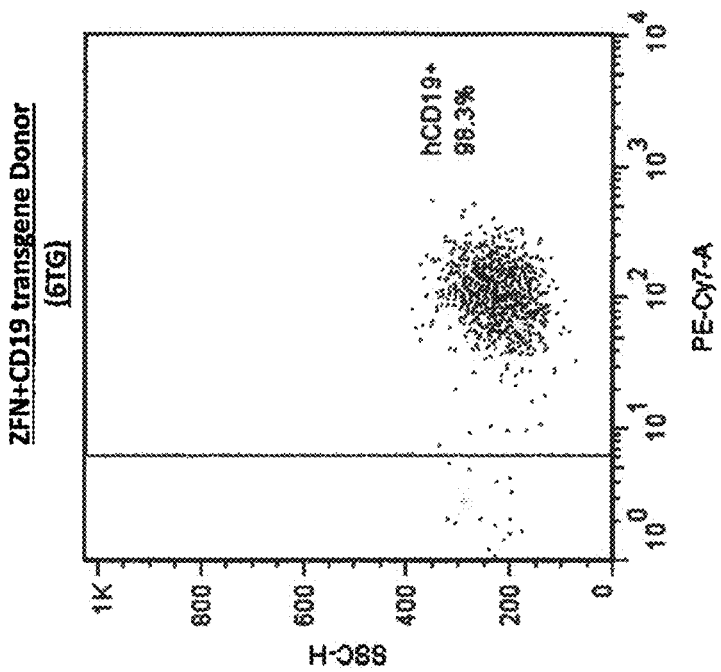
FIGS. 2A and 2B are graphs depicting the expression of CD19 in K562 cells transfected with the CD19 expression cassette shown in FIG. 1. To assess CD19 expression, cells were stained with a PE-Cy7-conjugated antibody targeting human CD19 extracellular domain. Unmodified ("naïve") K562 cells were similarly treated and stained (FIG. 2A) as a negative control.
Figure 2A:
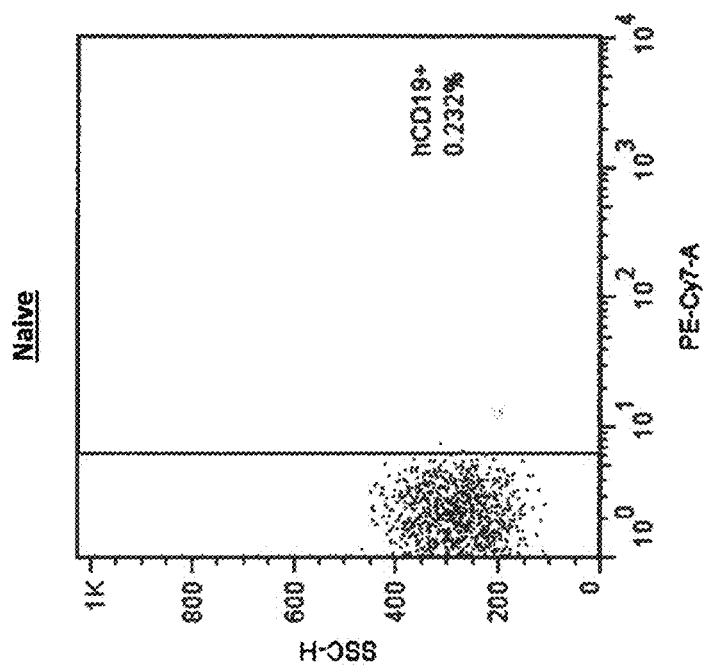

Briefly, normal K562 cells were cultured in RPMI media with 10% FBS then electroporated in an Amaxa electroporation device in the presence of 40 ug/mL mRNA encoding HPRT-specific ZFNs (37706/48407) targeting intron 1 of the human HPRT gene in addition to 50 ug/mL plasmid containing a human CD19 expression cassette (NCBI gene ID: 930, codon optimized) driven by an EF1a promoter and homology arms flanking the ZFN cut site in the HPRT gene. Cells were allowed to recover in media overnight following electroporation, then 6-thioguanine (6-TG) was added at 6 uM concentration and the cells were cultured for 27 days. To assess CD19 expression, cells were stained with a PE-Cy7- conjugated antibody targeting human CD19 extracellular domain. Unmodified ("naïve") K562s were similarly cultured and staining as a negative control. The results (FIG. 2) show that only the cells that received the CD19 transgene stained with the antibody.

Example 3: Antigen Specific Cell Killing by CD19-CAR T Cells

Next, an experiment was performed to generate cells with targeted insertion of either a GFP or CD19 CAR expression cassette (Kochenderfer et al (2009) J Immunother 32(7): 689-702) into either the TCRA or B2M locus. The TCRA-specific ZFN pair SBS #55266/SBS #53853 or the B2M pair SBS #57071/SBS #57531 (all shown in Table 1) were introduced into T-cells or K562 cells as mRNA by electroporation, along with AAV6 vectors encoding the transgene expression cassette (GFP or CD19-CAR) flanked by homology arms to either the TRAC or B2M cleavage loci to enable homology-directed targeted insertion.

Briefly, a 1:1 ratio of CD4:CD8 human T-Cells were thawed and activated with CD3/28 Dynabeads® (1:3 cells:bead ratio) in X-vivo15 T-cell culture media (day 0). After 3 days in culture (day 3), cells were concentrated to 3e7 cells/mL in Maxcyte electroporation buffer in the presence of ZFN mRNA (TCRA or B2M ZFNs), and were electroporated using the Maxcyte device. Concentrated, electroporated cells were then placed in a tissue culture well, and AAV6 vectors comprising the transgene donors were added to the concentrated cells in a matching locus manner (e.g. AAV6 donor vectors with TCRA homology arms were added to TCRA ZFN treated cells). The transgene expression cassettes comprised cleavage site specific (TCRA or B2M) homology arms (HA), a hPGK promoter driving the transgene (either GFP or CD19 CAR), and a BGH polyA sequence. After addition of the AAV6 vectors, the cells were allowed to recover at 37° C. for 20 minutes. Cells were then diluted in culture medium to 3e6 cells/mL and cultured at 30° C. overnight (see U.S. Publication No. 20170137845). The next morning cells were diluted to 0.5e6 cells/mL in additional culture medium. Cell populations were made comprising the following combinations of ZFNs and donors:
(a) Untrans: cells electroporated with no ZFN mRNA or AAV6 donor added;
(b) cells electroporated with B2M ZFN mRNAs only, no AAV6 donor;
(c) cells electroporated with TCRA ZFN mRNAs only, no AAV6 donor;
(d) cells electroporated with B2M ZFN mRNAs and AAV6 B2M HA; hPGK– eGFP– BGH polyA donor;
(e) cells electroporated with TCRA ZFN mRNAs and AAV6 TCRA HA; hPGK– eGFP– BGH polyA donor;
(f) cells electroporated with B2M ZFN mRNAs and AAV6 B2M HA; hPGK-FMC63-CD8BBZ (CD19 CAR)—BGH polyA donor;
(e) cells electroporated with TCRA ZFN mRNAs and AAV6 TCRA HA; hPGK-FMC63-CD8BBZ (CD19 CAR)—BGH polyA donor.
As noted above, the above abbreviations refer to: HA=Homology Arm; B2M=B2M gene; PGK=PGK promoter; BGH=polyA sequence from bovine growth hormone (BGH) gene; FMC63 is an anti-CD19 scFv sequence from the NCI (see, U.S. Pat. No. 9,701,758); CD8BBZ refers to the portions of the CAR excluding the scFv=CD8 hinge/transmembrane domain (CD8), co-stimulation domain from 41BB gene (BB), activation domain from CD3z gene (Z).

All experiments were conducted at 3e7 cells/ml cell density during electroporation. The following day (day 4), cells were diluted to 0.5e6 cells/mL and transferred to cultures at 37° C. Three days later (day 7), cells diluted to 0.5e6 cells/mL again. After three and seven more days in culture (days 10 and 14, respectively), cells were harvested for FACS and MiSeq analysis (diluted to 0.5e6 cells/mL). The data is shown below in Table 2.

TABLE 2

| | Activity of ZFNs | | | | |
|---|---|---|---|---|---|
| | MiSeq | | FACS | | |
| | TRAC | B2M | CD3− | HLA− | TI |
| (a) Untrans | 0.3% | 0.5% | 1.8% | 0.8% | |
| (b) B2M ZFN only | 0.0% | 86.6% | 1.0% | 72.0% | |
| (c) TCRA ZFN only | 88.3% | 0.2% | | | |
| (d) B2M ZFN + AAV6 GFP donor | 0.1% | 89.9% | 1.4% | 86.3% | 72.1% |
| (e) TCRA ZFN + AAV6 GFP donor | 81.6% | 0.1% | 92.3% | 5.4% | 82.1% |
| (f) B2M ZFN + AAV6 CD19 CAR donor | 0.2% | 86.4% | 2.7% | 83.0% | 60% |
| (g) TCRA ZFN + AAV6 CD19 CAR donor | 83.2% | 0.4% | 87.1% | 0.5% | 60% |

Next, functional activity was measured. First a 50:50 mixture was made using naïve K562 cells mixed with the CD19-expressing K562 cells from Example 2. This mixture was treated with either untransfected T cells or TCRA knock out T cells. The results are shown in FIG. 3, where FIGS. 3A-3C show the mixture alone, treated with naïve T cells, or treated with the TCRA knock out T cells. The cells were stained with CD19 specific antibodies and neither population of K562 cells was affected by the added T cells.

Next a similar 50:50 mix of target cells was treated with T cells bearing a CAR transgene inserted into either the B2M or TCRA locus. The population of naïve and CD19+ K562 targets were treated with a range of effector:target cell ratios from 2:1 effector:target through 0.125 effector:target. The results indicated that insertion of the CAR into either the B2M or TCRA genes resulted in expression of a functional CAR (compare 4A to 4B). For both CAR-T cell populations, at effector:target ratios of 2:1, nearly all of the CD19+ K562 cells were killed (0.4% and 0.1% CD19+ K562 cells remaining following treatment with T cells with the inserted CAR at the B2M or TCRA gene, respectively).

Figure 5:
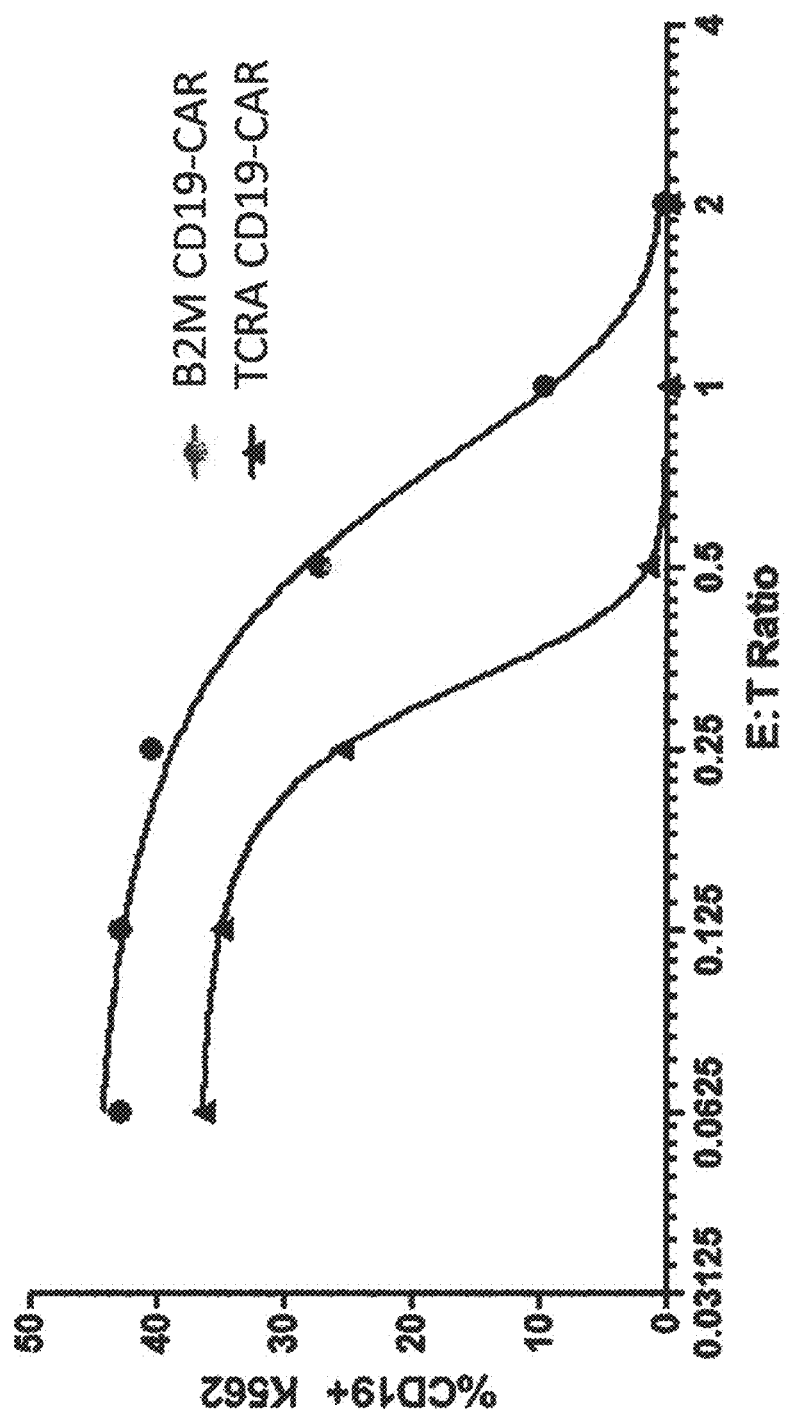
FIG. 5 is a graph depicting the percent killing of CD19+ K562 cells as a function of effector:target cell ratio. Shown on the graph are the results for T cells comprising the CD19-CAR integrated into either the TCRA or B2M gene. The data demonstrate that integration into either gene results in effective CAR function and T cell activation.
Figure 6A:
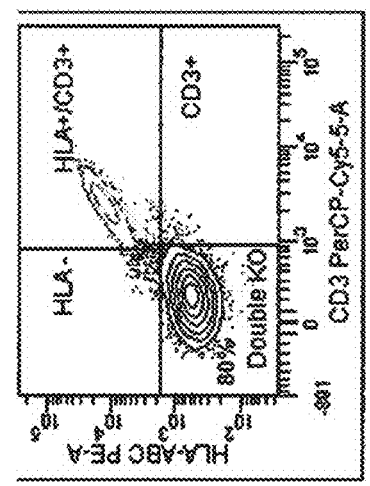
FIGS. 6A through 6F are plots depicting FACs analysis of expression of cell surface markers or a CD19-CAR.
Figure 6B:
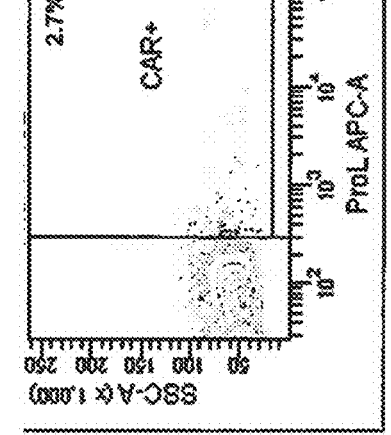
Figure 6C:
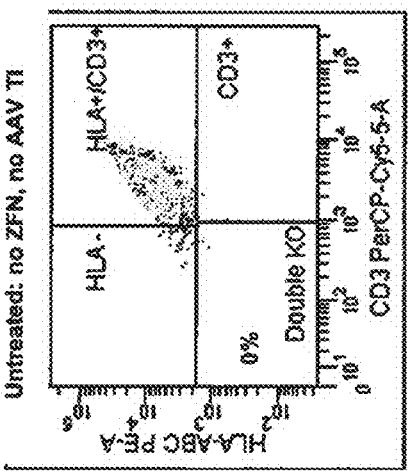
Figure 6D:
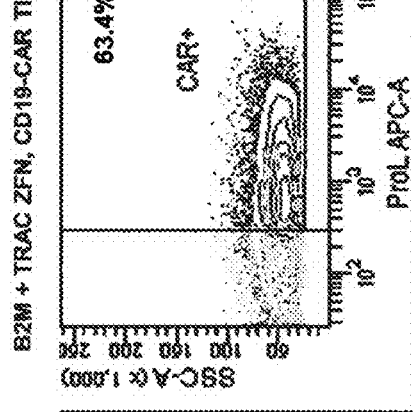
Figure 6E:
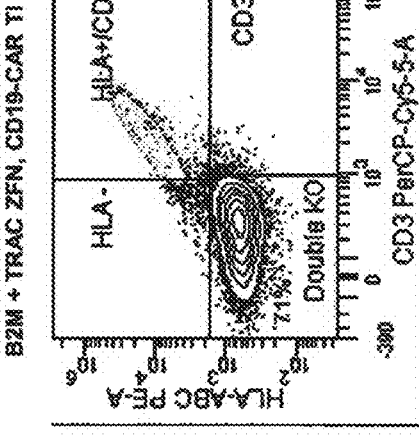
Figure 6F:
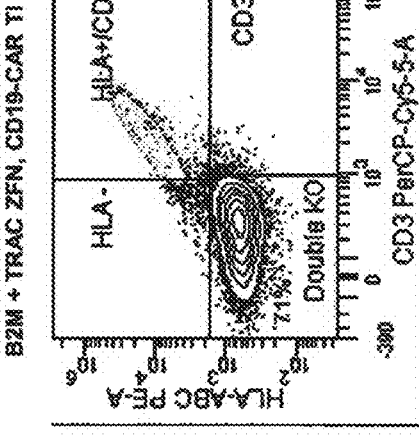

Finally, a plot was made of the percent of CD19+ K562 cells remaining as a function of the effector:target cell ratio (FIG. 5), demonstrating that both types of CAR-T cells were active and effective at killing cells expressing the targeted antigen.

A second experiment was carried out as described above, where the experimental conditions were the same except that the cells were treated with both TCRA and B2M specific ZFN pairs (double knock out) and a CD19 CAR transgene donor comprising TCRA-specific homology arms. The data is shown below in Table 3, and in FIG. 6.

TABLE 3

Double Cleavage of TCRA and B2M, ZFN-mediated
CD19 CAR insertion into the TCRA locus

|  | Indels (%) | | FACs analysis | | |
| --- | --- | --- | --- | --- | --- |
| Sample | TCRA | B2M | CD3(−) | HLA(−) | CD19 CAR |
| control | 0.2% | 0.1% | 2.8% | 0.4% | 2.7% |
| B2M + TCRA ZFN | 87.8% | 79.3% | 84.1% | 81.5% | 0.1% |
| B2M + TCRA ZFN + CD19 CAR-TCRA specific donor | 81.8% | 77.6% | 74.5% | 72.5% | 63.4% |

Figure 7:
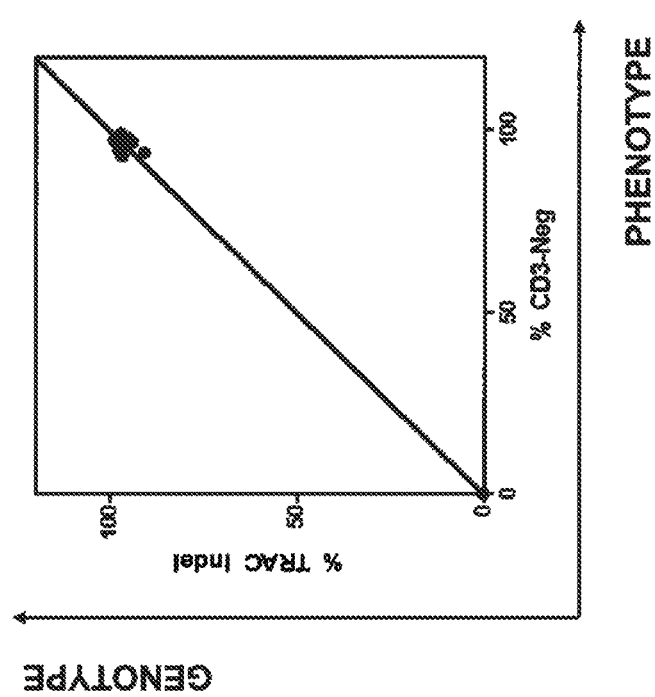
FIG. 7 is a graph showing genotype and phenotype of cells following nuclease-mediated inactivation (knockout) of TRAC. As shown, more than 95% of the cells show genotype and phenotype inactivation.

A third experiment was carried out as described above in which the genotype and phenotype of T-cells treated with TRAC-specific nucleases was also assessed following administration of varying doses of the TRAC nucleases. As shown in FIG. 7 and Table 4, nuclease-mediated TRAC modification yielded >95% cells with TRAC knockout genotype (TRAC indels) and phenotype (CD3-negative).

TABLE 4

TRAC knockout dose titration

| Nuclease | Dose mRNA (ug/mL) | Phenotype (% CD3-negative) |
| --- | --- | --- |
| Exon 3, Site D | 180 | 99% |
|  | 120 | 99% |
|  | 60 | 96% |
|  | 30 | 96% |

Figure 8B:
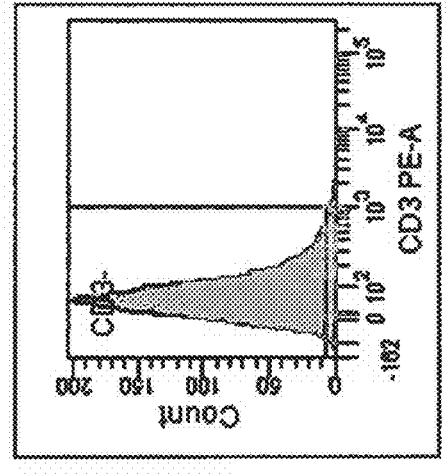
FIGS. 8A and 8B show results of FACS analysis of surface CD3 receptor expression in T-cells treated with nucleases that target TRAC (FIG. 8B) as compared to untreated cells (FIG. 8A). As shown, at least 99.5% of the nuclease treated cells did not express surface TCR as compared to 0.2% of the untreated cells.
Figure 8A:
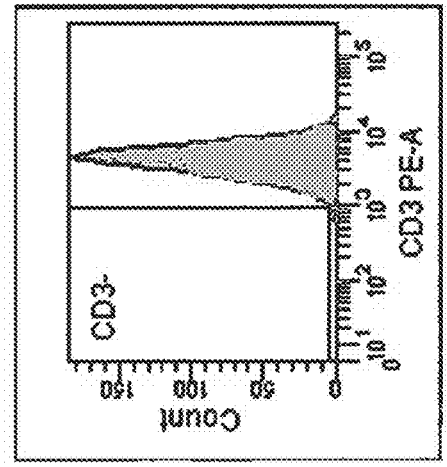
Figure 9C:
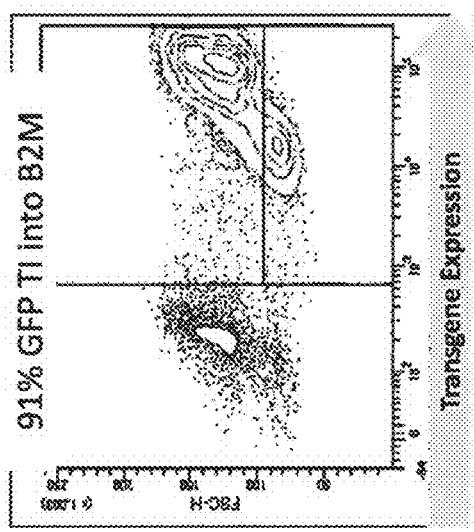
FIG. 9A through FIG. 9C are graphs showing FACS analysis of transgene expression (GFP) in T cells treated with nucleases that target TRAC (FIG. 9B) or B2M (FIG. 9C). Also shown is the cells lacking the donor transgene but treated with both the TRAC and B2M-specific reagents (FIG. 9C). As shown, the transgene was expressed from at least 93% of cells treated with TRAC-specific nucleases, indicating efficient nuclease-mediated integration into TRAC. Similarly, the transgene was expressed from at least 90% of cells treated with B2M-specific nucleases, indicating efficient nuclease-mediated integration into B2M.
Figure 9B:
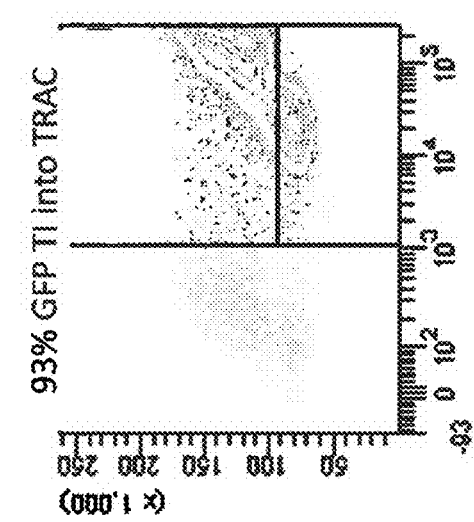
Figure 9A:
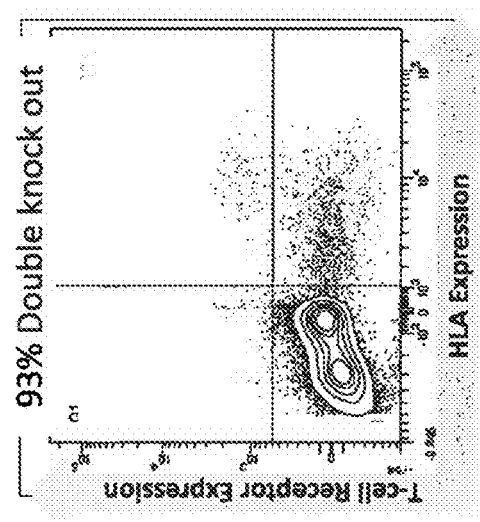

Furthermore, as shown in FIG. 8, FACS analysis showed that nuclease-mediated inactivation (knockout) of TRAC consistently achieved at least 99.5% loss of surface TCR (CD3) without selection. Likewise, as shown in FIG. 9, transgenes (GFP) integrated into the TRAC (left panel) or B2M (right panel) via specific nuclease cleavage of these genes resulted in highly efficient transgene expression (93% from TRAC and 91% from B2M) as determined by FACS analysis. In this experiment, in the absence of donor, 93% of cells were knocked out at both the TRAC and B2M loci.

Healthy donor T cells were also treated with TRAC and B2M nucleases (to inactivate these genes) in combination with an AAV donor comprising a CAR (CD19) transgene targeted to the TRAC gene (homology arms) in a single step (TRAC and B2M and donor co-administered). As shown in FIG. 10, highly efficient CAR expression (>75% of cells) and TRAC/B2M knockout (>94% and >88%, respectively) was achieved in a single editing step.

A fourth set of experiments were carried out to evaluate the efficiency of 'multiplex' knock out of multiple genetic loci in T cells in combination with insertion of a GFP donor and/or the CD19 CAR. The first experiment tested the efficiency of integrating two donor transgenes by cleaving at TRAC (using SBS68812/SBS68813) and B2M (using SBS57071/SBS57531). In this experiment, the CD19 CAR donor comprised TRAC homology arms and was introduced to the cells via AAV transduction. The GFP donor comprised B2M homology arms and was also introduced to the cells via AAV transduction.

Figure 11:
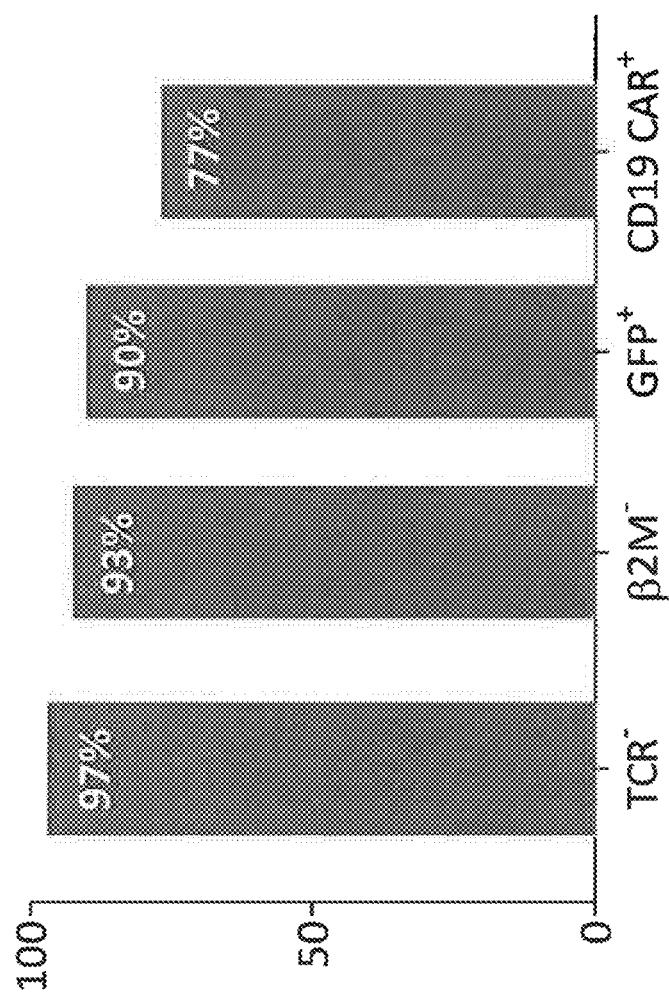
FIG. 11 is a graph depicting the results from a multiplexing (multiple knockout and/or multiple targeted integration) experiment. In this experiment, T cells were treated with TRAC and B2M specific ZFN reagents and also with the ZFNs and two AAV donor constructs: a GFP donor comprising TRAC homology arms and a CD19 CAR donor comprising B2M homology arms. The data indicates that both ZFN pairs cleaved their targets at >90% efficiency, and that the donors were integrated at 90% for the GFP donor and 77% for the CD19 CAR donor. Over 62% of the cells comprised all four edits (TCR k/o, B2M k/o, GFP+ and CD19 CAR+0 for the cells treated with both ZFN pairs and both donor constructs.

As shown in FIG. 11, the target genes were cleaved at greater than 90% efficiency, and when donors were added, targeted integration occurred at 90% for the GFP donor and 77% for the CD19 CAR donor. The results for the CD19 CAR integration agree with the results shown in FIG. 10C where only the CD19 CAR transgene was used. Thus, integration efficiency of the CD19 CAR at the cleaved TRAC locus is unaffected by the simultaneous integration of the GFP transgene at the cleaved B2M locus, and vice versa.

In a further experiment, the SBS68812/SBS68813 TRAC reagents and the SBS57071/SBS57531 B2M ZFN reagents were used. A third set (SBS59488/SBS59489) of ZFN reagents targeting the CISH locus (a checkpoint gene, see U.S. Provisional Application 62/583,724) were also used as shown above in Table 1.

Figures 12A, 12B:
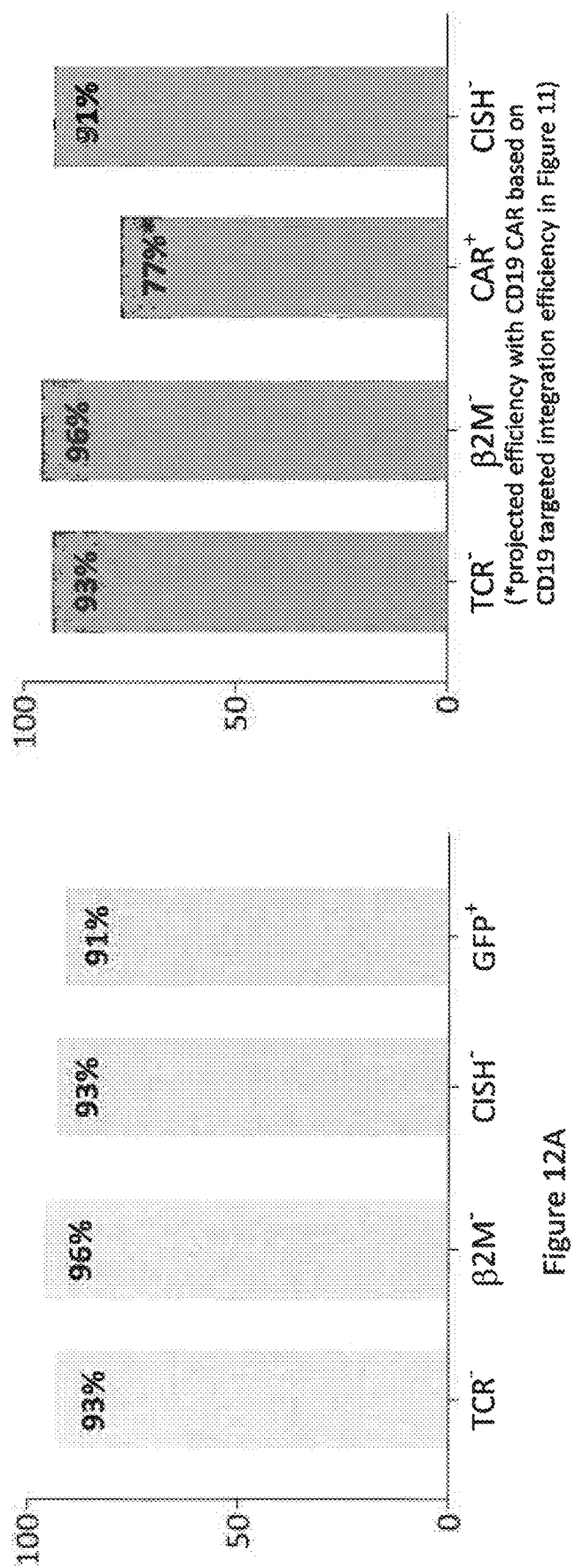
FIGS. 12A and 12B are graphs depicting the results of integration of a transgene donor in cells that have had multiplex gene editing.

The CISH-specific reagents were used in combination with the TRAC- and B2M-specific ZFNs in the methods described above. In addition to the various ZFN pairs, the cells were also treated with an AAV-GFP donor, and the resulting knock out and integration data is shown in FIG. 12A. For the cells treated with the GFP donor comprising TRAC homology arms and the multiple different nucleases, the knock out and donor integration data is shown below in Table 5. Using the CD19 CAR transgene donor efficiency data generated in the previous experiment (shown in FIG. 11), the projected efficiency of integration of a CD19 CAR transgene into the TRAC locus is estimated and this estimated data is shown in FIG. 12B and in Table 5.

TABLE 5

Multiplex gene editing and targeted integration

| Donor | % TRAC k/o | % B2M k/o | % CISH k/o | % Donor+ | % all edits |
| --- | --- | --- | --- | --- | --- |
| GFP | 93 | 96 | 98 | 91 | 76 |
| CD19 CAR (estimated) | 93 | 96 | 91 | 77 | 64* |

*projected efficiency with CD19 CAR based on previous CD19 CAR targeted integration efficiency into TRAC as shown in FIG. 11.

Thus, as shown herein, the CAR+ modified cells are obtained at high rates using the methods described herein.

Example 4: Engineering of Cells to Express a CAR and a Modified HLA-E and/or HLA-G Cells expressing a CD19 CAR and a modified HLA-E and/or HLA-G complex are produced following the methods described in Example 3. In brief, the TCRA-specific ZFN pair SBS #55266/SBS #53853 or the B2M pair SBS #57071/SBS #57531 (all shown in Table 1) are introduced into T-cells as mRNA by electroporation, along with AAV6 vectors encoding the transgene expression cassette (GFP or CD19-CAR or one or both of CD19-HLA-E and CD19-HLA-G) flanked by homology arms to either the TRAC or B2M cleavage loci to enable homology-directed targeted insertion.

The cells are characterized for CD19-specific CAR expression and HLA-E or HLA-G expression using FACs analysis and labeled antibodies specific for these two cell surface proteins. The FACs analysis demonstrates that the cells express both CD19-specific CAR and the modified HLA-E and/or HLA-G complex. Activity of the CD19-specific CAR is measured as described above, and the cells are found to be capable of CD19 CAR-mediated killing. The cells are further subject to assays to monitor killing of the cells by NK cells using methods known in the art (e.g. chromium release assays and the like). The cells comprising the CD19 CAR and the modified HLA-E or HLA-G complex are more resistant to NK-mediated killing that cells lacking the modified HLA-E or HLA-G complex.

ZFN pairs targeted to protein coding regions of the TRAC and B2M loci were used (SBS #68877/SBS #68876 for TRAC and SBS #57071/SBS #57531 for B2M). Briefly, a 1:1 ratio of CD4:CD8 human T cells were thawed and activated with CD3/28 Dynabeads (1:3 cells:bead ratio) in X-vivo15 T-cell culture media (day 0). After 3 days in culture (day 3), cells were concentrated to 3e7 cells/mL in Maxcyte electroporation buffer in the presence of ZFN mRNA, then were electroporated using the Maxcyte device. Concentrated, electroporated cells were then placed in a tissue culture well, then AAV6 containing a transgene donor was added to the concentrated cells, which were allowed to recover and incubate at 37° C. for 20 minutes. Cells were then diluted in culture medium to 3e6 cells/mL and cultured at 30° C. overnight. The next morning cells were diluted to 0.5e6 cells/mL in additional culture medium.

Figure 13:
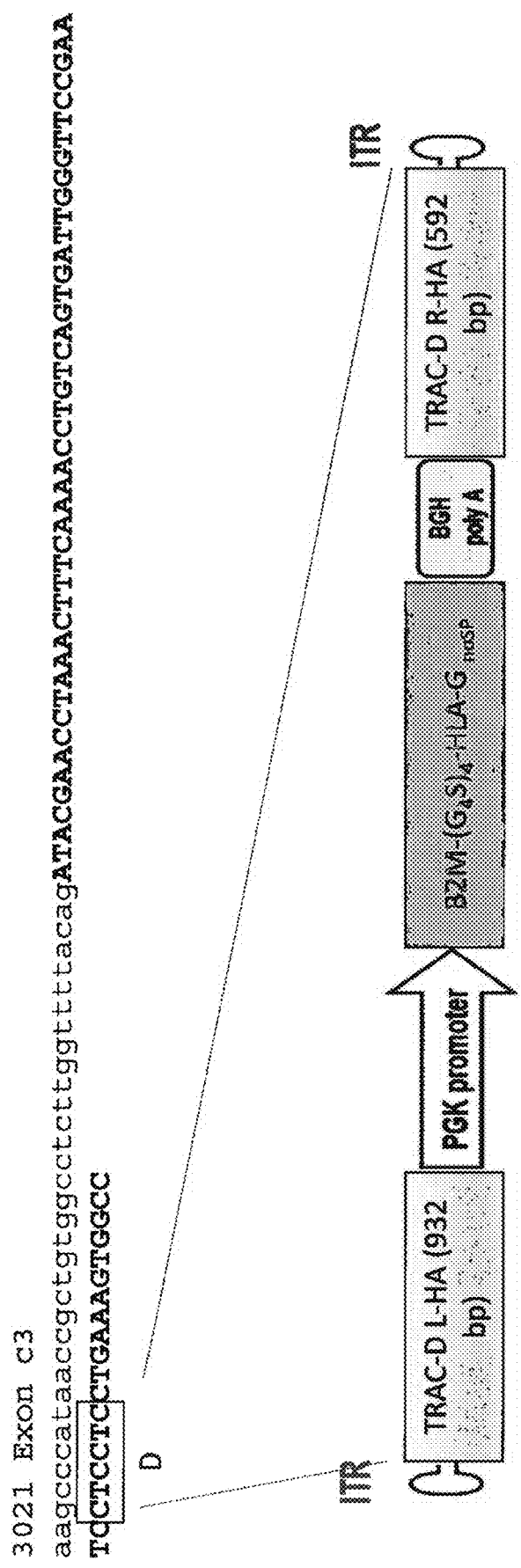
FIG. 13 depicts the site of integration of the B2M-HLA-G fusion transgene at the 'D' insertion site in exon c3 (SEQ ID NO:62) in the TRAC locus (see PCT Publication WO2017106528). The donor construct comprises right (R-HA) and left (L-HA) homology arms which have homology to the sequences flanking the TRAC-ZFN cleavage site. Expression of the fusion transgene is driven by the PGK promoter and the donor also comprises a bovine growth hormone (BGH) polyA sequence.

The following is a description of the groups (all ZFNs were electroporated at 60 ug/mL mRNA per ZFN, and the AAV6 donor was added at 1e5 viral genomes/cell). The AAV B2M-HLA-G fusion transgene was driven by the PGK promoter, with TRAC homology arms expressing the B2M-HLA-G fusion transgene. In brief, the B2M-HLA-G transgene includes a full length B2M gene including the leader signal peptide sequence but lacks the stop codon at the end, followed by a $(G_4S)_4$ linker (SEQ ID NO: 69), which is followed by the full-length HLA-G*01:01 sequence, minus the leader signal peptide. The entire B2M-HLA-G fusion cassette was codon optimized prior to synthesis (FIG. 13).

The experiment was conducted at 3e7 cells/mL cell density using the protocol as described in U.S. Patent Publication 20170137845 and were cultured to cold shock at 30° C. overnight post electroporation. The following day (day 4), cells were diluted to 0.5e6 cells/mL and transferred to cultures at 37° C. Three days later (day 7), cells diluted to 0.5e6 cells/mL again. At day 10, cells were harvested for FACS analysis (diluted to 0.5e6 cells/mL).

For the FACS analysis, cell surface staining was performed in 100 µL of Staining Buffer (PBS with 1% BSA and 0.02% NaN3),) containing fluorochrome-conjugated antibodies specific to each cell surface antigen being interrogated. Antibody cocktails were made according to panel 1 or panel 2 specifications detailed in Table 6 below. Cells resuspended in either antibody cocktail were incubated in dark for 30 min and washed twice with PBS prior to data acquisition on a flow cytometer.

For intracellular staining, cells were first resuspended in 100 µL of Cytofix/Cytoperm™ solution and incubated for 20 min at 4° C. After washing the cells twice with 1× Perm/Wash solution, fixed cells were resuspended in either antibody cocktail, for 30 mins in dark. Cells were washed with 1× Perm/Wash™ solution twice prior to data acquisition on the cytometer.

TABLE 6

Antibody cocktails used

| Panel | FITC | PE | APC | Viability |
|---|---|---|---|---|
| 1 | B2M (clone# B2M-01), 1 ul | HLA-ABC (clone# DX17), 20 ul | CD3 (UCHT-1), 10 ul | Fixable Viability Dye eFluor™ 780 |
| 2 | B2M (clone# B2M-01), 1 ul | HLA-G (clone# 87G), 7 ul | — | — |

Figure 14A:
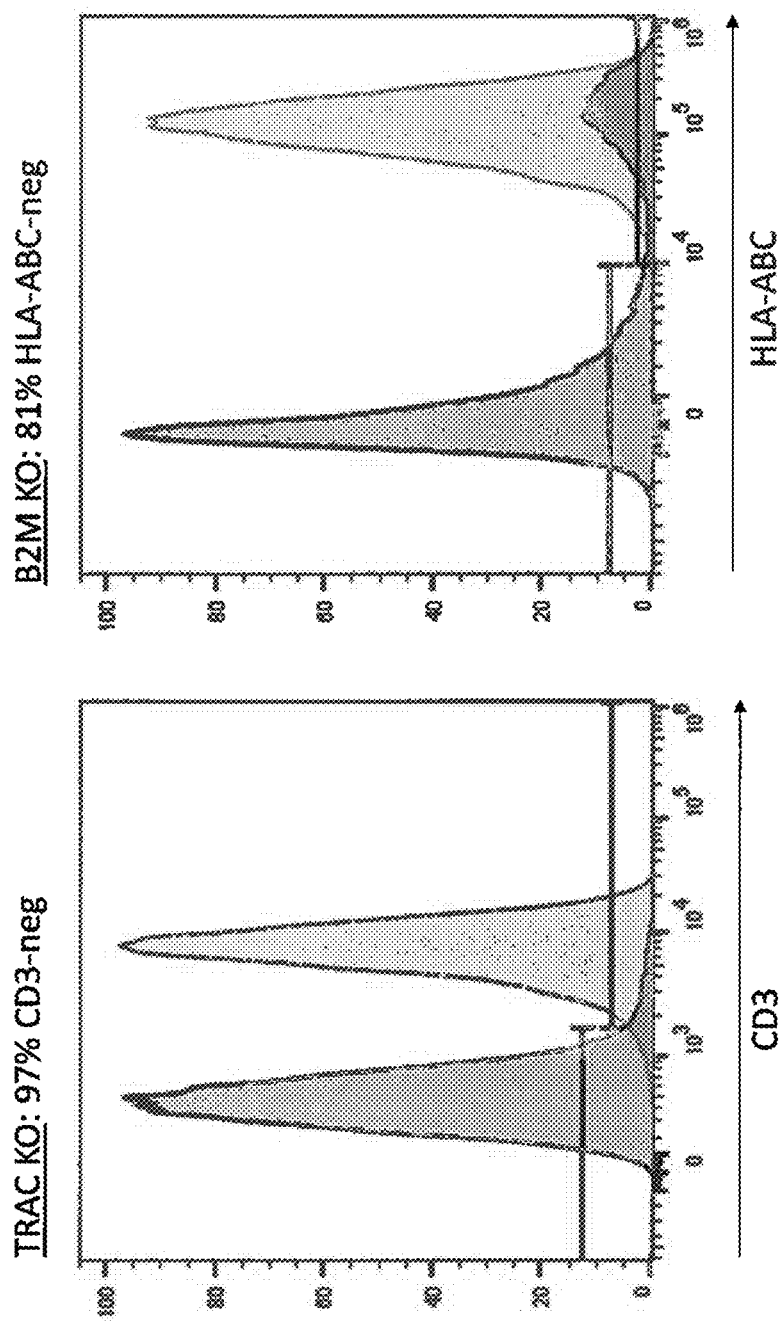

As shown in FIG. 14, the B2M-HLA-G fusion protein was positively expressed intracellularly and on the surface of T cells lacking expression of endogenous B2M and TRAC loci. FIG. 14A illustrates that ZFN-mediated TRAC KO achieved 97% loss of surface CD3 expression (left panel) and B2M KO achieved 81% loss of surface HLA class-I molecules (HLA-ABC, right panel), by flow cytometry. The light grey peaks correspond to the mock or untreated T cells and the dark grey peaks correspond to the ZFN treated cells. Double KO T cells were transduced by an AAV6 donor expressing the B2M-HLA-G transgene described above. FIGS. 14B and 14C illustrate successful expression of B2M and HLA-G in double KO T cells that were transduced with an AAV6 donor expressing the fusion B2M-HLA-G transgene, for targeted integration into the TRAC locus. Specifically, since HLA-G is not naturally expressed on T cells, the positive HLA-G dark grey peak in 14B and 14C demonstrated positive integration of the B2M-HLA-G transgene and its expression, both intracellularly and on the cell surface (left panels). The light grey peaks correspond to cells that are double KO for CD3 and B2M but that were not transduced with the AAV donor. Expression of the B2M-HLA-G transgene is further supported by the positive B2M light grey peaks in 14B and 14C, right panels, where B2M is expressed due to integration of the B2M-HLA-G construct in cells lacking endogenous B2M, and signal is detected both intracellularly and on the cell surface. Darker grey peaks are cells lacking B2M expression.

Thus, efficient nuclease-mediated modification of cells was achieved.

Example 5: Targeted Integration

A. B2M

B2M-targeted ZFN pair SBS #57071/SBS #57531 targeted to a protein coding region of the B2M locus was used for targeted integration of various donor constructs as follows. Briefly, a 1:1 ratio of CD4:CD8 human T cells were thawed and activated with CD3/28 Dynabeads (1:3 cells:bead ratio) in X-VIVO™15 T-cell culture media comprising IL2 (day 0, Lonza BioWhittaker). After 3 days in culture (day 3), cells were concentrated to 3e7 cells/mL in Maxcyte electroporation buffer in the presence of ZFN mRNA, then were electroporated using the Maxcyte device. Concentrated, electroporated cells were then placed in a tissue culture well, then AAV6 containing a transgene donor was added to the concentrated cells, which were allowed to recover and incubate at 37° C. for 20 minutes. Donor constructs used were as follows:

(1) A donor with long homology arms (long arms) comprising the following sequences: a PGK promoter sequence operably linked to a GFP transgene flanked by homology arms (to B2M) of 1 Kb in size each;

(2) A donor with short homology arms (short arms) comprising the following: a PGK promoter sequence operably linked to a GFP transgene flanked by homology arms (to B2M) of 250 bp in size each;

(3) The donor of (2) further including a WPRE sequence in the 3' UTR, the WPRE sequence comprising (SEQ ID NO: 64)
AATCAACCTCTGGATTACAAAATTTGTGAAAGATTGACTGGTATTC

TTAACTATGTTGCTCCTTTTACGCTATGTGGATACGCTGCTTTAATG

CCTTTGTATCATGCTATTGCTTCCCGTATGGCTTTCATTTTCTCCTCC

TTGTATAAATCCTGGTTGCTGTCTCTTTATGAGGAGTTGTGGCCCGT

TGTCAGGCAACGTGGCGTGGTGTGCACTGTGTTTGCTGACGCAACC

-continued

```
CCCACTGGTTGGGGCATTGCCACCACCTGTCAGCTCCTTTCCGGGA

CTTTCGCTTTCCCCCTCCCTATTGCCACGGCGGAACTCATCGCCGCC

TGCCTTGCCCGCTGCTGGACAGGGGCTCGGCTGTTGGGCACTGACA

ATTCCGTGGTGTTGTCGGGGAAGCTGACGTCCTTTCCATGGCTGCT

CGCCTGTGTTGCCACCTGGATTCTGCGCGGGACGTCCTTCTGCTAC

GTCCCTTCGGCCCTCAATCCAGCGGACCTTCCTTCCCGCGGCCTGC

TGCCGGCTCTGCGGCCTCTTCCGCGTCTTCGCCTTCGCCCTCAGACG

AGTCGGATCTCCCTTTGGGCCGCCTCCCCGCCTG;
```

(4) The donor of (2) further including a T cell enhancer sequence upstream of the PGK promoter as follows:

```
                                    (SEQ ID NO: 65)
GATATCATTGGTCAATTGCAGCAGACATGTCTCTTGTGGTGTAAAG

CCTCATAGCATCTTCCTGCTGGAGTCCACCTGGCAGCCCAAAGCCT

CAGCAAGTGCTGGGGACAGAGAGATAGAAAGGCTTTGCTGTGGCT

CAACTCAGTTGTACTTTCTCAAGCTCCTTTTGGTTATCTGCTCTGTC

TATGTAGTTGCTTCCTGGAAAATGGTTAAAGTCAAACCTCCTCTGT

TTGGGGCAGCACAAAATGTTGCTAAGGCGTTAGAAGACAACATAG

GAGCAGTTAAACCACAGCCAGTTTTTGCTCGCTTTCGAAAGACCAC

AGCTATTAGACAGAAAACCTCCTGTACTGGAAGTGGCCCTGAAAC

AGCATCTGTGCTGACAGACACTGGGCTTGCTATGGTTGCTGCTCAT

CATGCTCAGCTG;
or
```

(5) The donor of (2) further including a TCRα enhancer sequence as follows:

```
                                    (SEQ ID NO: 66)
CTCCCATTTCCATGACGTCATGGTTAAACCTCTTTTACCTGCTTTAA

CCCTTTGAAGCTCTCCCGCAGAAGCCACATCCTCTG;
```

(6) The donor of (2) further including a sequence from the 5' untranslated region of the *Xenopus* beta globin gene:

```
                                    (SEQ ID NO: 67)
TGCTTGTTCTTTTTGCAGAAGCTCAGAATAAACGCTCAACTTTGGC

AGAT
```

Cells were then diluted in culture medium to 3e6 cells/mL and cultured at 30° C. overnight.

All ZFNs were electroporated at 60 ug/mL mRNA per ZFN, and all AAV6 donors were added at 1e5 viral genomes/cell. All experiments were conducted at 3e7 cells/ml cell density using the protocol as described in U.S. Publication No. 20170137845 (extreme cold shock) and were cultured to cold shock at 30° C. overnight post electroporation.

The following day (day 4), cells were diluted to 0.5e6 cells/mL and transferred to cultures at 37° C. Three days later (day 7), cells diluted to 0.5e6 cells/mL again. After three and seven more days in culture (days 10 and 14, respectively), cells were harvested for FACS and MiSeq analysis (diluted to 0.5e6 cells/mL).

Figure 15A:
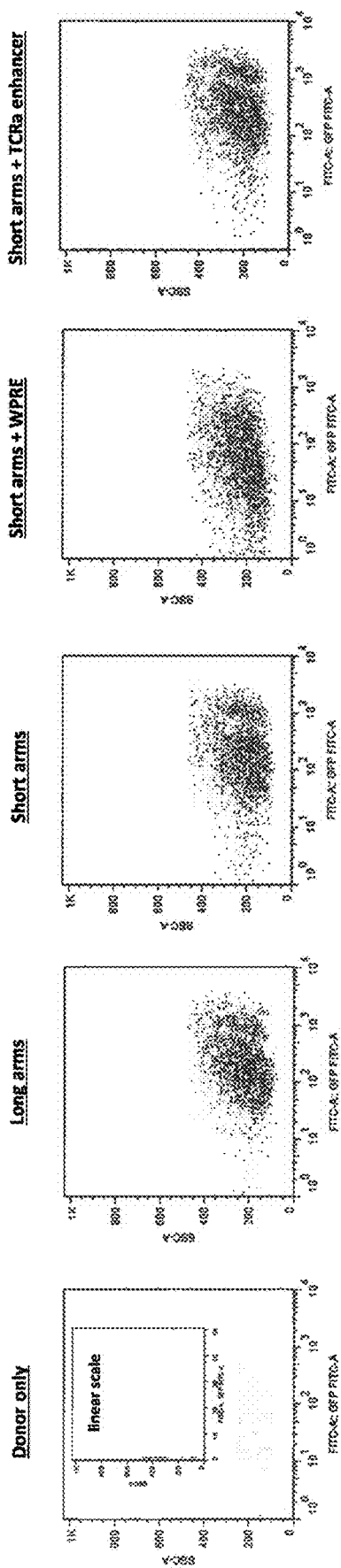

As shown in FIGS. 15A and B, GFP expression indicated that target integration was successful and genetically modified cells comprising B2M genomic modifications (indels and TI) within the ZFN target site as disclosed herein were obtained.

The highest mean fluorescence intensity (MFI) was present within the enhancer-containing constructs, which showed 65% improvement as compared to standard construct containing short homology arms.

B. Targeted Integration of a Donor into B2M/TRAC Double Knockout Cells

In addition, experiments were also performed as described above (except that RPMI with 10% human serum and IL-2 was used as the culture medium) using both B2M and TRAC ZFNs and various donors to generate TRAC/B2M double knock outs (DKOs) with integrated transgenes, including integrated HLA-E or HLA-G transgenes. Donors are described in detail above in the description of FIGS. 17 and 19 as follows:

(1) a donor containing a left arm of 423 bp and a right arm of 393 bp with homology to TRAC site E flanking a GFP transgene driven by the hPGK promotor. The donor also contains a 'miseq tag' that allows quantitation of TI into the TRAC locus by miseq.

(2) a donor with a left arm of 1000 bp and a right arm of 992 bp with homology to TRAC site E flanking a GFP transgene driven by the hPGK promotor. The donor does not contain a 'miseq tag';

(3) a donor containing a left arm of 350 bp and a right arm of 393 bp with homology to TRAC site E flanking a GFP transgene driven by the hPGK promotor and followed by a mutated WPRE element. The donor also contains a 'miseq tag';

(4) a donor containing a left arm of 423 bp and a right arm of 393 bp with homology to TRAC site E flanking a FMC63-CD8BBZ CAR transgene driven by the hPGK promotor. The donor also contains a 'miseq tag';

(5) a donor containing a left arm of 423 bp and a right arm of 393 bp with homology to TRAC site E flanking a FMC63-CD8BBZ CAR transgene driven by the hPGK promotor and followed by a mutated WPRE element. The donor also contains a 'miseq tag';

(6) a donor containing a left arm of 360 bp and a right arm of 393 bp with homology to TRAC site E flanking a FMC63-CD8BBZ CAR transgene linked by a self-cleaving P2A peptide to a fusion protein expressing B2M and HLA-E. The transgene is driven by the hPGK promotor and followed by a mutated WPRE element. The donor also contains a 'miseq tag';

(7) a donor containing a left arm of 360 bp and a right arm of 393 bp with homology to TRAC site E flanking a FMC63-CD8BBZ CAR transgene linked by a self-cleaving P2A peptide to a fusion protein expressing B2M and HLA-G. The transgene is driven by the hPGK promotor and followed by a mutated WPRE element. The donor also contains a 'miseq tag';

(8) a donor containing a left arm of 1000 bp and a right arm of 992 bp with homology to TRAC site E flanking an HLA-G transgene driven by the hPGK promotor;

(9) a donor containing a left arm of 1000 bp and a right arm of 992 bp with homology to TRAC site E flanking an HLA-E0101 transgene driven by the hPGK promotor;

(10) a donor containing a left arm of 1000 bp and a right arm of 992 bp with homology to TRAC site E flanking an HLA-E0103 transgene driven by the hPGK promotor;

(11) a donor containing a left arm of 1000 bp and a right arm of 992 bp with homology to TRAC site E flanking an HLA-G transgene driven by the hPGK promotor

(12) a donor containing a left arm of 1000 bp and a right arm of 992 bp with homology to TRAC site E flanking a linked B2M HLA-G transgene driven by the hPGK promotor. The linker between B2M and HLA-G contains 2 copies of the G4S peptide (SEQ ID NO: 68). HLA-G does not contain a signal peptide; a donor containing a left arm of 1000 bp and a right arm of 992 bp with homology to TRAC site E flanking a linked B2M HLA-G transgene driven by the hPGK promotor. The linker between B2M and HLA-G contains 4 copies of the G4S peptide (SEQ ID NO: 68). HLA-G does not contain a signal peptide;

(13) a donor containing a left arm of 1000 bp and a right arm of 992 bp with homology to TRAC site E flanking a linked B2M HLA-G transgene driven by the hPGK promotor. The linker between B2M and HLA-G contains 6 copies of the G4S peptide (SEQ ID NO: 68). HLA-G does not contain a signal peptide;

(14) a donor containing a left arm of 1000 bp and a right arm of 992 bp with homology to TRAC site E flanking an HLA-E0101 transgene driven by the hPGK promotor;

(15) a donor containing a left arm of 1000 bp and a right arm of 992 bp with homology to TRAC site E flanking an HLA-E0103 transgene driven by the hPGK promotor;

(16) a donor containing a left arm of 1000 bp and a right arm of 992 bp with homology to TRAC site E flanking a linked B2M HLA-E0101 transgene driven by the hPGK promotor. The linker between B2M and HLA-E0101 contains 4 copies of the G4S peptide (SEQ ID NO: 68). HLA-E0101 does not contain a signal peptide (Celik et al, ibid);

(17) a donor containing a left arm of 1000 bp and a right arm of 992 bp with homology to TRAC site E flanking a linked B2M HLA-E0101 transgene driven by the hPGK promotor. The linker between B2M and HLA-E0101 contains 4 copies of the G4S peptide (SEQ ID NO: 68). HLA-E0103 does not contain a signal peptide;

(18) a donor containing a left arm of 1000 bp and a right arm of 992 bp with homology to TRAC site E flanking a GFP transgene driven by the hPGK promoter;

(19) a donor containing a left arm of 360 bp and a right arm of 393 bp with homology to TRAC site E flanking a FMC63-CD8BBZ CAR transgene linked by a self-cleaving P2A peptide to a fusion protein expressing B2M and HLA-G. The transgene is driven by the hPGK promotor and followed by a mutated WPRE element. The donor also contains a 'miseq tag.'

Figures 16, 17:
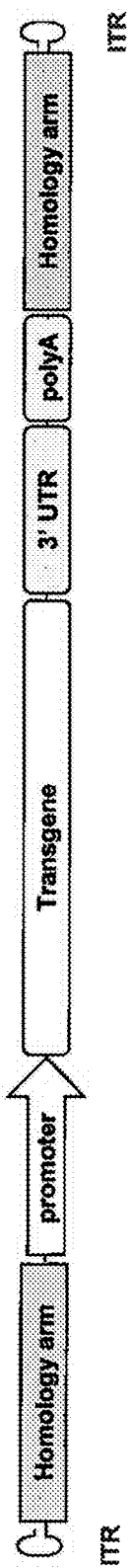

Results using the indicated exemplary donors are shown in FIGS. 17 and 19, in which nuclease-mediated targeted integration efficiently integrated the transgene of the donor. FIG. 18 shows flow cytometry results of the indicated samples as shown in FIG. 17. FIGS. 20-26 show results for the indicated donors (FIG. 19).

As shown, targeted integration resulted in protein expression, including CAR+ cells (targeted to TCR gene) also expressing B2M-HLA-E or HLA-G fusion proteins.

All patents, patent applications and publications mentioned herein are hereby incorporated by reference in their entirety.

Although disclosure has been provided in some detail by way of illustration and example for the purposes of clarity of understanding, it will be apparent to those skilled in the art that various changes and modifications can be practiced without departing from the spirit or scope of the disclosure. Accordingly, the foregoing description and examples should not be construed as limiting.

What is claimed is:

1. An isolated population of T-cells comprising a plurality of genetically modified T-cells, at least one of the genetically modified T-cells comprising: a vector comprising a first polynucleotide encoding a chimeric antigen receptor (CAR) operably linked by a nucleotide sequence encoding a self-cleaving peptide to a second polynucleotide comprising sequences encoding a fusion protein comprising a beta-2-micro-globulin (B2M) protein and HLA-E and/or HLA-G protein, wherein the first and second polynucleotides are integrated into TTGAAA of exon c2 of a T-cell receptor-alpha (TCRA) gene.

2. The population of T-cells of claim 1, wherein an endogenous B2M gene is inactivated in the at least one genetically modified T-cell.

3. The population of genetically modified T-cells of claim 2, wherein an immunological check point gene is inactivated in the at least one genetically modified T-cell.

4. The population of genetically modified T-cells of claim 1, wherein the self-cleaving peptide is a P2A peptide.

5. The population of genetically, modified T-cells of claim 1, wherein the second polynucleotide further comprises a sequence encoding a linker between the B2M and HLA-E- or HLA-G-encoding sequences.

6. The population of genetically, modified T-cells of claim 5, wherein the linker comprises 1, 2, 3, 4, 5 or 6 copies of G4S (SEQ ID NO:68).

7. The isolated population of T cells of claim 1, wherein the vector further comprises an hPGK promoter that drives expression of the first and second polynucleotides.

8. The isolated population of T cells of claim 1, wherein the vector further comprises a mutated WPRE element.

9. The isolated population of T cells of claim 1, wherein the vector further comprises left and right flanking homology arms with exon c2 of TCRA.

* * * * *

SEQUENCE LISTING

```
<160> NUMBER OF SEQ ID NOS: 70

<210> SEQ ID NO 1
<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 1
tcaagctggt cgagaaaagc tttgaaac                                          28

<210> SEQ ID NO 2
<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 2
aacaggtaag acagggggtct agcctggg                                         28

<210> SEQ ID NO 3
<211> LENGTH: 28
<212> TYPE: DNA
<213> ORGANISM: Artificial Sequence
```

```
<220> FEATURE:
<223> OTHER INFORMATION: Description of Artificial Sequence: Synthetic
      oligonucleotide

<400> SEQUENCE: 3
gccacggagc gagacatctc ggcccgaa                                          28

<210> SEQ ID NO 4
<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 4
gagtagcgcg agcacagcta aggccacg                                          28

<210> SEQ ID NO 5
<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 5
acccagatac aaacaatgga tagaaaac                                          28

<210> SEQ ID NO 6
<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 6
tgcaaaaggt aggaaaagga ccaaccag                                          28

<210> SEQ ID NO 7
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7

Gln Ser Ser Asp Leu Ser Arg
1               5

<210> SEQ ID NO 8
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

Gln Ser Gly Asn Arg Thr Thr
1               5

<210> SEQ ID NO 9
<211> LENGTH: 7
<212> TYPE: PRT
```

```
<213> ORGANISM: Artificial Sequence
<220> FEATURE:
<223> OTHER INFORMATION: Description of Artificial Sequence: Synthetic
      peptide

<400> SEQUENCE: 9

Arg Ser Ala Asn Leu Ala Arg
1               5

<210> SEQ ID NO 10
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 10

Asp Arg Ser Ala Leu Ala Arg
1               5

<210> SEQ ID NO 11
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 11

Arg Ser Asp Val Leu Ser Glu
1               5

<210> SEQ ID NO 12
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 12

Lys His Ser Thr Arg Arg Val
1               5

<210> SEQ ID NO 13
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 13

Thr Met His Gln Arg Val Glu
1               5

<210> SEQ ID NO 14
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 14

Thr Ser Gly His Leu Ser Arg
1               5
```

```
<210> SEQ ID NO 15
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 15

Arg Ser Asp His Leu Thr Gln
1               5

<210> SEQ ID NO 16
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 16

Asp Ser Ala Asn Leu Ser Arg
1               5

<210> SEQ ID NO 17
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 17

Gln Ser Gly Ser Leu Thr Arg
1               5

<210> SEQ ID NO 18
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 18

Ala Lys Trp Asn Leu Asp Ala
1               5

<210> SEQ ID NO 19
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 19

Arg Ser Asp Val Leu Ser Ala
1               5

<210> SEQ ID NO 20
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
```

```
<400> SEQUENCE: 20

Gln Asn Ala Thr Arg Ile Asn
1               5

<210> SEQ ID NO 21
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 21

Gln Ser Gly Asp Leu Thr Arg
1               5

<210> SEQ ID NO 22
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 22

Thr Ser Gly Asn Leu Thr Arg
1               5

<210> SEQ ID NO 23
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 23

Gln Ser Asn Asp Leu Asn Ser
1               5

<210> SEQ ID NO 24
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 24

Arg Ser Asp Asp Leu Ser Lys
1               5

<210> SEQ ID NO 25
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 25

Asp Ser Ser Ala Arg Lys Lys
1               5

<210> SEQ ID NO 26
<211> LENGTH: 7
```

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 26

Asp Arg Ser Asn Leu Ser Arg
1               5

<210> SEQ ID NO 27
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 27

Gln Arg Thr His Leu Arg Asp
1               5

<210> SEQ ID NO 28
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 28

Gln Ser Gly His Leu Ala Arg
1               5

<210> SEQ ID NO 29
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 29

Asp Ser Ser Asn Arg Glu Ala
1               5

<210> SEQ ID NO 30
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 30

Ala Gln Cys Cys Leu Phe His
1               5

<210> SEQ ID NO 31
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
```

<400> SEQUENCE: 31

Asp Gln Ser Asn Leu Arg Ala
1               5

<210> SEQ ID NO 32
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 32

Arg Ser Ala Asn Leu Thr Arg
1               5

<210> SEQ ID NO 33
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 33

Arg Ser Asp Asp Leu Thr Arg
1               5

<210> SEQ ID NO 34
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 34

Arg Ser Asp Asn Leu Ser Val
1               5

<210> SEQ ID NO 35
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 35

Arg Ser Asp Tyr Leu Ala Lys
1               5

<210> SEQ ID NO 36
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 36

Gln Asn Ala Asn Arg Ile Thr
1               5

<210> SEQ ID NO 37
<211> LENGTH: 12

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 37

Ser Gly Thr Pro His Glu Val Gly Val Tyr Thr Leu
1               5                   10

<210> SEQ ID NO 38
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 38

Ser Gly Ala Ile Arg Cys His Asp Glu Phe Trp Phe
1               5                   10

<210> SEQ ID NO 39
<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 39
aggattcgga acccaatcac tgacaggt                                       28

<210> SEQ ID NO 40
<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 40
ctcctgaaag tggccgggtt taatctgc                                       28

<210> SEQ ID NO 41
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 41

Thr Ser Ser Asn Arg Lys Thr
1               5

<210> SEQ ID NO 42
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 42

Leu Gln Gln Thr Leu Ala Asp
1               5
```

```
<210> SEQ ID NO 43
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 43

Gln Ser Gly Asn Leu Ala Arg
1               5

<210> SEQ ID NO 44
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 44

Arg Arg Glu Asp Leu Ile Thr
1               5

<210> SEQ ID NO 45
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 45

Thr Ser Ser Asn Leu Ser Arg
1               5

<210> SEQ ID NO 46
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 46

Arg Ser Asp His Leu Ser Thr
1               5

<210> SEQ ID NO 47
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 47

Asp Arg Ser His Leu Ala Arg
1               5

<210> SEQ ID NO 48
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
```

```
<400> SEQUENCE: 48

Leu Lys Gln His Leu Asn Glu
1               5

<210> SEQ ID NO 49
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 49

His Asn Ser Ser Leu Lys Asp
1               5

<210> SEQ ID NO 50
<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 50
ggaaggcccc agcaggcaag ggctgcat                                        28

<210> SEQ ID NO 51
<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 51
gaggaggtgg cagagggtac cccagccc                                        28

<210> SEQ ID NO 52
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 52

Arg Ser Asp His Leu Ser Gln
1               5

<210> SEQ ID NO 53
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 53

Gln Asn Ala Thr Arg Thr Lys
1               5

<210> SEQ ID NO 54
<211> LENGTH: 7
<212> TYPE: PRT
<213> ORGANISM: Artificial Sequence
<220> FEATURE:
```

```
<223> OTHER INFORMATION: Description of Artificial Sequence: Synthetic
      peptide

<400> SEQUENCE: 54

Arg Ser Asp Asn Leu Ser Glu
1               5

<210> SEQ ID NO 55
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 55

Lys Arg Cys Asn Leu Arg Cys
1               5

<210> SEQ ID NO 56
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 56

Asp Arg Ser Thr Arg Thr Lys
1               5

<210> SEQ ID NO 57
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 57

Arg Arg Asp Asn Leu His Ser
1               5

<210> SEQ ID NO 58
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 58

Gly His Thr Ser Leu Lys Arg
1               5

<210> SEQ ID NO 59
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 59

Arg Ser Asp Asn Leu Ala Arg
1               5
```

```
<210> SEQ ID NO 60
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 60

Gln Asn Val Ser Arg Pro Arg
1               5

<210> SEQ ID NO 61
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 61

Gln Ser Gly His Leu Ser Arg
1               5

<210> SEQ ID NO 62
<211> LENGTH: 100
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 62
aagcccataa ccgctgtggc ctcttggttt tacagatacg aacctaaact ttcaaaacct    60
gtcagtgatt gggttccgaa tcctcctcct gaaagtggcc                        100

<210> SEQ ID NO 63
<211> LENGTH: 9
<212> TYPE: PRT
<213> ORGANISM: Unknown
<220> FEATURE:
<223> OTHER INFORMATION: Description of Unknown:
      'LAGLIDADG' family peptide motif sequence

<400> SEQUENCE: 63

Leu Ala Gly Leu Ile Asp Ala Asp Gly
1               5

<210> SEQ ID NO 64
<211> LENGTH: 592
<212> TYPE: DNA
<213> ORGANISM: Woodchuck hepatitis virus

<400> SEQUENCE: 64
aatcaacctc tggattacaa aatttgtgaa agattgactg gtattcttaa ctatgttgct    60
ccttttacgc tatgtggata cgctgcttta atgcctttgt atcatgctat tgcttcccgt   120
atggctttca ttttctcctc cttgtataaa tcctggttgc tgtctcttta tgaggagttg   180
tggcccgttg tcaggcaacg tggcgtggtg tgcactgtgt ttgctgacgc aaccccact   240 ggttggggca ttgccaccac ctgtcagctc ctttccggga ctttcgcttt ccccctccct   300
attgccacgg cggaactcat cgccgcctgc cttgcccgct gctggacagg gctcggctg   360 ttgggcactg acaattccgt ggtgttgtcg gggaagctga cgtcctttcc atggctgctc   420
gcctgtgttg ccacctggat tctgcgcggg acgtccttct gctacgtccc cttcggccctc   480
```

```
aatccagcgg accttccttc ccgcggcctg ctgccggctc tgcggcctct tccgcgtctt    540
cgccttcgcc ctcagacgag tcggatctcc ctttgggccg cctccccgcc tg            592
```

<210> SEQ ID NO 65
<211> LENGTH: 424
<212> TYPE: DNA
<213> ORGANISM: Unknown
<220> FEATURE:
<223> OTHER INFORMATION: Description of Unknown:
      T cell receptor enhancer sequence

<400> SEQUENCE: 65

```
gatatcattg gtcaattgca gcagacatgt ctcttgtggt gtaaagcctc atagcatctt     60
cctgctggag tccacctggc agcccaaagc ctcagcaagt gctggggaca gagagataga   120
aaggctttgc tgtggctcaa ctcagttgta ctttctcaag ctccttttgg ttatctgctc   180
tgtctatgta gttgcttcct ggaaaatggt taaagtcaaa cctcctctgt ttggggcagc   240
acaaaatgtt gctaaggcgt tagaagacaa cataggagca gttaaaccac agccagtttt   300
tgctcgcttt cgaaagacca cagctattag acagaaaacc tcctgtactg gaagtggccc   360
tgaaacagca tctgtgctga cagacactgg gcttgctatg gttgctgctc atcatgctca   420
gctg                                                                 424
```

<210> SEQ ID NO 66
<211> LENGTH: 83
<212> TYPE: DNA
<213> ORGANISM: Unknown
<220> FEATURE:
<223> OTHER INFORMATION: Description of Unknown:
      T cell receptor alpha enhancer sequence

<400> SEQUENCE: 66

```
ctcccatttc catgacgtca tggttaaacc tcttttacct gctttaaccc tttgaagctc     60
tcccgcagaa gccacatcct ctg                                             83
```

<210> SEQ ID NO 67
<211> LENGTH: 50
<212> TYPE: DNA
<213> ORGANISM: Xenopus sp.

<400> SEQUENCE: 67

```
tgcttgttct ttttgcagaa gctcagaata aacgctcaac tttggcagat                50
```

<210> SEQ ID NO 68
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 68

Gly Gly Gly Gly Ser
1               5

<210> SEQ ID NO 69
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide

```
<400> SEQUENCE: 69

Gly Gly Gly Gly Ser Gly Gly Gly Gly Ser Gly Gly Gly Gly Ser Gly
1               5                   10                  15

Gly Gly Gly Ser
            20

<210> SEQ ID NO 70
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 70

Gln Leu Val Lys Ser
1               5
```